US012752483B2

(12) United States Patent
Deng et al.

(10) Patent No.: US 12,752,483 B2
(45) Date of Patent: Oct. 6, 2026

(54) HIGH-PRECISION ADDITIVE MANUFACTURING DEVICE AND HIGH-THROUGHPUT ADDITIVE MANUFACTURING SYSTEM

(71) Applicant: Triastek, Inc., Nanjing (CN)

(72) Inventors: Feihuang Deng, Nanjing (CN); Haili Liu, Nanjing (CN); Peng Wang, Nanjing (CN); Haohui Lu, Nanjing (CN); Senping Cheng, Nanjing (CN); Xiaoling Li, Dublin, CA (US)

(73) Assignee: Triastek, Inc., Nanjing (CN)

( * ) Notice: Subject to any disclaimer, the term of this patent is extended or adjusted under 35 U.S.C. 154(b) by 79 days.

(21) Appl. No.: 18/732,210

(22) Filed: Jun. 3, 2024

(65) Prior Publication Data

US 2024/0316864 A1 Sep. 26, 2024

Related U.S. Application Data

(63) Continuation of application No. 17/540,174, filed on Dec. 1, 2021, now Pat. No. 12,103,231, which is a (Continued)

(30) Foreign Application Priority Data

Jul. 10, 2020 (WO) ................ PCT/CN2020/101343

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/241* (2017.08); (Continued)

(58) Field of Classification Search
CPC ... B29C 64/209; B29C 64/118; B29C 64/241; B33Y 10/00; B33Y 30/00; B65D 81/38
See application file for complete search history.

(56) References Cited

U.S. PATENT DOCUMENTS

| | | |
|---|---|---|
| 3,778,861 A | 12/1973 | Goodnow |
| 4,750,318 A | 6/1988 | Matsuzawa |

(Continued)

FOREIGN PATENT DOCUMENTS

| | | |
|---|---|---|
| CN | 1586865 A | 3/2005 |
| CN | 1872526 A | 12/2006 |

(Continued)

OTHER PUBLICATIONS

Machine Translation of Yang (CN107866973A), Espacenet, Dec. 13, 2017 (generated Jan. 9, 2026) (Year: 2017).*

(Continued)

*Primary Examiner* — Andrew L Swanson
(74) *Attorney, Agent, or Firm* — MORRISON & FOERSTER LLP

(57) ABSTRACT

The present disclosure generally relates to an additive manufacturing system. The system can comprise a material supply module for melting and pressurizing a printing material; a micro-screw printing head comprising: a micro-screw comprising a threaded stem portion and a conical head portion, wherein the threaded stem portion is threaded throughout its length for volume measurement; a sleeve, and a nozzle, wherein a distal end of the nozzle comprises: a conical inner surface, and an outlet port for dispensing the print material, wherein the conical inner surface of the nozzle is configured to be in contact with the conical head portion of the micro-screw to stop dispensing the printing material at the nozzle when the micro-screw printing head is in a closed position; a driving module comprising: a rotation motor for
(Continued)

driving a rotating motion of the micro-screw, and an actuator for driving a vertical motion of the micro-screw.

12 Claims, 33 Drawing Sheets

Related U.S. Application Data continuation of application No. PCT/CN2021/098797, filed on Jun. 8, 2021.

(51) Int. Cl.
*B29C 64/241* (2017.01)
*B33Y 10/00* (2015.01)
*B33Y 30/00* (2015.01)
*B65D 81/38* (2006.01)

(52) U.S. Cl.
CPC ............... *B33Y 10/00* (2014.12); *B33Y 30/00* (2014.12); *B65D 81/38* (2013.01)

(56) References Cited

U.S. PATENT DOCUMENTS 5,002,717 A 3/1991 Taniguchi
5,033,251 A 7/1991 Rodriguez
5,121,329 A 6/1992 Crump
5,192,559 A 3/1993 Hull et al.
5,299,907 A 4/1994 Dal Pozzo
5,303,141 A 4/1994 Batchelder et al.
5,484,062 A 1/1996 Rich
5,529,471 A 6/1996 Khoshevis
5,672,364 A 9/1997 Kato et al.
5,936,861 A 8/1999 Jang et al.
6,571,702 B2 6/2003 Wotton et al.
6,684,604 B2 2/2004 Luc et al.
6,986,739 B2 1/2006 Warren et al.
8,282,380 B2 10/2012 Pax et al.
8,342,400 B1 1/2013 Reese
8,668,859 B2 3/2014 Pettis
8,827,684 B1 9/2014 Schumacher et al.
8,926,484 B1 1/2015 Comb et al.
9,233,491 B2 1/2016 Stuhl et al.
9,233,506 B2 1/2016 Leavitt
9,271,897 B2 3/2016 Costello et al.
9,297,845 B2 3/2016 Mathur
9,445,971 B2 9/2016 Anderson et al.
9,610,219 B1 4/2017 Basso
9,610,733 B2 4/2017 Swanson et al.
9,944,016 B2 4/2018 Lewicki
9,952,237 B2 4/2018 Fournier et al.
9,974,607 B2 5/2018 Stone et al.
10,011,073 B2 7/2018 Bheda
10,143,626 B2 12/2018 Li
10,201,503 B1 2/2019 Li et al.
10,254,499 B1 4/2019 Cohen et al.
10,258,575 B2 4/2019 Li
10,350,822 B1 7/2019 Deng et al.
10,363,220 B2 7/2019 Li
10,624,857 B2 4/2020 Li et al.
10,973,767 B2 4/2021 Li
11,292,193 B2 4/2022 Liu et al.
11,364,674 B2 6/2022 Cheng et al.
11,383,439 B1 7/2022 Liu et al.
11,458,684 B2 10/2022 Liu et al.
11,612,569 B2 3/2023 Li et al.
12,103,231 B2 10/2024 Deng et al.
12,156,945 B2 12/2024 Li et al.
12,168,538 B2 12/2024 Wang et al.
12,384,112 B2 8/2025 Liu et al.
2002/0113331 A1 8/2002 Zhang et al.
2003/0077347 A1 4/2003 Miebach
2004/0175450 A1 9/2004 Yanagisawa et al.
2004/0232601 A1 11/2004 Kundinger et al.
2004/0253365 A1 12/2004 Warren et al.
2006/0266188 A1 11/2006 Kim
2008/0093763 A1 4/2008 Mancosh et al.
2008/0110134 A1 5/2008 Nitulescu et al.
2009/0283438 A1 11/2009 Bourque
2012/0092724 A1 4/2012 Pettis
2012/0096807 A1 4/2012 Okuma
2012/0105903 A1 5/2012 Pettis
2012/0200596 A1 8/2012 Gotou et al.
2012/0315333 A1 12/2012 Zhou et al.
2014/0116217 A1 5/2014 Hashish et al.
2014/0220168 A1 8/2014 Perez et al.
2014/0265040 A1 9/2014 Batchelder
2014/0314954 A1* 10/2014 Lewis .................. B29C 64/188 427/256
2015/0035206 A1 2/2015 Maggiore
2015/0037527 A1 2/2015 Jacobs et al.
2015/0130101 A1 5/2015 Fiegener
2015/0210010 A1 7/2015 Napadensky
2015/0298394 A1 10/2015 Sheinman
2015/0321419 A1 11/2015 Linthicum et al.
2015/0352009 A1 12/2015 Miller
2015/0352787 A1 12/2015 Humbert et al.
2016/0038655 A1 2/2016 Weisman et al.
2016/0042151 A1 2/2016 Akdogan et al.
2016/0074938 A1 3/2016 Kitani et al.
2016/0075091 A1 3/2016 Cable
2016/0096321 A1 4/2016 Fry et al.
2016/0122045 A1 5/2016 Kames et al.
2016/0136887 A1 5/2016 Guillemette et al.
2016/0200024 A1 7/2016 Kim et al.
2016/0288414 A1 10/2016 Ozbolat et al.
2016/0288427 A1 10/2016 Foley et al.
2016/0303802 A1 10/2016 Meshorer et al.
2016/0325498 A1 11/2016 Gelbart
2016/0354315 A1 12/2016 Li
2016/0367358 A1 12/2016 Tran
2017/0008230 A1 1/2017 Yuyama
2017/0015061 A1 1/2017 Lewicki et al.
2017/0050375 A1 2/2017 Tyler
2017/0057682 A1 3/2017 Chudy
2017/0120513 A1 5/2017 Brennan
2017/0121039 A1 5/2017 Ciesiun
2017/0157844 A1 6/2017 Mandel et al.
2017/0165920 A1 6/2017 Leavitt et al.
2017/0217088 A1 8/2017 Boyd et al.
2017/0253354 A1 9/2017 Colson et al.
2017/0360714 A1 12/2017 Church
2018/0001565 A1 1/2018 Hocker
2018/0011306 A1 1/2018 Babnick et al.
2018/0015730 A1 1/2018 Essien et al.
2018/0029262 A1 2/2018 Fitzpatrick
2018/0035689 A1 2/2018 Warner et al.
2018/0049993 A1 2/2018 Blaesi et al.
2018/0056582 A1 3/2018 Matusik et al.
2018/0056602 A1 3/2018 Susnjara et al.
2018/0104911 A1 4/2018 Donaldson
2018/0110679 A1 4/2018 Devens
2018/0111306 A1* 4/2018 Mandel ............... B29C 48/2552
2018/0116911 A1 5/2018 Li
2018/0133980 A1 5/2018 Mantell et al.
2018/0141685 A1 5/2018 Colson et al.
2018/0184702 A1 7/2018 Moh
2018/0194061 A1 7/2018 Takahashi
2018/0200955 A1 7/2018 Hoelldorfer et al.
2018/0222111 A1 8/2018 Bayer et al.
2018/0228737 A1 8/2018 Giridhar et al.
2018/0235837 A1 8/2018 Klein
2018/0296494 A1 10/2018 Shalev et al.
2018/0311167 A1 11/2018 Li
2018/0318929 A1 11/2018 Matthews et al.
2018/0319065 A1 11/2018 Holm et al.
2018/0319519 A1 11/2018 Stange et al.
2018/0339448 A1 11/2018 Fan et al.
2018/0339455 A1 11/2018 Cohen et al.
2018/0370117 A1 12/2018 Gardiner et al.
2019/0001574 A1 1/2019 Yackabonis et al.
2019/0015344 A1 1/2019 Wening et al.
2019/0022934 A1 1/2019 Kobe et al.

(56) References Cited

U.S. PATENT DOCUMENTS

| | | | | |
|---|---|---|---|---|
| 2019/0047225 | A1 | 2/2019 | Luo | |
| 2019/0125681 | A1 | 5/2019 | Albed Alhnan | |
| 2019/0192383 | A1 | 6/2019 | Schiller et al. | |
| 2019/0192440 | A1 | 6/2019 | Li | |
| 2019/0202126 | A1 | 7/2019 | Hutchinson et al. | |
| 2019/0209468 | A1 | 7/2019 | Deng et al. | |
| 2019/0209482 | A1 | 7/2019 | Li et al. | |
| 2019/0217545 | A1 | 7/2019 | Eller et al. | |
| 2019/0321299 | A1 | 10/2019 | Li | |
| 2019/0374471 | A1 | 12/2019 | Basit et al. | |
| 2020/0016039 | A1 | 1/2020 | Boutin | |
| 2020/0023579 | A1* | 1/2020 | Lynn | B29C 48/2694 |
| 2020/0030491 | A1 | 1/2020 | Weisman et al. | |
| 2020/0147873 | A1 | 5/2020 | Lewis et al. | |
| 2020/0189187 | A1 | 6/2020 | Streicher et al. | |
| 2020/0315971 | A1 | 10/2020 | Li | |
| 2020/0338009 | A1 | 10/2020 | Li et al. | |
| 2020/0369831 | A1 | 11/2020 | Herzberger et al. | |
| 2020/0394786 | A1 | 12/2020 | Yokouchi et al. | |
| 2021/0002014 | A1 | 1/2021 | Akdogan et al. | |
| 2021/0007981 | A1 | 1/2021 | Hudson et al. | |
| 2021/0039306 | A1 | 2/2021 | Busbee | |
| 2021/0077410 | A1 | 3/2021 | Deng et al. | |
| 2021/0078244 | A1 | 3/2021 | Deng et al. | |
| 2021/0078257 | A1 | 3/2021 | Mcnaney | |
| 2021/0128479 | A1 | 5/2021 | Cheng et al. | |
| 2021/0147133 | A1 | 5/2021 | Steinweg | |
| 2021/0154910 | A1 | 5/2021 | Cheng et al. | |
| 2021/0178677 | A1 | 6/2021 | Liu et al. | |
| 2021/0196638 | A1 | 7/2021 | Deng et al. | |
| 2021/0205226 | A1 | 7/2021 | Li | |
| 2021/0237361 | A1 | 8/2021 | Sasse et al. | |
| 2022/0118698 | A1 | 4/2022 | Deng et al. | |
| 2022/0212404 | A1 | 7/2022 | Liu et al. | |
| 2022/0212408 | A1 | 7/2022 | Liu et al. | |
| 2022/0339857 | A1 | 10/2022 | Cheng et al. | |
| 2023/0048362 | A1 | 2/2023 | Liu et al. | |
| 2023/0070928 | A1 | 3/2023 | Wang et al. | |
| 2023/0225978 | A1 | 7/2023 | Li et al. | |
| 2023/0330925 | A1 | 10/2023 | Van et al. | |
| 2023/0356467 | A1* | 11/2023 | Yang | B33Y 50/00 |
| 2025/0042589 | A1 | 2/2025 | Wang et al. | |
| 2025/0049723 | A1 | 2/2025 | Li et al. | |
| 2025/0303640 | A1 | 10/2025 | Liu et al. | |

FOREIGN PATENT DOCUMENTS

| | | | | |
|---|---|---|---|---|
| CN | 203496288 | U | 3/2014 | |
| CN | 103692653 | A | 4/2014 | |
| CN | 104260349 | A | 1/2015 | |
| CN | 104552949 | A | 4/2015 | |
| CN | 204414597 | U | 6/2015 | |
| CN | 104742375 | A | 7/2015 | |
| CN | 104924614 | A | 9/2015 | |
| CN | 204658966 | U | 9/2015 | |
| CN | 105082539 | A | 11/2015 | |
| CN | 105313332 | A | 2/2016 | |
| CN | 105365221 | A | 3/2016 | |
| CN | 105666640 | A | 6/2016 | |
| CN | 105690762 | A | 6/2016 | |
| CN | 105711094 | A | 6/2016 | |
| CN | 205343831 | U | 6/2016 | |
| CN | 105856562 | A | 8/2016 | |
| CN | 105965888 | A | 9/2016 | |
| CN | 106079434 | A | 11/2016 | |
| CN | 106255583 | A | 12/2016 | |
| CN | 206047081 | U | 3/2017 | |
| CN | 106622413 | A | 5/2017 | |
| CN | 106623936 | A | 5/2017 | |
| CN | 106626370 | A | 5/2017 | |
| CN | 106827443 | A | 6/2017 | |
| CN | 106853683 | A | 6/2017 | |
| CN | 106926444 | A | 7/2017 | |
| CN | 107019676 | A | 8/2017 | |
| CN | 206436522 | U | 8/2017 | |
| CN | 107718560 | A | 2/2018 | |
| CN | 107866973 | A * | 4/2018 | B33Y 30/00 |
| CN | 108163302 | A | 6/2018 | |
| CN | 108215153 | A | 6/2018 | |
| CN | 108215154 | A | 6/2018 | |
| CN | 207579101 | U | 7/2018 | |
| CN | 207669820 | U | 7/2018 | |
| CN | 108568966 | A | 9/2018 | |
| CN | 108582765 | A | 9/2018 | |
| CN | 207874876 | U | 9/2018 | |
| CN | 207901677 | U | 9/2018 | |
| CN | 109228325 | A | 1/2019 | |
| CN | 208768826 | U | 4/2019 | |
| CN | 109719944 | A | 5/2019 | |
| CN | 208812559 | U | 5/2019 | |
| CN | 109895390 | A | 6/2019 | |
| CN | 109911349 | A | 6/2019 | |
| CN | 110507637 | A | 11/2019 | |
| EP | 3626439 | A1 | 3/2020 | |
| JP | 10-305461 | A | 11/1998 | |
| JP | 2017-061066 | A | 3/2017 | |
| JP | 2018-027637 | A | 2/2018 | |
| KR | 10-2019-0031959 | A | 3/2019 | |
| WO | 2003/037607 | A1 | 5/2003 | |
| WO | 2015/065936 | A2 | 5/2015 | |
| WO | 2015/129733 | A1 | 9/2015 | |
| WO | 2015/131833 | A1 | 9/2015 | |
| WO | 2015/171352 | A1 | 11/2015 | |
| WO | 2016/038356 | A1 | 3/2016 | |
| WO | 2016/097911 | A1 | 6/2016 | |
| WO | 2016/126962 | A1 | 8/2016 | |
| WO | 2016/185215 | A1 | 11/2016 | |
| WO | 2016/192680 | A1 | 12/2016 | |
| WO | 2017/008789 | A1 | 1/2017 | |
| WO | 2017/038984 | A1 | 3/2017 | |
| WO | 2017/072536 | A1 | 5/2017 | |
| WO | 2017/113172 | A1 | 7/2017 | |
| WO | 2017/193099 | A1 | 11/2017 | |
| WO | 2017/205443 | A1 | 11/2017 | |
| WO | 2017/206128 | A1 | 12/2017 | |
| WO | 2018/100444 | A2 | 6/2018 | |
| WO | 2018/137686 | A1 | 8/2018 | |
| WO | 2018/210183 | A1 | 11/2018 | |
| WO | 2019/137199 | A1 | 7/2019 | |
| WO | 2019/137200 | A1 | 7/2019 | |
| WO | 2019/137333 | A1 | 7/2019 | |
| WO | 2021/031824 | A1 | 2/2021 | |
| WO | 2021/042865 | A1 | 3/2021 | |
| WO | 2021/164660 | A1 | 8/2021 | |

OTHER PUBLICATIONS

Cheng et al. WO-2018/210183, English Machine Translation from WIPO website via Google (2018), 27 pages. This is attached to the Foreign Reference.

Extended European Search Report, dated Jul. 28, 2025, for European Patent Application No. 25154202.3, 17 pages.

Goyanes, A. et al. (2015). "3D Printing of Medicines: Engineering Novel Oral Devices with Unique Design and Drug Release Characteristics," Molecular Pharmaceutics 12(11):4077-4084, 8 pages.

International Preliminary Report on Patentability issued Aug. 23, 2022, for PCT Patent Application No. PCT/CN2021/076280, filed Feb. 9, 2021, 5 pages.

International Preliminary Report on Patentability issued Feb. 17, 2022, for PCT Patent Application No. PCT/CN2020/105868, filed Jul. 30, 2020, 6 pages.

International Preliminary Report on Patentability issued Jan. 10, 2023, for PCT Patent Application No. PCT/CN2021/098797, filed Jun. 8, 2021, 5 pages.

International Preliminary Report on Patentability issued Jul. 14, 2020, for PCT Patent Application No. PCT/CN2019/070634, filed Jan. 7, 2019, 6 pages.

International Preliminary Report on Patentability, issued Nov. 19, 2019, for PCT Application No. PCT/CN2018/086489, filed May 11, 2018, 1 page. English Translation.

International Search Report and Written Opinion, mailed Aug. 27, 2021, for PCT Application No. PCT/CN2021/098797, filed Jun. 8, 2021, 8 pages.

(56) References Cited

OTHER PUBLICATIONS

International Search Report and Written Opinion, mailed Mar. 29, 2019, for PCT/CN2019/070634, filed Jan. 7, 2019, 11 pages.
International Search Report and Written Opinion, mailed May 12, 2021, for PCT/CN2021/076280, filed Feb. 9, 2021, 9 pages.
International Search Report and Written Opinion, mailed Nov. 3, 2020, for PCT/CN2020/105868, filed Jul. 30, 2020, 11 pages.
International Search Report, mailed Jul. 19, 2018, for PCT Application No. PCT/CN2018/086489, filed May 11, 2018, 2 pages. English Translation.
Poh, P.S.P. et al. (Dec. 15, 2016, e-pub. Aug. 1, 2016). "Polylactides in Additive Biomanufacturing," Advanced Drug Delivery Reviews 107:228-246.
Skylar-Scott, M.A. (Nov. 14, 2019, e-pub. Nov. 13, 2019). "Voxelated Soft Matter Via Multimaterial Multinozzle 3D Printing," Nature 575(7782):330-335.
Written Opinion of the International Searching Authority Report, mailed Jul. 19, 2018, for PCT Application No. PCT/CN2018/086489, filed May 11, 2018, 4 pages. English Translation.
Yang, et al. (2018). CN-207579101-U, English Translation from WIP Website, 4 pages.
Zhang, J. et al. (2017, e-pub. Dec. 23, 2016). "Coupling 3D Printing With Hot-Melt Extrusion to Produce Controlled-Release Tablets," International Journal of Pharmaceutics 519: 186-197.

* cited by examiner

D-D

| | | | | | | | | |
|---|---|---|---|---|---|---|---|---|
| Weights of Filaments Printed by A Printing Head (mg) | 12.37 | 12.34 | 12.52 | 12.36 | 12.49 | 12.41 | 12.31 | 12.29 |
| Deviation (mg) | 0.05 | 0.02 | 0.20 | 0.04 | 0.17 | 0.09 | -0.01 | -0.03 |
| Relative Deviation （%） | 0.43 | 0.19 | 1.65 | 0.35 | 1.41 | 0.76 | -0.05 | -0.22 |

| | | | | | | | | |
|---|---|---|---|---|---|---|---|---|
| Weights of Filaments Printed by A Printing Head (mg) | 12.30 | 12.19 | 12.26 | 12.27 | 12.38 | 12.28 | 12.30 | 12.40 |
| Deviation (mg) | -0.02 | -0.13 | -0.06 | -0.05 | 0.06 | -0.04 | -0.02 | 0.08 |
| Relative Deviation （%） | -0.13 | -1.03 | -0.46 | -0.38 | 0.52 | -0.30 | -0.13 | 0.68 |

| | | | | | | | | |
|---|---|---|---|---|---|---|---|---|
| Weights of Filaments Printed by A Printing Head (mg) | 12.27 | 12.27 | 12.38 | 12.17 | 12.27 | 12.30 | 12.26 | 12.23 |
| Deviation (mg) | -0.05 | -0.05 | 0.06 | -0.15 | -0.05 | -0.02 | -0.06 | -0.09 |
| Relative Deviation （%） | -0.38 | -0.38 | 0.52 | -1.19 | -0.38 | -0.13 | -0.46 | -0.70 |

| | | | | | | | | |
|---|---|---|---|---|---|---|---|---|
| Weights of Filaments Printed by A Printing Head (mg) | 12.40 | 12.33 | 12.31 | 12.38 | 12.20 | 12.28 | 12.38 | 12.23 |
| Deviation (mg) | 0.08 | 0.01 | -0.01 | 0.06 | -0.12 | -0.04 | 0.06 | -0.09 |
| Relative Deviation （%） | 0.68 | 0.11 | -0.05 | 0.52 | -0.95 | -0.30 | 0.52 | -0.70 |

FIG. 10

Batch 1

| Weights of Dosage Units Printed by one or more Printing Head (mg) | 203.9 | 204.3 | 203.6 | 203.1 | 203.1 | 203.8 | 204.3 | 203.8 |
|---|---|---|---|---|---|---|---|---|
| Deviation (mg) | -0.42 | -0.02 | -0.72 | -1.22 | -1.22 | -0.52 | -0.02 | -0.52 |
| Relative Deviation （%） | -0.21 | -0.01 | -0.35 | -0.60 | -0.60 | -0.25 | -0.01 | -0.25 |

| Weights of Dosage Units Printed by one or more Printing Head (mg) | 204.2 | 204.2 | 204.1 | 204 | 205.2 | 204.8 | 205.2 | 205.2 |
|---|---|---|---|---|---|---|---|---|
| Deviation (mg) | -0.12 | -0.12 | -0.22 | -0.32 | 0.88 | 0.48 | 0.88 | 0.88 |
| Relative Deviation （%） | -0.06 | -0.06 | -0.11 | -0.16 | 0.43 | 0.23 | 0.43 | 0.43 |

| Weights of Dosage Units Printed by one or more Printing Head (mg) | 205 | 205.1 | 204.8 | 204.7 |
|---|---|---|---|---|
| Deviation (mg) | 0.68 | 0.78 | 0.48 | 0.38 |
| Relative Deviation （%） | 0.33 | 0.38 | 0.23 | 0.19 |

Batch 2

| Weights of Dosage Units Printed by one or more Printing Head (mg) | 207.3 | 207.1 | 207.1 | 208.3 | 207.7 | 208.5 | 208 | 208.5 |
|---|---|---|---|---|---|---|---|---|
| Deviation (mg) | -0.83 | -1.03 | -1.03 | 0.17 | -0.43 | 0.37 | -0.13 | 0.37 |
| Relative Deviation （%） | -0.40 | -0.49 | -0.49 | 0.08 | -0.21 | 0.18 | -0.06 | 0.18 |

| Weights of Dosage Units Printed by one or more Printing Head (mg) | 208.4 | 208.6 | 208.7 | 208.9 | 208 | 208.3 | 208.5 |
|---|---|---|---|---|---|---|---|
| Deviation (mg) | 0.27 | 0.47 | 0.57 | 0.77 | -0.13 | 0.17 | 0.37 |
| Relative Deviation （%） | 0.13 | 0.23 | 0.28 | 0.37 | -0.06 | 0.08 | 0.18 |

FIG. 11

HIGH-PRECISION ADDITIVE MANUFACTURING DEVICE AND HIGH-THROUGHPUT ADDITIVE MANUFACTURING SYSTEM

CROSS-REFERENCE TO RELATED APPLICATIONS

This application is a continuation application of U.S. Ser. No. 17/540,174, filed on Dec. 1, 2021, which is a continuation application of International Application No. PCT/CN2021/098797, filed on Jun. 8, 2021, which claims the priority benefit of International Application No. PCT/CN2020/101343, filed on Jul. 10, 2020, the contents of each of which are hereby incorporated herein by reference in their entirety.

FIELD OF THE INVENTION

The present disclosure relates generally to additive manufacturing technology, and more specifically to high-throughput and high-precision 3D printing techniques.

BACKGROUND

Additive manufacturing, also referred to as three-dimensional printing ("3D printing"), is a rapid prototyping technology involving processes in which material is joined or solidified to manufacture a three-dimensional object. Specifically, materials are added together (such as liquid molecules or powder grains being fused together), typically layer by layer, based on a digital model. A computer system operates the additive manufacturing system, and controls material flow and movement of a printing nozzle until the desired shape is formed. Currently, 3D printing technology includes photocuring techniques, powder bonding techniques, and fused deposition modeling (FDM) techniques.

Existing additive manufacturing systems that use printing screws suffer from several drawbacks. Many of existing systems do not provide a precise and instantaneous opening/shutting mechanism. For example, even when the printing screw stops rotating, a small amount of printing material can still be dispensed/leaked. As a result, it not possible to precisely control the amount of printing material dispensed, especially at the beginning and end of a printing session.

Further, the printing screws of many existing systems are relatively large (e.g., diameter on the scale of centimeters), making them unsuited for printing small and intricate objects because of the difficulty in precisely controlling and tracking the flow of the printing material. A printing screw of these systems has three sections: a section configured to introduce the printing material, a section configured to pressurize the printing material, and a section configured to measure the volume of printing material dispensed (i.e., metering). The multiple sections, which are designed for multiple purposes, make it difficult to reduce the size of the printing screw.

Further still, the printing screws of many existing systems are not designed to match well with the corresponding nozzles, leaving a space within the nozzle even when the nozzle is closed. As a result, after each printing session, residue of the printing material can be left in the space and thus affect volume tracking for current and future printing sessions.

Thus, there is a need for systems and methods for 3D printing that can print relatively small, intricate, and complex objects in an accurate, precise, and cost-efficient manner, while maintaining high throughput over time. There is also a need for a system that can coordinate the operations of multiple 3D printers to print a batch of products.

BRIEF SUMMARY

An exemplary additive manufacturing system comprises: a material supply module for melting and pressurizing a printing material; a micro-screw printing head comprising: a micro-screw comprising a threaded stem portion and a conical head portion, wherein the threaded stem portion is threaded throughout its length for volume measurement; a sleeve, and a nozzle, wherein a distal end of the nozzle comprises: a conical inner surface, and an outlet port for dispensing the print material, wherein the conical inner surface of the nozzle is configured to be in contact with the conical head portion of the micro-screw to stop dispensing the printing material at the nozzle when the micro-screw printing head is in a closed position; a driving module comprising: a rotation motor for driving a rotating motion of the micro-screw, and an actuator (e.g., electrical motor) for driving a vertical motion of the micro-screw.

In some embodiments, the system further comprises a z-axis positioning scaling ring between the sleeve and the nozzle, wherein the z-axis positioning sealing ring is configured to adjust a vertical position of the nozzle.

In some embodiments, the micro-screw printing head further comprises a heating sleeve or a temperature sensor.

In some embodiments, the micro-screw printing head further comprises a heat insulating sleeve.

In some embodiments, a first taper angle of the conical head portion of the micro-screw is smaller than or equal to a second taper angle formed by the conical inner surface of the nozzle.

In some embodiments, the first taper angle of the conical head portion of the micro-screw is equal to or smaller than 60°.

In some embodiments, a ratio between the second taper angle and the first taper angle equals to or is between 1:1 and 4:1, equals to or is between 1:1 and 3:1, or equals to or is between 1:1 and 2:1.

In some embodiments, the conical head portion of the micro-screw is of a frustoconical shape or a truncated cone shape.

In some embodiments, the conical head portion of the micro-screw is configured to fit the conical inner surface of the nozzle via one or more matching patterns.

In some embodiments, a length of the threaded stem portion of the micro-screw equals to or is between 10 and 80 mm.

In some embodiments, a diameter of the threaded stem portion of the micro-screw equals to or is between 1 and 10 mm.

In some embodiments, the diameter is 3 mm, 3.5 mm, 3.6 mm, 4 mm, or 4.5 mm, 4.6 mm.

In some embodiments, the material supply module comprises an extruding device for melting the printing material and a pressurizing device.

In some embodiments, the extruding device comprises a single-piston extruding mechanism, a single-screw extruding mechanism, a twin-screw extruding mechanism, or any combination thereof.

In some embodiments, the pressurizing device comprises a piston extruding mechanism, a single-screw extruding mechanism, a screw pump mechanism, a cogwheel mechanism, a plunger pump mechanism (e.g., a valve-less measuring pump mechanism), or any combination thereof.

In some embodiments, the material supply module comprises one or more temperature sensors for detecting temperature of the molten printing material.

In some embodiments, the system further comprises one or more pressure sensor at a flow channel or an inlet of the micro-screw printing head for detecting pressure of the molten printing material.

In some embodiments, an inlet of the micro-screw printing head is aligned based on a topmost thread segment of the threaded stem portion of the micro-screw.

In some embodiments, the system further comprises an inlet sealing ring at the inlet of the micro-screw printing head.

In some embodiments, the driving module is configured to independently control the actuator and the rotation motor.

In some embodiments, the driving module is configured to provide composite control of the actuator and the rotation motor.

In some embodiments, the actuators comprise a pneumatic actuator, a mechanical actuator, an electromagnetic actuator, hydraulic actuator, or an electrical motor.

In some embodiments, the electrical motor is configured to control a speed and acceleration of vertical movement of the micro-screw and/or travel displacement of the micro-screw.

In some embodiments, the rotation motor is configured to control a rotation speed of the micro-screw.

In some embodiments, the system further comprises: a cross connector or cardan shaft used for coupling.

In some embodiments, the printing material is melted by the material supply module at between 50° C. and 400° C.

In some embodiments, the printing material is dispensed by the nozzle at between 50° C. and 400° C.

In some embodiments, the printing material is non-filamentous material, and wherein the printing material has a viscosity of 800 Pa·s or higher when dispensed by the nozzle.

In some embodiments, the printing material comprises a pharmaceutically acceptable material, an inert material, or a combination thereof.

In some embodiments, the system further comprises a printing platform and a controller for causing movement of the printing platform based on a Cartesian coordinate system, a polar coordinate system, or a cylindrical coordinate system.

An exemplary method of additive manufacturing via a micro-screw printing head, wherein the micro-screw printing head comprises: a micro-screw comprising a threaded stem portion and a conical head portion, and a nozzle, wherein a distal end of the nozzle comprises: a conical inner surface, and an outlet port for dispensing the print material, the method comprises: raising the micro-screw to open the outlet port of the nozzle; rotating the micro-screw to introduce a molten and pressurized printing material into a groove of the threaded stem portion of the micro-screw, wherein the molten and pressurized printing material is configured to flow toward the distal end of the nozzle; and lowering the micro-screw such that the conical inner surface of the nozzle is in contact with the conical head portion of the micro-screw to close the outlet port and stop dispensing the printing material at the nozzle.

In some embodiments, the method further comprises melting and pressuring the printing material.

In some embodiments, the method further comprises adjusting, via an actuator (e.g., electrical motor), a speed and acceleration of vertical movement of the micro-screw and/or a travel displacement of the micro-screw.

In some embodiments, the method further comprises adjusting, via a rotation motor, a rotation speed of the micro-screw to control a volume of the printing material being dispensed.

In some embodiments, an actuator (e.g., electrical motor) and a rotation motor are configured to drive composite movement of the micro-screw.

In some embodiments, the method further comprises: lowering the micro-screw while decreasing a rotation speed of the micro-screw to close the outlet port.

In some embodiments, rotating the micro-screw comprises rotating the micro-screw in a first direction, the method further comprising: rotating the micro-screw in a direction opposite to the first direction to remove an amount of the printing material from the distal end of the nozzle before lowering the micro-screw to close the outlet port.

In some embodiments, the method further comprises coordinating a movement of a printing platform and an amount of the printing material being dispensed by the nozzle.

In some embodiments, the method further comprises heating the printing material according to a ladder scheme, wherein the printing material is heated to a first temperature at a material supply module; the printing material is heated to a second temperature at a flow distribution model; and the printing material is heated to a third temperature at the nozzle.

In some embodiments, the first temperature is 50° C., wherein the second temperature is 70° C., and the third temperature is 105° C.

In some embodiments, the method further comprises measuring the pressure of the printing material at a flow channel or an inlet of the micro-screw printing head; and controlling the pressure of the printing material via a closed-loop control system.

In some embodiments, the printing material is non-filamentous material, and wherein the printing material has a viscosity of 800 Pa·s or higher when dispensed by the nozzle.

In some embodiments, the micro-screw is controlled to manufacture pharmaceutical dosage units.

An exemplary additive manufacturing system, comprises: a material supply module for melting and pressurizing a printing material; a flow distribution module comprising a flow distribution plate, wherein the flow distribution plate comprises a plurality of channels for evenly dividing a single flow of the molten and pressurized printing material into a plurality of flows, a plurality of micro-screw printing heads configured to dispense the plurality of flows, wherein each of the plurality of micro-screw printing heads comprises: a micro-screw comprising a threaded stem portion and a conical head portion, wherein the threaded stem portion is threaded throughout its length for volume measurement; a sleeve, and a nozzle, wherein a distal end of the nozzle comprises a conical inner surface and an outlet port for dispensing the print material, and wherein the conical inner surface of the nozzle is configured to be in contact with the conical head portion of the micro-screw to stop dispensing the printing material at the nozzle when the respective micro-screw printing head is in a closed position; and a driving module comprising: one or more rotation motors for driving rotating motion of the plurality of micro-screws, and one or more actuators (e.g., electrical motor) for driving vertical motion of the plurality of micro-screws.

In some embodiments, each micro-screw printing head further comprises a z-axis positioning sealing ring between the sleeve and the nozzle, wherein the z-axis positioning sealing ring is configured to adjust a vertical position of the nozzle.

In some embodiments, each micro-screw printing head further comprises a heating sleeve or a temperature sensor.

In some embodiments, each micro-screw printing head further comprises a heat insulating sleeve.

In some embodiments, for each micro-screw printing head, a first taper angle of the conical head portion of the micro-screw is smaller than or equal to a second taper angle formed by the conical inner surface of the nozzle.

In some embodiments, the first taper angle of the conical head portion of the micro-screw is equal to or smaller than 60°.

In some embodiments, a ratio between the second taper angle and the first taper angle equals to or is between 1:1 and 4:1, equals to or is between 1:1 and 3:1, or equals to or is between 1:1 and 2:1.

In some embodiments, for each micro-screw printing head, the conical head portion of the micro-screw is of a frustoconical shape or a truncated cone shape.

In some embodiments, for each micro-screw printing head, the conical head portion of the micro-screw is configured to fit the conical inner surface of the nozzle via one or more matching patterns.

In some embodiments, for each micro-screw printing head, a length of the threaded stem portion of the micro-screw equals to or is between 10 and 80 mm.

In some embodiments, for each micro-screw printing head, a diameter of the threaded stem portion of the micro-screw equals to or is between 1 and 10 mm.

In some embodiments, the material supply module comprises an extruding device for melting the printing material and a pressurizing device.

In some embodiments, the extruding device comprises a single-piston extruding mechanism, a single-screw extruding mechanism, a twin-screw extruding mechanism, or any combination thereof.

In some embodiments, the pressurizing device comprises a piston extruding mechanism, a single-screw extruding mechanism, a screw pump mechanism, a cogwheel mechanism, a plunger pump mechanism (e.g., a valve-less measuring pump mechanism), or any combination thereof.

In some embodiments, the material supply module comprises one or more temperature sensors for detecting temperature of the molten printing material.

In some embodiments, the system further comprises one or more pressure sensor at the flow distribution plate or inlet of the printing head for detecting pressure of the molten printing material.

In some embodiments, for each micro-screw printing head, an inlet of the micro-screw printing head is aligned based on a topmost thread segment of the threaded stem portion of the micro-screw.

In some embodiments, the one or more rotation motors comprise a plurality of rotation motors, each of the plurality of rotation motors is configured to control rotation speed of a respective micro-screw of the plurality micro-screw printing heads.

In some embodiments, the one or more rotation motors comprise a single rotation motor configured to simultaneously control rotation speed of micro-screws of the plurality of micro-screw printing heads.

In some embodiments, the actuators comprise a pneumatic actuator, a mechanical actuator, an electromagnetic actuator, hydraulic actuator, or an electrical motor.

In some embodiments, the one or more actuators comprise a plurality of electrical motors, each of the plurality of electrical motors configured to control a speed and acceleration of vertical movement of a respective micro-screw and/or travel displacement of a respective micro-screw.

In some embodiments, the one or more electrical motors comprise a single electrical motor configured to simultaneously control a speed and acceleration of vertical movement of the plurality of micro-screws and a travel displacement of the plurality of micro-screws via a push plate mechanism.

In some embodiments, the push plate mechanism comprises a sliding plate, a push plate, and a cam mechanism.

In some embodiments, the cam mechanism is configured to translate horizontal movement of the sliding plate to vertical movement of the push plate.

In some embodiments, the driving module is configured to independently control the one or more actuators and the one or more rotation motors.

In some embodiments, the driving module provide composite control of the one or more actuators and the one or more rotation motors.

In some embodiments, at least one of the one or more rotation motors and the one or more actuators is a stepper motor.

In some embodiments, the system further comprises: a cross connector or cardan shaft used for coupling.

In some embodiments, the flow distribution module comprises a base plate, and wherein the flow distribution plate and the plurality of micro-screw printing heads are placed in the base plate.

In some embodiments, the flow distribution plate comprises an upper plate and a lower plate.

In some embodiments, the base plate and the sleeves of the plurality of micro-screw printing heads are integrated.

In some embodiments, the system further comprises a temperature control system outside the flow distribution plate, wherein the temperature control system comprises a heating device and a cooling device.

In some embodiments, an inlet of the flow distribution plate comprises a sealing mechanism.

In some embodiments, an inlet of a micro-screw printing head comprises a sealing mechanism.

In some embodiments, the sealing mechanism is a sealing ring.

In some embodiments, the plurality of micro-screw printing heads are arranged in a natural-balancing layout or a rheological-balancing layout.

In some embodiments, the flow distribution plate is configured to divide the single flow into 4 flows or 8 flows.

In some embodiments, the flow distribution plate is configured to divide the single flow into 16 flows or 32 flows via one or more 1-to-4 or 1-to-8 sub-plates.

In some embodiments, the flow distribution plate is configured to divide the single flow via a rheological-balancing layout into 3 flows, 5 flows, or 7 flows.

In some embodiments, the printing material is melted by the material supply module at between 50° C. and 400° C.

In some embodiments, the printing material is dispensed by the nozzle at between 50° C. and 400° C.

In some embodiments, the printing material is non-filamentous material, and wherein the printing material has a viscosity of 800 Pa·s or higher when dispensed by the nozzle.

In some embodiments, the printing material comprises a pharmaceutically acceptable material, an inert material, or a combination thereof.

In some embodiments, the system further comprises a printing platform and a controller for causing movement of the printing platform based on a Cartesian coordinate system, a polar coordinate system, or a cylindrical coordinate system.

An exemplary method of additive manufacturing via a plurality of micro-screw printing heads, wherein each micro-screw printing head of the plurality comprises: a micro-screw comprising a threaded stem portion and a conical head portion, and a nozzle, wherein a distal end of the nozzle comprises a conical inner surface and an outlet port for dispensing the print material, comprises: distributing a single flow of molten and pressurized printing material, via a flow distribution plate, into a plurality of flows; causing each of the plurality of flows to reach a micro-screw head of the plurality of micro-screw printing heads; at each micro-screw printing head: raising the micro-screw to open the outlet port of the nozzle; rotating the micro-screw to introduce the respective flow into a groove of the threaded stem portion of the micro-screw, wherein the molten and pressurized printing material is configured to flow toward the distal end of the nozzle; and lowering the micro-screw such that the conical inner surface of the nozzle is in contact with the conical head portion of the micro-screw to close the outlet port and stop dispensing the printing material at the nozzle.

In some embodiments, the method further comprises melting and pressuring the printing material.

In some embodiments, an electrical motor is configured to simultaneously control a speed and acceleration of vertical movement of the plurality of micro-screws and travel displacement of the plurality of micro-screws via a push plate mechanism.

In some embodiments, each of a plurality of electrical motors is configured to control a speed and acceleration of vertical movement of a respective micro-screw and a travel displacement of a respective micro-screw.

In some embodiments, each of a plurality of rotation motors is configured to control rotation speed of a respective micro-screw via a motor adaptor shaft.

In some embodiments, a single rotation motor is configured to simultaneously control rotation speed of micro-screws of the plurality of micro-screw printing heads via one or more gears and belts.

In some embodiments, an actuator and a rotation motor are configured to drive composite movement of the micro-screw.

In some embodiments, the method further comprises: lowering the micro-screw while decreasing a rotation speed of the micro-screw to close the outlet port.

In some embodiments, rotating the micro-screw comprises rotating the micro-screw in a first direction, the method further comprising: rotating the micro-screw in a direction opposite to the first direction to remove an amount of the printing material from the distal end of the nozzle before lowering the micro-screw to close the outlet port.

In some embodiments, the method further comprises: coordinating a movement of a printing platform and an amount of the printing material being dispensed by the nozzle.

In some embodiments, the method further comprises: heating the printing material according to a ladder scheme, wherein the printing material is heated to a first temperature at a material supply module; the printing material is heated to a second temperature at a flow distribution model; and the printing material is heated to a third temperature at each nozzle.

In some embodiments, the first temperature is 50° C., wherein the second temperature is 70° C., and the third temperature is 105° C.

In some embodiments, the method further comprises: measuring the pressure of the printing material at an inlet of micro-screw printing head, or at the flow distribution plate; and controlling the pressure of the printing material via a closed-loop control system.

In some embodiments, the printing material is non-filamentous material, and wherein the printing material has a viscosity of 800 Pa·s or higher when dispensed by the nozzle.

In some embodiments, the plurality of micro-screw printing heads are configured to manufacture pharmaceutical dosage units.

An exemplary additive manufacturing system comprises: a first printing station comprising: a first material supply module for melting and pressurizing a first printing material; a first flow distribution module configured to evenly dividing a single flow of the molten and pressurized first printing material into a first plurality of flows; and a first printing module comprising a set of needle-valve printing heads configured to dispense the first plurality of flows; a second printing station comprising: a second material supply module for melting and pressurizing a second printing material; a second flow distribution module configured to evenly dividing a single flow of the molten and pressurized second printing material into a second plurality of flows; and a second printing module comprising a set of micro-screw printing heads configured to dispense the second plurality of flows.

In some embodiments, the first printing station and the second printing station are configured to print a same batch of products.

In some embodiments, the each of the first and second printing modules is configured to be extendable to accommodate different numbers of printing heads.

In some embodiments, the each of the first and second printing stations is configured to be extendable to accommodate different types of printing modules.

In some embodiments, the system further comprises a set of droplet ejection printing heads, a set of injection printing heads, a set of inkjet printing heads, or any combination thereof.

In some embodiments, a plurality of pharmaceutical tablets is prepared using one or more micro-screw printing heads of an additive manufacturing system by any one of the methods described herein. In some embodiments, all of pharmaceutical tablets with a weight less than or equal to 300 mg of the plurality of pharmaceutical tablets have a relative deviation of less than or equal to ±7.5%. In some embodiments, all of pharmaceutical tablets with a weight more than or equal to 300 mg of the plurality of pharmaceutical tablets have a relative deviation of less than or equal to ±5%.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 10 illustrates exemplary outputs of an exemplary additive manufacturing system, according to some embodiments.

FIG. 11 illustrates exemplary outputs of an exemplary additive manufacturing system, according to some embodiments.

DETAILED DESCRIPTION

Figure 1A:
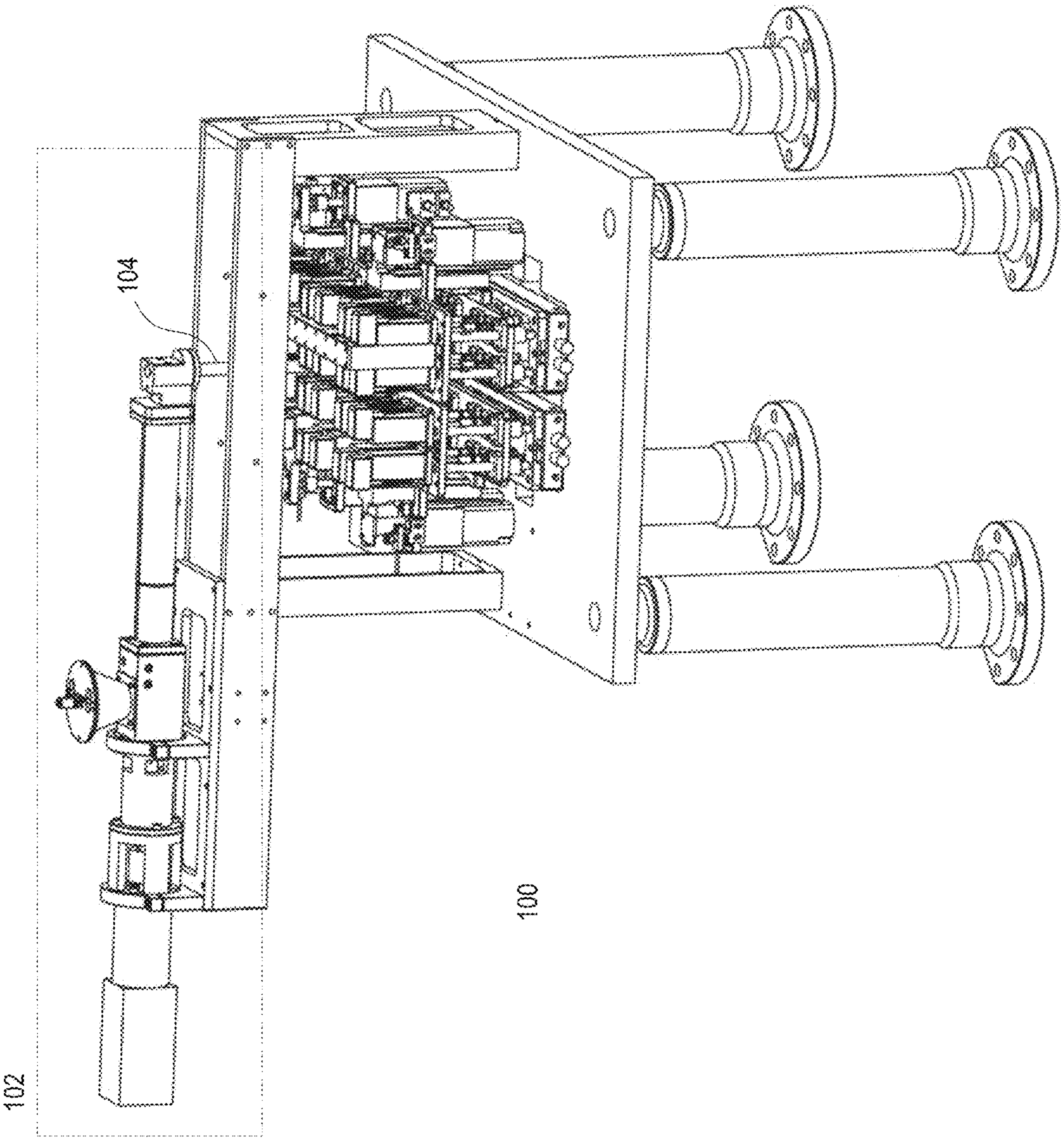
FIG. 1A depicts a schematic view of an exemplary additive manufacturing system, according to some embodiments of a present disclosure.

Described herein are apparatuses, devices, systems, methods, and non-transitory storage media for additive manufacturing (e.g., 3D printing) objects in an accurate, precise, and cost-efficient manner, while maintaining high throughput over time. Embodiments of the present disclosure are well-suited for printing relatively small, compact, and/or intricate objects such as pharmaceutical dosage units (e.g., tablets caplets, printlets), medical devices, implanted stents, etc.

In some embodiments, an exemplary printing system comprises one or more micro-screw printing heads. Each micro-screw printing head allows precise control of the printing material (e.g., pressurized and molten printing material) throughout the printing process (e.g., from when the material is introduced to when the material is dispensed). An exemplary micro-screw printing head can comprise a micro-screw comprising a stem portion and a conical head portion, and the stem portion is threaded throughout its length for volume measurement. The micro-screw printing head can further comprise a nozzle and the nozzle's a distal end comprises a conical inner surface and an outlet port for dispensing the print material. During printing, the printing material can flow through a groove formed by the threads on the stem portion to reach the nozzle. When the micro-screw printing head is in a closed position, the conical inner surface of the nozzle can be configured to be in contact with the conical head portion of the micro-screw to stop dispensing the printing material at the nozzle. In some embodiments, when the micro-screw printing head is in a closed position, the conical head portion of the micro-screw leaves no or very little empty space within the nozzle, thus reducing the amount of residue within the nozzle.

In some embodiments, the printing system further comprises one or more rotation motors(e.g., brushless DC motor, stepper motor, servo motor) for driving a rotating motion of the micro-screw and one or more actuators(e.g., stepper motor, servo motor) for driving a vertical motion of the micro-screw. The actuator can open/close the nozzle and control the speed, acceleration, and travel displacement of the micro-screw (which can cause the nozzle to be completely open, completely closed, or have any amount of partial opening), while the rotation motor can control the speed/amount of printing material dispensed. In some embodiments, the rotation motor and the actuator can be controlled such that the micro-screw can simultaneously rotate and move vertically, rotate only, or move vertically only.

According to the some embodiments, a printing system leverages a flow distribution module for dividing a single flow of printing material(s) into a plurality of flows. The plurality of flows are dispensed by a plurality of nozzles in a precisely controlled manner to 3D print a batch of products (e.g., pharmaceutical dosage units), thus achieving consistency among the units in a single batch and across multiple batches, while maintaining high-throughput.

Further, the printing system comprises an environment (e.g., a closed environment such as a constant temperature oven, an open environment such as a printing platform) for additive manufacturing (e.g., 3D printing) pharmaceutical dosage units. A plurality of close-loop control systems are used to control temperature, pressure, flow, weight, volume, and other relevant parameters in the environment in multiple stages of the manufacturing process. In particular, control systems and methods are implemented to adjust the opening of the nozzles in a precise manner to ensure consistency among outputs of the nozzles. In some embodiments, the inconsistency in unit weight (i.e., inconsistency among weights of units in the same batch) are smaller than 10% (e.g., 1%, 2%, 3%, 4%, 5%, 6%, 7%, 8%, 9%, 9.5%, 10%). In some embodiments, the inconsistency in batch weight (i.e., inconsistency among weights of batches) are smaller than 10% (e.g., 1%, 2%, 3%, 4%, 5%, 6%, 7%, 8%, 9%, 9.5%, 10%).

Based different types of printing materials and the compositions required, the system can adjust the control parameters. This way, the printing system can be used to manufacture a variety of high-quality products.

In some embodiments, the material is non-filamentous (e.g., powder, pellet, or liquid). In some embodiments, the material has a viscosity of 0.01-10000 Pa·s when dispensed from the system. For example, the material has a viscosity of about 100 Pa·s or more when dispensed from the device. In some embodiments, the material has a viscosity of about 400 Pa·s or more when dispensed from the device. In some embodiments, the material has a viscosity of about 800 Pa·s or more when dispensed from the device. In some embodiments, the material melts at about 50° C. to about 400° C. In some embodiments, the material is dispensed from the nozzle at a temperature of about 50° C. to about 400° C. In some embodiments the material is dispensed from the nozzle at a temperature of about 90° C. to about 300° C.

In some embodiments, the printing system comprises multiple printing stations. Each printing station can be used to print a portion (e.g., the shells, the lower halves, the top, high halves) of a batch of products. In some embodiments, the multiple printing stations can work in parallel such that multiple batches of products can be printed at the same time. In some embodiments, different printing stations can include different types of printing heads (e.g., needle-valve printing heads, micro-screw printing heads). The type of printing heads can be chosen based on the type of printing material(s) to be dispensed. In some embodiments, the multi-station system is easy to clean and maintain, thus in compliance with requirements for standardization production of products.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The following description sets forth exemplary methods, parameters, and the like. It should be recognized, however, that such description is not intended as a limitation on the scope of the present disclosure but is instead provided as a description of exemplary embodiments.

Although the following description uses terms “first,” “second,” etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

FIG. 1A depicts a schematic view of an exemplary additive manufacturing system (e.g., 3D printing system) 100, according to some embodiments of the present disclosure. The system 100 comprises material supply module 102 for transporting (e.g., continuously transporting) a set of printing material(s) to 32 printing heads. In some embodiments, some or all of the 32 printing heads are micro-screw printing heads, which are described in detail herein.

The material supply module 102 is configured to preprocess the set of printing material(s) before supplying the printing material(s) via supply channel 104. In some embodiments, the preprocessing comprises melting and pressurizing the printing material(s) based on predetermined settings (e.g., to a target range of temperature, to a target range of pressure). The preprocessed material is then transported via the supply channel 104. In some embodiments, a continuous flow of printing material(s) is supplied via the supply channel 104. In some embodiments, the material supply module 102 can preprocess printing material(s) in a continuous manner. For example, while the system is operating, printing material(s) can be continuously introduced to the material supply module (e.g., at a constant or substantially constant speed) and be preprocessed. In some embodiments, the material supply module comprises a buffering mechanism (e.g., a buffering piston) that can hold the melted and pressurized printing material when the printing heads are not dispensing any printing material (e.g., when the printing stations are swapped underneath the printing heads), as described below.

In some embodiments, the material supply module 102 comprises one or more heater (e.g., heating coil or heating jacket) configured to melt the printing material(s). In some embodiments, the material supply module comprises one or more temperature sensors configured to detect the temperature of the melted or molten printing material(s) within the material supply module 102. In some embodiments, the one or more temperature sensors are connected to a computer system that operates the one or more heaters in response to a temperature reported by the one or more temperature sensors.

In some embodiments, the one or more heaters in the system heat the material within the system to a temperature at or above the melting temperature of the material. In some embodiments, the one or more heaters heats the material to a temperature of about 60° C. or higher, such as about 70° C. or higher, 80° C. or higher, 100° C. or higher, 120° C. or higher, 150° C. or higher, 200° C. or higher, or 250° C. or higher. In some embodiments, the one or more heaters heats the material to a temperature of about 300° C. or lower, such as about 260° C. or lower, 200° C. or lower, 150° C. or lower, 100° C. or lower, or 80° C. or lower. In some embodiments, the one or more heaters heat the material to different temperatures at different locations of the device. For example, in some embodiments, the material is heated to a first temperature within the barrel, a second temperature within the feed channel, and a third temperature within the nozzle, each of which may the same temperature or different temperatures. In some embodiments, the temperature of the material at the nozzle is higher than the feed channel and the channels in the flow distribution plate, for example, by 0-10° C. or 0-20° C. By way of example, a material may be heated to 140° C. in the barrel and the feed channel, but to 160° C. when in the nozzle. The feedback control system allows high precision of the temperature. In some embodiments, the temperature is controlled within 0.1° C. of the target temperature, within 0.2° C. of the target temperature, within 0.5° C. of the target temperature, within 1° C. of the target temperature, or within 10° C. of the target temperature.

The temperature sensors described herein can comprise thermocouple sensors (e.g., type J, type K) or resistance thermometers. In some embodiments, the temperature sensors are configured to measure temperature below 200° C. The pressure sensors described herein comprise piezo-resistance type transducers or strain-gauge sensors. In some embodiments, small-range strain-gauge sensors are used. Depending on the location of the temperature or pressure sensor (e.g., within or in proximity to the material supply module, flow distribution plate, or nozzle), different types of the sensor can be used.

In some embodiments, one or more pressure sensors are connected to a computer system that operates the material supply module to pressurize the printing material(s) to a desired pressure in response to the pressure reported by the pressure sensors. In some embodiments, the pressure of the printing is within about 0.05 MPa of the desired pressure. In some embodiments, the material supply module comprises a piston mechanism, a screw mechanism (single-screw, twin-screw, 3-screw, 4-screw, 5-screw, 8-screw), a screw pump mechanism, a cogwheel mechanism, a plunger pump mechanism (e.g., a valve-less measuring pump mechanism), or any combination thereof. In some embodiments, the one or more heaters comprises a single-piston mechanism, a single-screw mechanism, a twin-screw mechanism, or any combination thereof. In some embodiments, the pressurizing device of the material supply module comprises a piston mechanism, a single-screw mechanism, a screw pump mechanism, a cogwheel mechanism, a plunger pump mechanism (e.g., a valve-less measuring pump mechanism), or any combination thereof.

In some embodiments, the system comprises a pressure close-loop control system, which adjusts the material supply module (e.g., the rotation speed of the screw mechanism) based on pressure readings (e.g., from pressure sensors in the flow distribution plate or nozzle) to achieve and maintain the target pressure. In some embodiments, average of pressure readings from multipole pressure sensors is used.

In some embodiments, the pressure sensors are configured to detect pressure of the material within the nozzle or the feed channel proximal to the nozzle. In some embodiments, pressure sensors are positioned within the nozzle or adjacent to the feed channel and proximal to the nozzle. The pressure sensors can operate with the pressure controller in a closed-loop feedback system to provide approximately constant pressure to the material in the device. For example, when a pressure sensor detects a decrease in pressure, feedback system can signal the pressure controller to increase pressure of the material (e.g., by lowering the piston, increasing air pressure in the barrel, turning the pressure screw, etc.). Similarly, when the pressure sensor detects an increase in pressure, the feedback system can signal the pressure controller to decrease pressure of the material (e.g., by raising the piston, decreasing air pressure in the barrel, turning the pressure screw, etc.). Constant pressure ensures that the melted material in the device is dispensed through the extrusion port of the nozzle at a constant rate when nozzle is in the open position. However, when the nozzle is in a closed position, constant pressure increase (e.g., by raising the piston, decreasing air pressure in the barrel, turning the pressure screw, etc.) may cause leakage of the melted material through the nozzle. Additionally, the feedback system including the pressure sensor and pressure controller keeps an approximately constant pressure in the system when the micro-screw is repositioned from the open position to the closed position, or from the closed position to the open position. This minimizes a "ramp up" in extrusion rate when the sealing needle is positioned in the open position from the closed position because there is no need to ramp up pressure of the material in the system. The feedback system can be operated using a proportional-integral-derivative (PID) controller, a bang-bang controller, a predictive controller, a fuzzy control system, an expert system controller, or any other suitable algorithm In some embodiments, the sample rate of the pressure sensor is about 20 ms or less, such as about 10 ms or less, about 5 ms or less, or about 2 ms or less. In some embodiments, the pressure is controlled within 0.01 MPa of the target pressure, within 0.05 MPa of the target pressure, within 0.1 MPa of the target pressure, within 0.2 MPa of the target pressure, within 0.5 MPa of the target pressure, or within 1 MPa of the target pressure.

Additional details of the material supply modules and a number of other features of the printing system can provided in PCT/CN2018/071965, titled "PRECISION PHARMACEUTICAL 3D PRINTING DEVICE" and WO2018210183, titled "3D PRINTING DEVICE AND METHOD," the content of which is incorporated in its entirety.

Figure 1B:
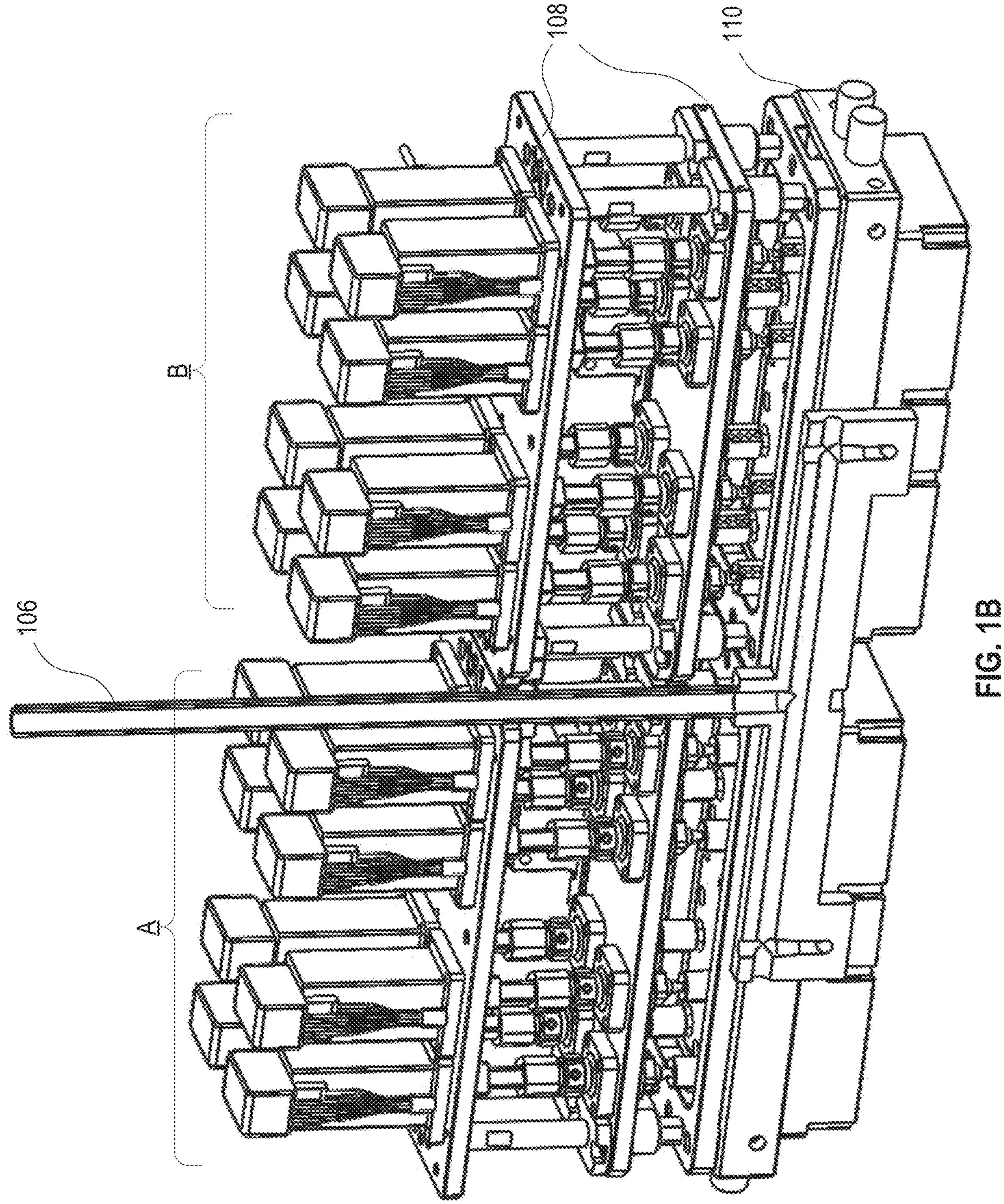
FIG. 1B depicts a schematic view of two exemplary sets of printing heads, in accordance with some embodiments.

FIG. 1B depicts a schematic view of two exemplary sets of printing heads, in accordance with some embodiments. In the depicted example, the two sets of printing heads are Set A and Set B, and each set comprises eight printing heads sharing the same support frame. For example, all eight printing heads of Set B share the same support frame 108. Sets A and B can form part of the additive manufacturing system 100 (FIG. 1A).

In some embodiments, the material supply module 102 of the additive manufacturing system 100 can supply pressurized and melted material to the printing heads in FIG. 1B via supply channel 106. Supply channel 106 can the same as, a part of, or an extension of supply channel 104 of FIG. 1A.

The pressurized and melted printing material can be transported via supply channel 106 to a flow distribution module 110. In some embodiments, a sealing mechanism is provided at the inlet of the flow distribution module 110. The flow distribution module 110 comprises a flow distribution plate having branched channels (not depicted) configured to divide a single flow of the printing materials (e.g., supplied by the material supply module) into a plurality of flows. In some embodiments, the flow distribution module 110 can divide a single flow into 2 flows, which are divided into 4 flows, which are divided into 8 flows, which are divided into 16 flows, which are divided into 32 flows. In some embodiments, the flow distribution module can divide a single flow directly into 2 flows, 3 flows, 4 flows, 5 flows . . . or n flows. In some embodiments, the flow distribution module can divide a single flow into 3 flows, which are divided into 9 flows, which are divided into 27 flows.

In some embodiments, the flow distribution module 110 includes a flow distribution plate, a temperature control mechanism, pressure sensors, temperature sensors, or any combination thereof. The flow distribution plate comprises a single channel connected to the supply channel of the material supply module for receiving a single flow of printing material(s). The flow distribution plate comprises multiple branched channels configured to divide a single flow into multiple flows, which are dispensed via multiple nozzles of multiple printing heads, respectively. Each nozzle is configured to dispense a flow of printing material(s) in a controlled manner (e.g., via a micro-screw mechanism, via a needle-valve mechanism).

Figure 12A:
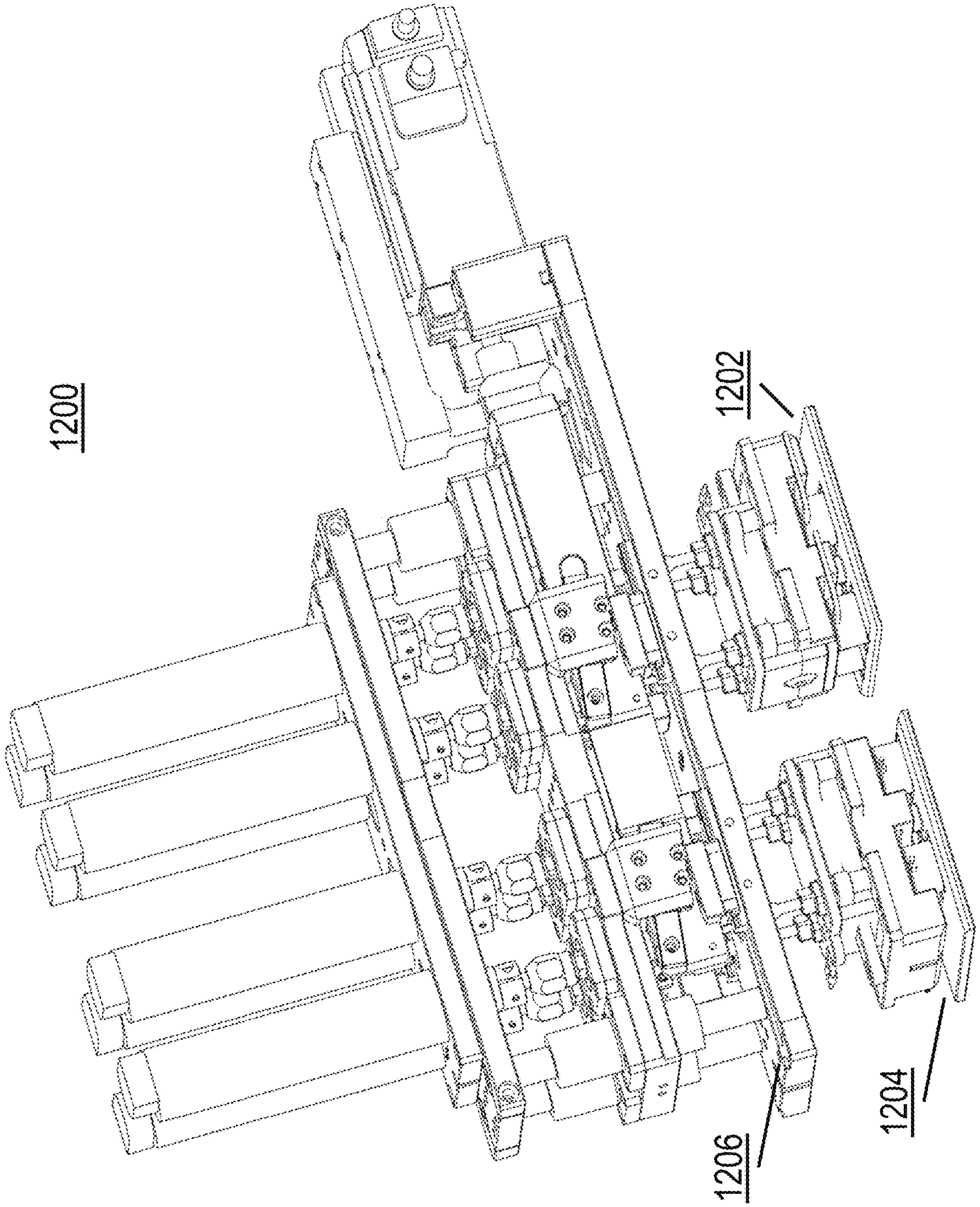
FIG. 12A depicts an exemplary additive manufacturing system (e.g., 3D printing system), according to some embodiments.

FIG. 12A depicts another exemplary additive manufacturing system (e.g., 3D printing system) 1200, according to some embodiments of the present disclosure. The system 1200 comprises two printing-head modules 1202 and 1204. Each printing-head module comprises one or multiple printing heads. In the depicted example, the printing-head module 1202 comprises 4 printing heads for dispensing 4 flows; similarly, the printing-head module 1204 comprises 4 printing heads for dispensing 4 flows. In some embodiments, a printing-head module can comprise any number of printing heads, such as 1, 2, 8, 16 printing heads.

In some embodiments, a printing-head module is a separate unit that can be attached to or detached from an additive manufacturing system. For example, a user can assemble an additive manufacturing system by attaching any number of printing-head modules (e.g. 2, 3, 4, 8, 16) to the system, thus making the number of printing heads easily configurable. As another example, a user can assemble an additive manufacturing system by attaching a single printing-head module to the system.

In some embodiments, a printing-head module can comprise a module-specific flow distribution plate. For example, the printing-head module 1202 can comprise a module-specific flow distribution plate such that the module can be receive a single flow and divide it into 4 flows to be dispensed by the 4 printing heads in the module. With reference to FIG. 12A, the system 1200 comprises a system-wide flow distribution plate 1206 for dividing a single flow into two flows to be received by printing-head modules 1202 and 1204, respectively. Further, each printing-head module has a module-specific flow distribution plate to further divide the received single flow into 4 flows. Thus, the system 1200 supports 8 printing heads for dispensing 8 flows. The printing-head modules 1202 and 1204 can share the same push plate such that the 8 flows can be dispensed simultaneously and in a uniform manner.

Figure 12B:
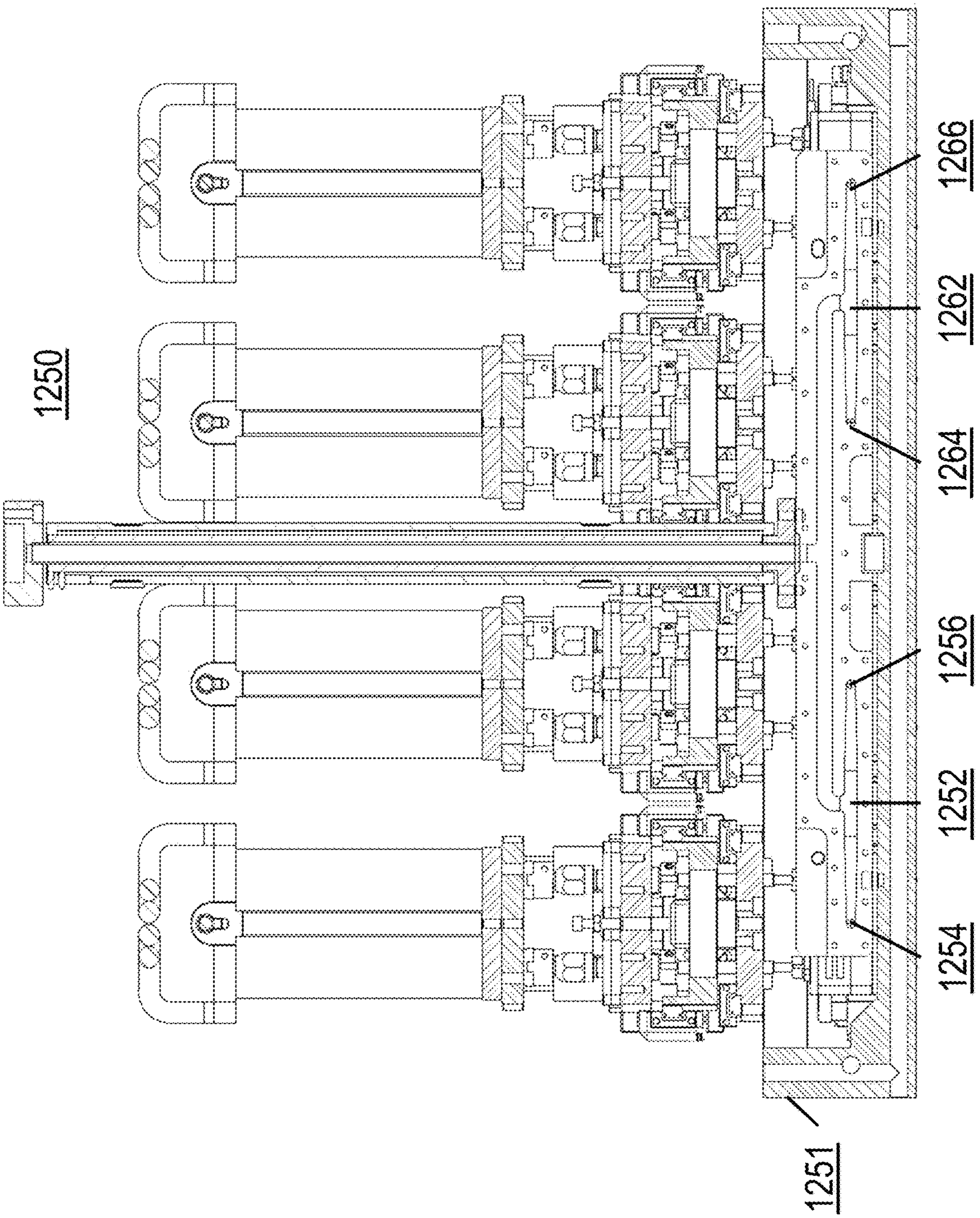
FIG. 12B depicts a cross-sectional view of an exemplary additive manufacturing system (e.g., 3D printing system), according to some embodiments.

FIG. 12B depicts another exemplary additive manufacturing system (e.g., 3D printing system) 1250, according to some embodiments of the present disclosure. The system has a system-wide flow distribution plate 1251. The flow distribution plate 1251 divides a single flow into two flows. Each of the two flows is further divided into two flows at junctures 1252 and 1262, respectively, thus producing 4 flows. Each of the 4 flows is further divided into two flows at junctures 1254, 1256, 1264 and 1266, respectively, thus producing 8 flows. Each of the 8 flows can be provided to a printing-head module. For example, if eight of printing-head module 1202 in FIG. 12A are attached to distribute the 8 flows, respectively, the system would have 32 printing heads in total for dispensing 32 flows.

Figure 1C:
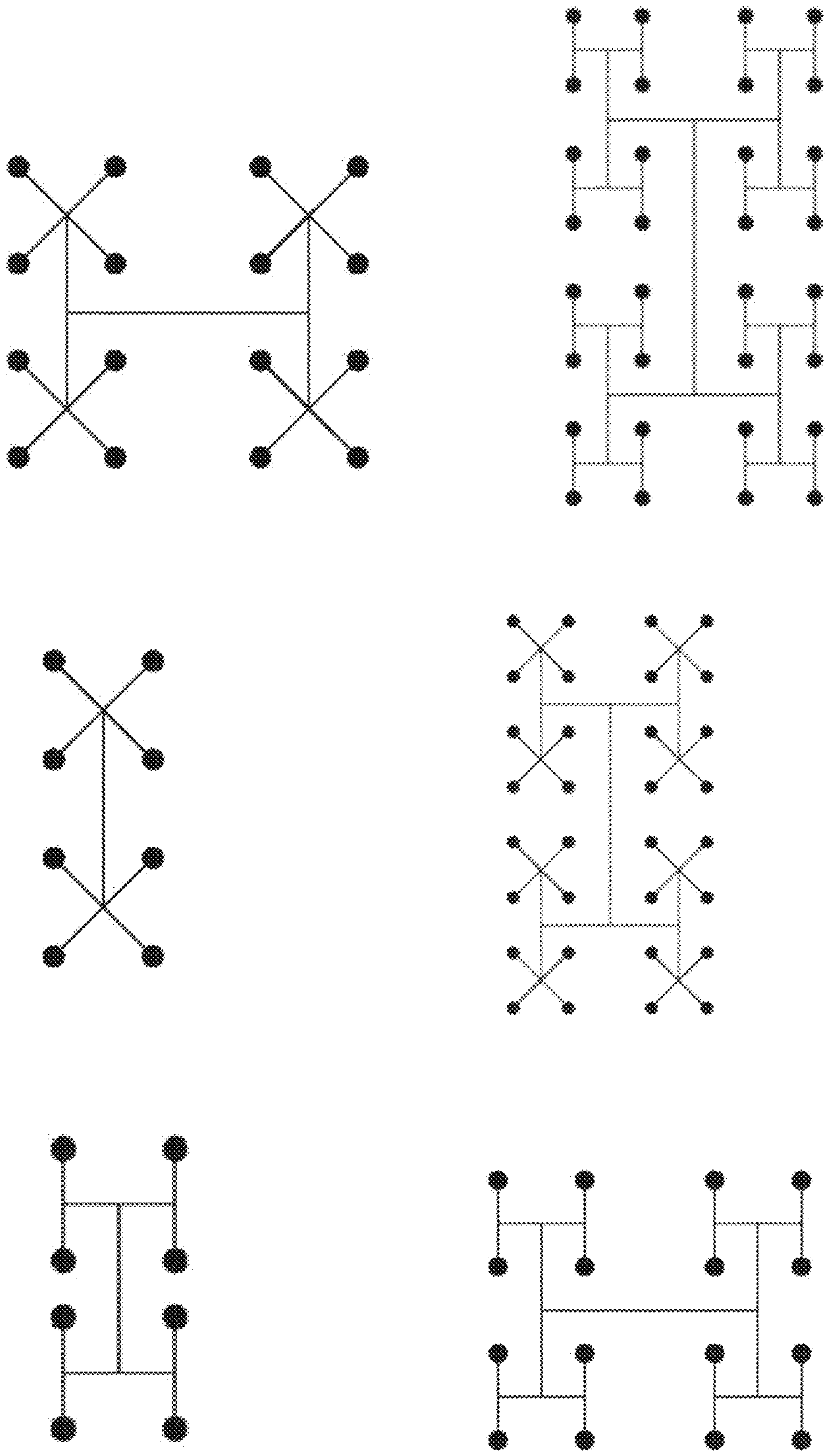
FIG. 1C depicts exemplary configurations of the channels within a flow distribution plate, in accordance with some embodiments.

FIG. 1C depicts exemplary configurations of the channels within a flow distribution plate, in accordance with some embodiments. Each configuration can divide a single flow into multiple flows, which are dispensed at multiple nozzles in an evenly manner (e.g., in terms of weight). Due to the arrangement of channels and junctures within the flow distribution plate, each of the multiple flows traverses a unique flow path which, for example, starts from the top inlet for receiving the single flow from the supply channel into the flow distribution plate and extends to the corresponding nozzle. In some embodiments, the flow paths of the multiple flows are geometrically symmetrical (e.g., of equal length, of equal geometric shape). In some embodiments, the flow paths of the multiple flows are not geometrically symmetrical, but even distribution is achieved by adjusting the diameters of the flow passage along different portions of the flow path. In some embodiments, some or all of these junctures are positioned over the same or substantially the same plane (e.g., a same X-Y plane). In some embodiments, some or all of these junctures are positioned over different planes (e.g., different X-Y planes).

In some embodiments, the nozzles can be arranged in a natural-balancing layout or a rheological-balancing layout. The flow distribution plate can be configured to divide the single flow into 4 flows or 8 flows. It can be configured to divide the single flow into 16 flows or 32 flows via one or more 1-to-4 or 1-to-8 sub-plates. It can be configured to divide the single flow via a rheological-balancing layout into 3 flows, 5 flows, or 7 flows.

In some embodiments, the flow distribution plate can be split (e.g., horizontally, vertically, and/or diagonally) into a plurality of components. For example, the flow distribution plate can comprise an upper plate and a lower plate. The plurality of components can be held together by screws. When taken apart, each individual component exposes the inner surfaces of one or more channels and junctures in the flow distribution plate, and thus allows for easier cleaning of the channels and junctures of the flow distribution plate.

In some embodiments, in operation, the pressure within the channels of the flow distribution plate can be between 0-20 MPa (e.g., 0-5 MPa, 0-10 MPa, 0-20 MPa). The amount of time needed for material to traverse the flow distribution plate can be between 5 minutes to 5 hours. In some embodiments, the dispensed volume at a nozzle can be between 0.1-10 μL/s (e.g., 2-3 μL/s).

In some embodiments, the flow distribution plate comprises a temperature control mechanism for maintaining the temperature of the flow distribution plate at a desired level. In some embodiments, the temperature control mechanism comprises one or more heaters and one or more coolers, which are configured to operate in conjunction to maintain the internal temperature of the flow distribution plate.

The one or more heaters can be arranged within the flow distribution plate or in proximity to the flow distribution plate. For example, the flow distribution plate comprises internal slots for accommodating one or more heaters (e.g., wires, plates) made of materials of high thermal conductivity. The one or more heating wires extend through the internal slots inside the flow distribution plate. The flow distribution plate can comprise multiple rows and columns of internal slots to allow for an even distribution of heating wires throughout the plate such that temperature inside the plate is maintained in a consistent manner.

The one or more cooling tubes can be arranged within the flow distribution plate or in proximity to the flow distribution plate. In some embodiments, the temperature control device achieves cooling via water circulation. For example, a pair of cooling plates, each having internal channels for running water, are positioned above and below the flow distribution plate, thus allowing water flow, air, coolant, etc., to occur in close proximity to the flow distribution plate to regulate the temperature of the plate. In some embodiments, the flow distribution plate comprises internal slots for accommodating one or more coolers within the flow distribution plate. For example, the flow distribution plate and the cooling plates above and below the flow distribution plate are all equipped with inlets for receiving coolant.

In some embodiments, the flow distribution plate comprises one or more temperature sensors connected to a computer system that operates the one or more heaters and coolers in response to a temperature reported by the one or more temperature sensors.

In some embodiments, the flow distribution plate comprises one or more pressure sensors configured to detect the pressure of the printing materials within the channels of the flow distribution plate. In some embodiments, the pressure sensors are positioned in proximity to the flow distribution plate (e.g., around the corners, around the peripherals, around the center) or within the channels of the flow distribution plate. In some embodiments, strain sensors are used.

With reference to FIGS. 1A and 1B, each of the plurality of flows can be dispensed by a corresponding printing head of the system 100, respectively, to generate an object (e.g., 3D-printed pharmaceutical dosage unit) over a printing platform, as described in detail below.

Figure 2A:
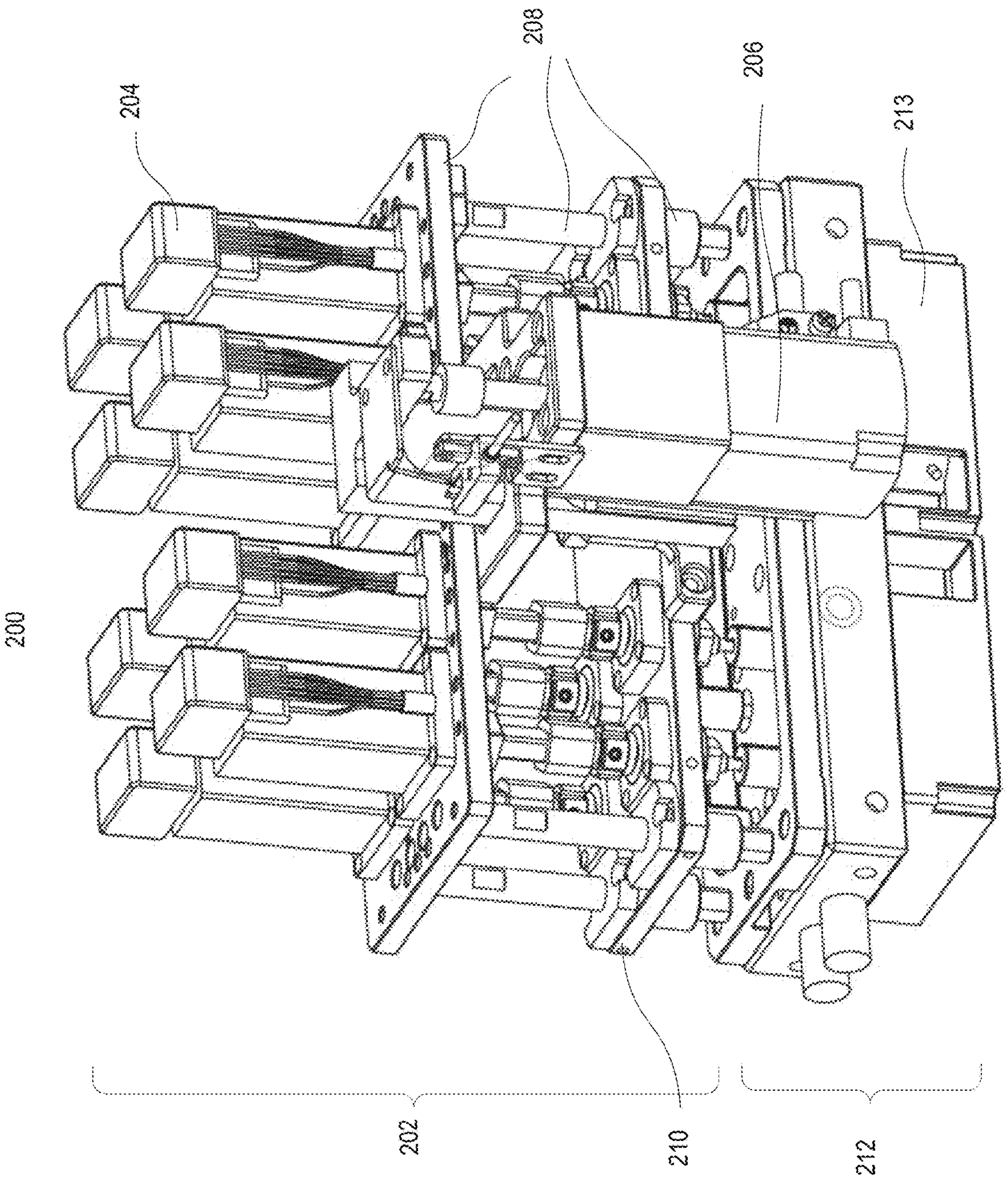
FIG. 2A depicts a schematic view of an exemplary set of printing heads, in accordance with some embodiments.
Figure 2B:
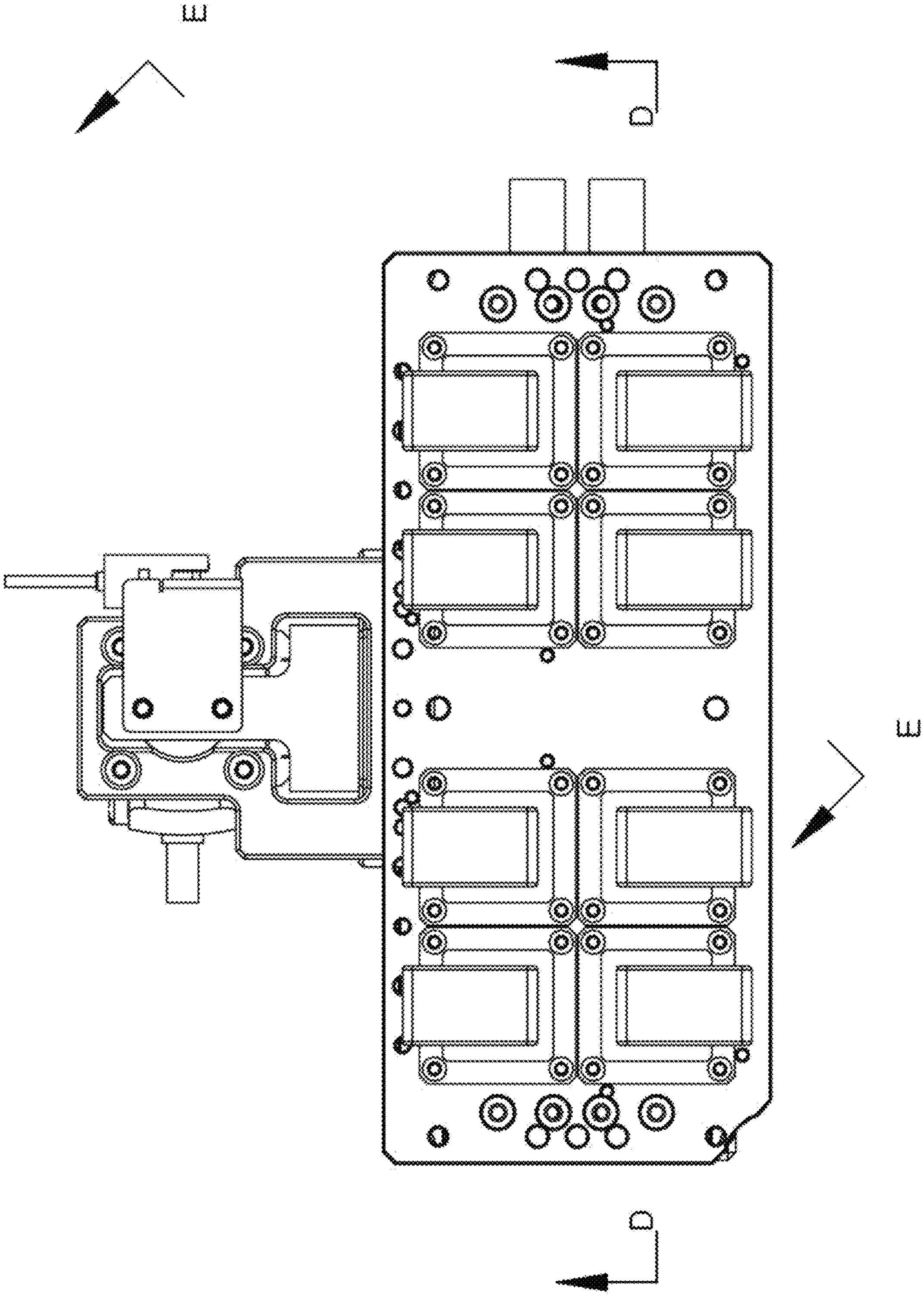
FIG. 2B depicts a top-down view of the set 200, in accordance with some embodiments.

FIG. 2A depicts a schematic view of an exemplary set 200 of printing heads, in accordance with some embodiments. In the depicted example, the set comprises eight printing heads sharing the same support frame 208. The set 200 can be any one of Sets A and B, which can form part of the additive manufacturing system 100 (FIG. 1A). A top-down view of the set 200 is provided in FIG. 2B.

With reference to FIG. 2A, the set of printing heads comprises a driving module 202. In the depicted example, the driving module 202 comprises eight rotation motors 204. Eight rotation motors are configured to control the eight printing heads, respectively. Specifically, each rotation motor can control the rotation speed of a corresponding micro-screw of a micro-screw printing head. In some embodiments, the driving module 202 comprises a rotation motor shared among multiple (e.g., 8) printing heads and the rotation motor can simultaneously drive the rotation of multiple micro-screws (e.g., via gears and/or belts).

The driving module further comprises an actuator 206. In the depicted example, the actuator is configured to simultaneously control the eight printing heads. Specifically, the actuator can cause a speed and acceleration of vertical movement of the micro-screws, thus controlling the opening/closing of the nozzles and travel displacement of the micro-screw (which can cause the nozzle to be completely open, completely closed, or have any amount of partial opening). In the depicted example, the actuator can simultaneously control eight micro-screws via a push plate mechanism 210, which can translate the movement of the actuator to all eight micro-screws at once. In some embodiments, a separate actuator can be assigned to each micro-screw printing head.

In some embodiments, the motors and actuators in the driving module include one or more stepper motors. The driving module can independently control the actuator(s) and the rotation motor(s), or provide composite control of the actuator(s) and the rotation motor(s). For example, the driving module can independently control the rotation motor (e.g., the rotation speed) without driving the actuator such that the micro-screw rotates without traveling vertically. The driving module can provide composite control by simultaneously control the rotation motor (e.g., the rotation speed) and the actuator (e.g., the traveling speed) such that the micro-screw and rotate while moving vertically.

In some embodiments, the actuator can be is a pneumatic actuator, a mechanical actuator, an electromagnetic actuator, hydraulic actuator, or an electrical motor. The electrical motor can control the vertical movement of the micro-screw (e.g., speed, acceleration) and the displacement of the micro-screw.

The set of printing heads further comprises a flow distribution module 212. The flow distribution module comprises a base plate 213. In some embodiments, the flow distribution plate and at least portions of the micro-screw printing heads are housed within the base plate. In the depicted example, the flow distribution module can divide a single flow of printing material into multiple flows. The flow distribution module 212 can be a part of a larger flow distribution module (e.g., the distribution module shown in FIGS. 1A and 1B). For example, the flow distribution module 212 can include a sub-plate, which forms a part of a larger flow distribution plate. The flow distribution module of FIGS. 1A and 1B can first divide a single flow (e.g., transported by the supply channel 104) into four flows, and one of the four flows is further divided into 8 flows to be dispensed by the eight printing heads in FIG. 2A.

Figure 2C:
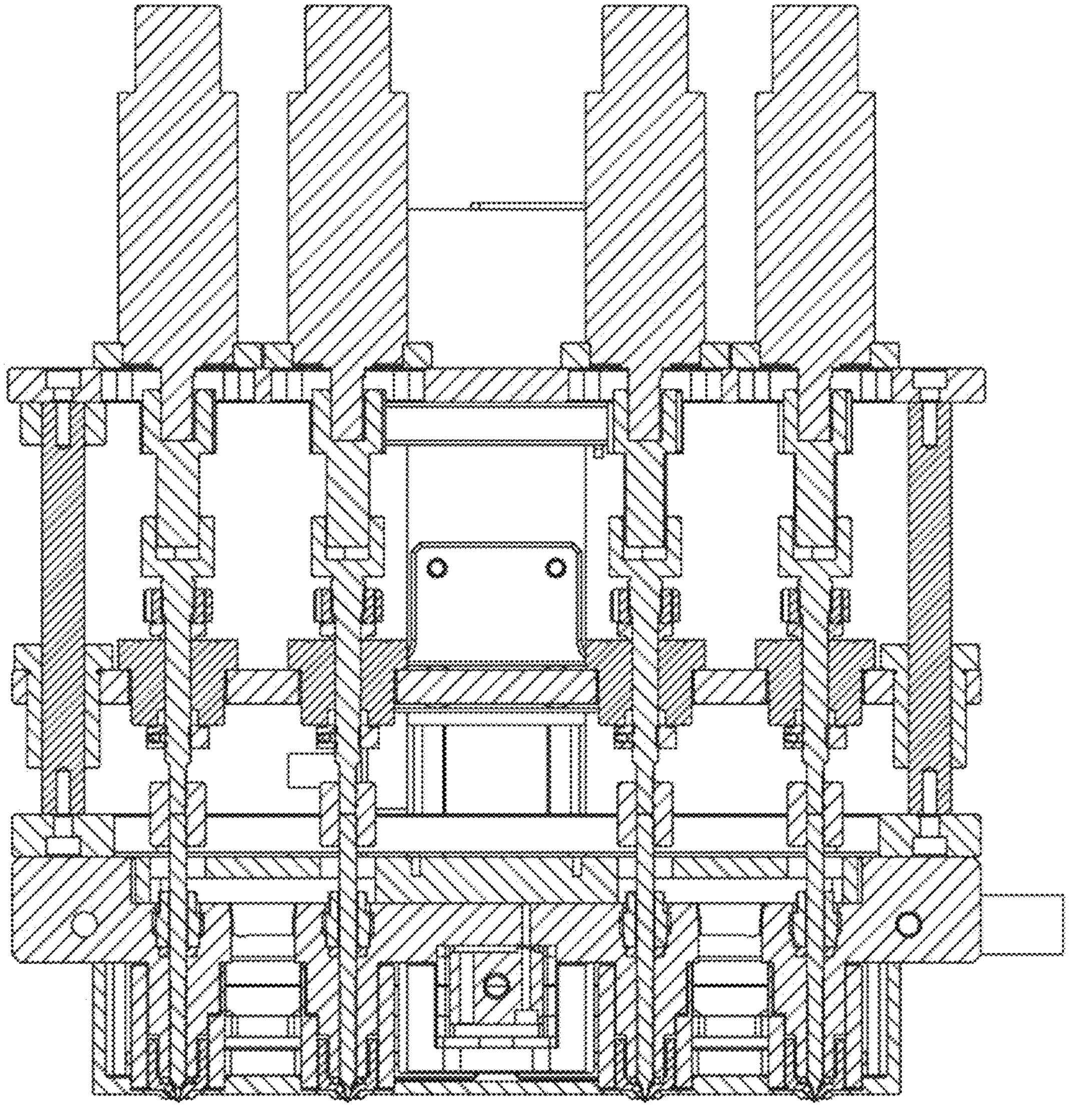
FIG. 2C depicts a cross-sectional view of the set of eight printing heads, in accordance with some embodiments.
Figure 2D:
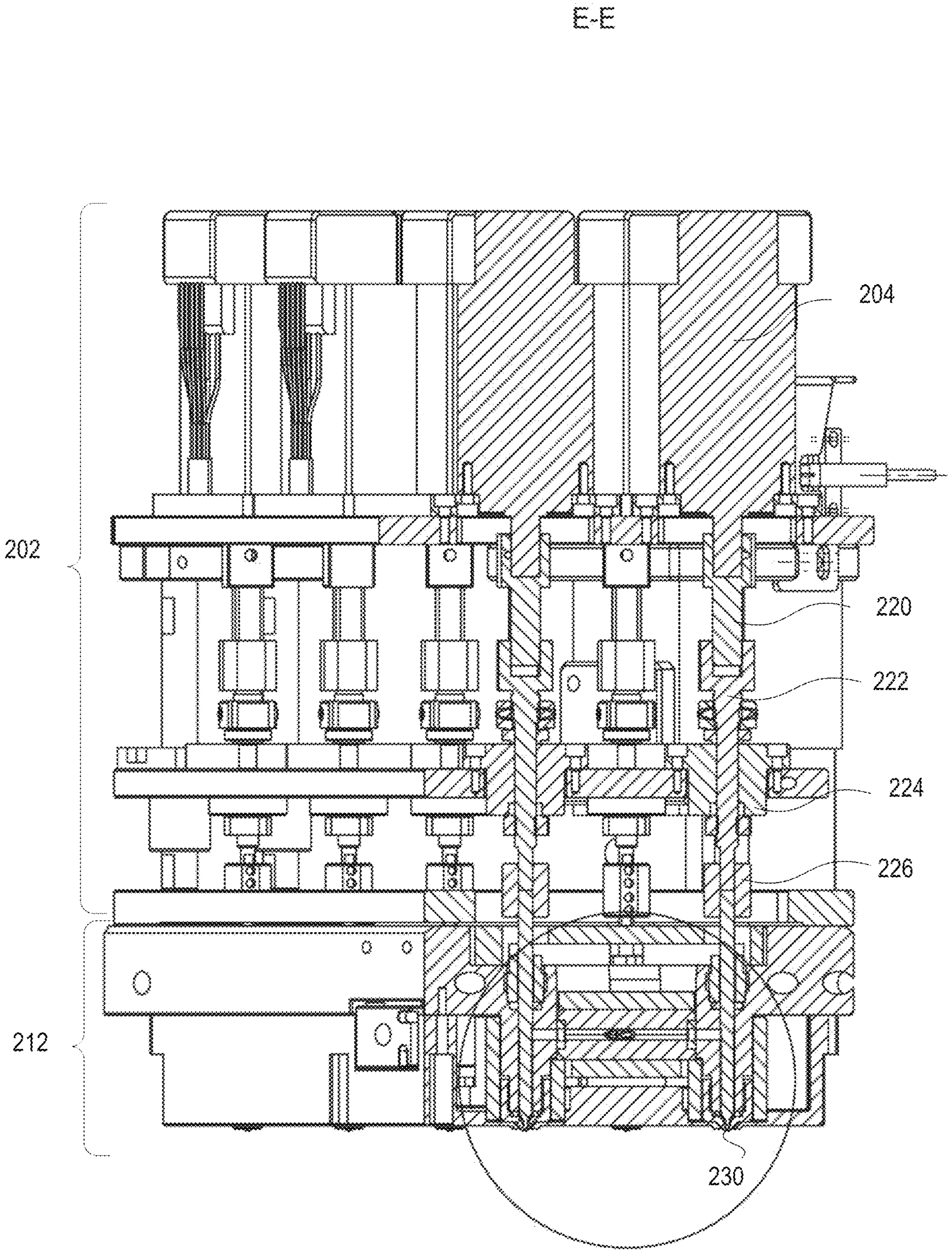
FIG. 2D depicts a cross-sectional view of the set of eight printing heads, in accordance with some embodiments.

FIGS. 2C and 2D each depicts a cross-sectional view of the set of eight printing heads 200, in accordance with some embodiments. With reference to FIG. 2D, the rotation motor 204 is configured to control a rotation speed of a micro-screw 230 via a motor adaptor shaft 220. The actuator is configured to control a speed and acceleration of vertical movement and a travel displacement of the micro-screw (which can cause the nozzle to be completely open, completely closed, or have any amount of partial opening) via a conversion shaft 222. The conversion shaft 222 is coupled to the micro-screw 230 via the conversion shaft coupling 226 and bearing seat 224.

Figure 2E:
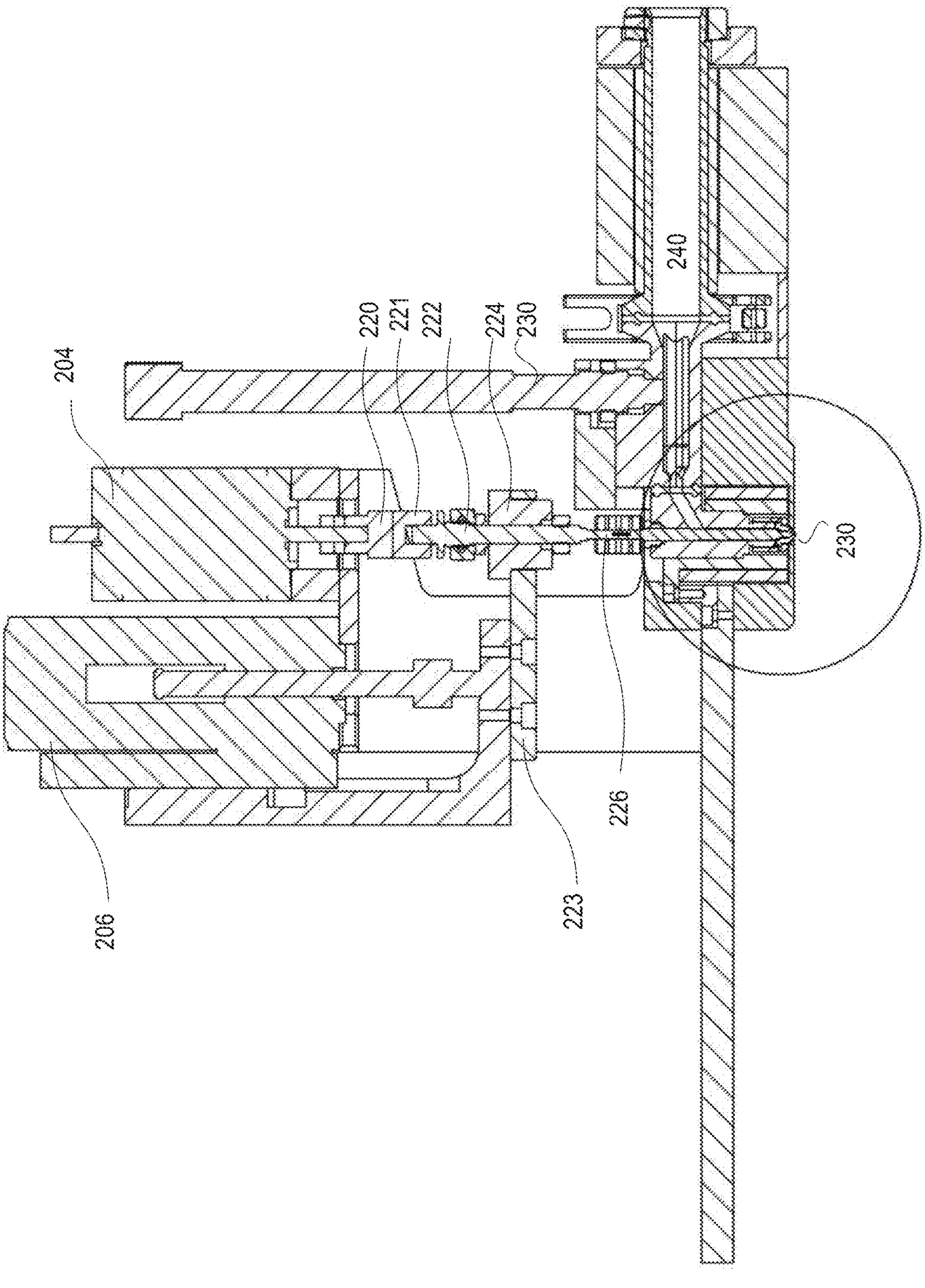
FIG. 2E depicts a cross-sectional view of a single printing head, in accordance with some embodiments.

FIG. 2E depicts a cross-sectional view of a single printing head, in accordance with some embodiments. The rotation motor 204 is configured to control a rotation speed of the micro-screw 230 via the motor adaptor shaft 220. The motor adaptor shaft 220 is coupled to the micro-screw 230 with a connecting mechanism such that the rotation motor can drive the micro-screw. In the depicted example, the connecting mechanism is cross connector 221. The connecting mechanism provides some flexibility for the coupling between the micro-screw and the motor adaptor shaft on the z-axis and permits a small amount of misalignment between the micro-screw and the motor adaptor shaft.

The actuator 206 is configured to control a speed of vertical movement and a position of the micro-screw via a conversion shaft 222. The conversion shaft 222 is coupled with the micro-screw 230 via the connecting shaft adaptor plate 223, the conversion shaft coupling 226, and bearing seat 224. In the depicted example, a flow of printing material is transported via channel 240 and dispensed by the micro-screw 230.

Figure 2F:
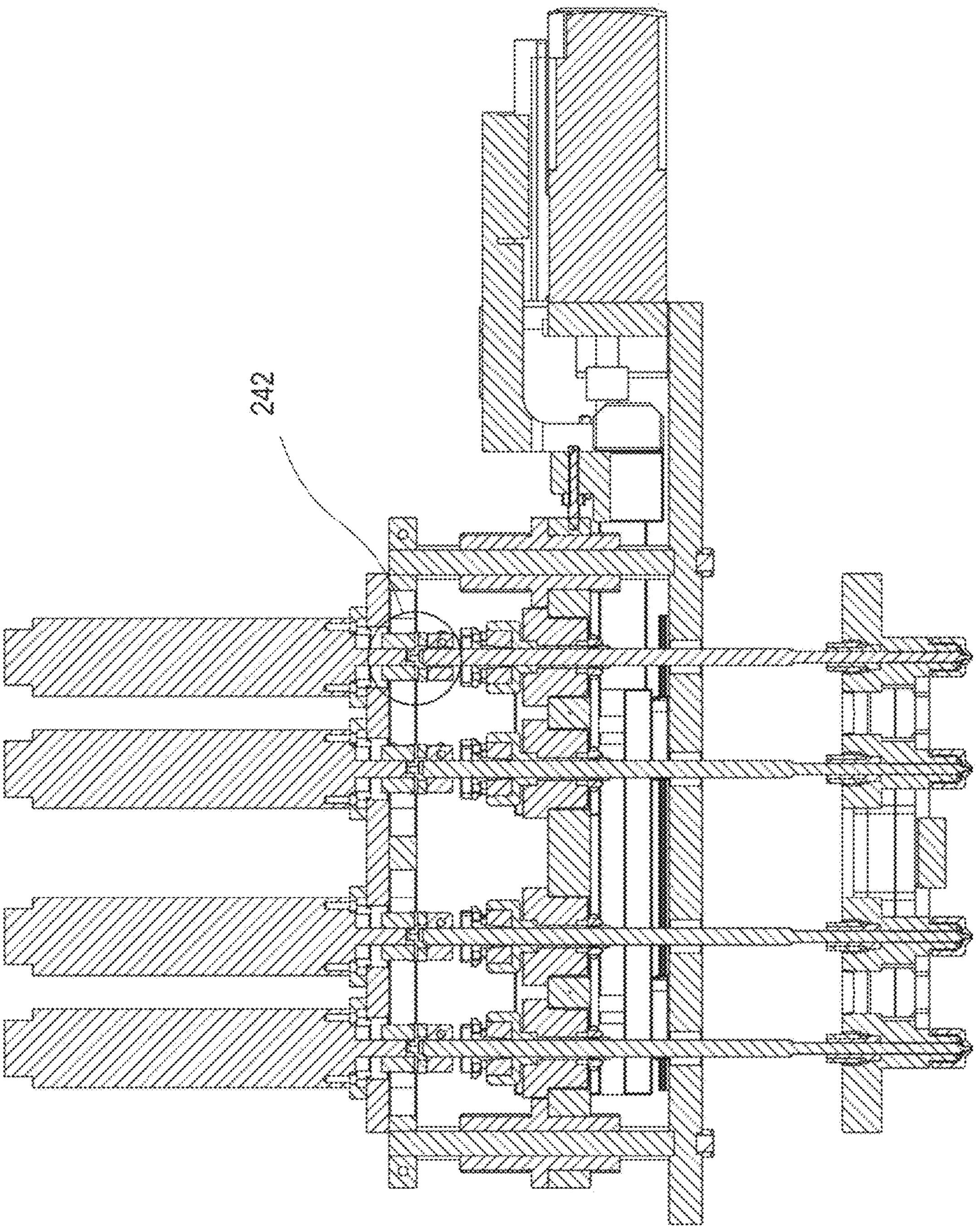
FIG. 2F depicts a cross-sectional view of four printing heads, in accordance with some embodiments.

FIG. 2F depicts a cross-sectional view of four printing heads, in accordance with some embodiments. For each printing head, a cross connector (e.g., 242) is used to connect the rotation motor and the micro-screw. The cross connector provides some flexibility for the coupling between the micro-screw and the motor adaptor shaft on the z-axis. The cross connector also eliminates the need to perfectly concentrically align the motor adaptor shaft and the micro-screw, permitting a small amount of misalignment between the micro-screw and the motor adaptor shaft. In some embodiments, the connecting mechanism can include a universal connector.

The embodiment in FIG. 2F differs from the embodiment in FIG. 2D (in which the conversion shaft 222 and the micro-screw 230 are two separate components coupled together via the conversion shaft coupling 226). In the embodiment in FIG. 2F, the conversion shaft and the micro-screw are integrated as a single component, thus reducing the number of coupling components needed, improving the robustness of the assembly, and reducing misalignment when the system is in operation.

Figure 3A:
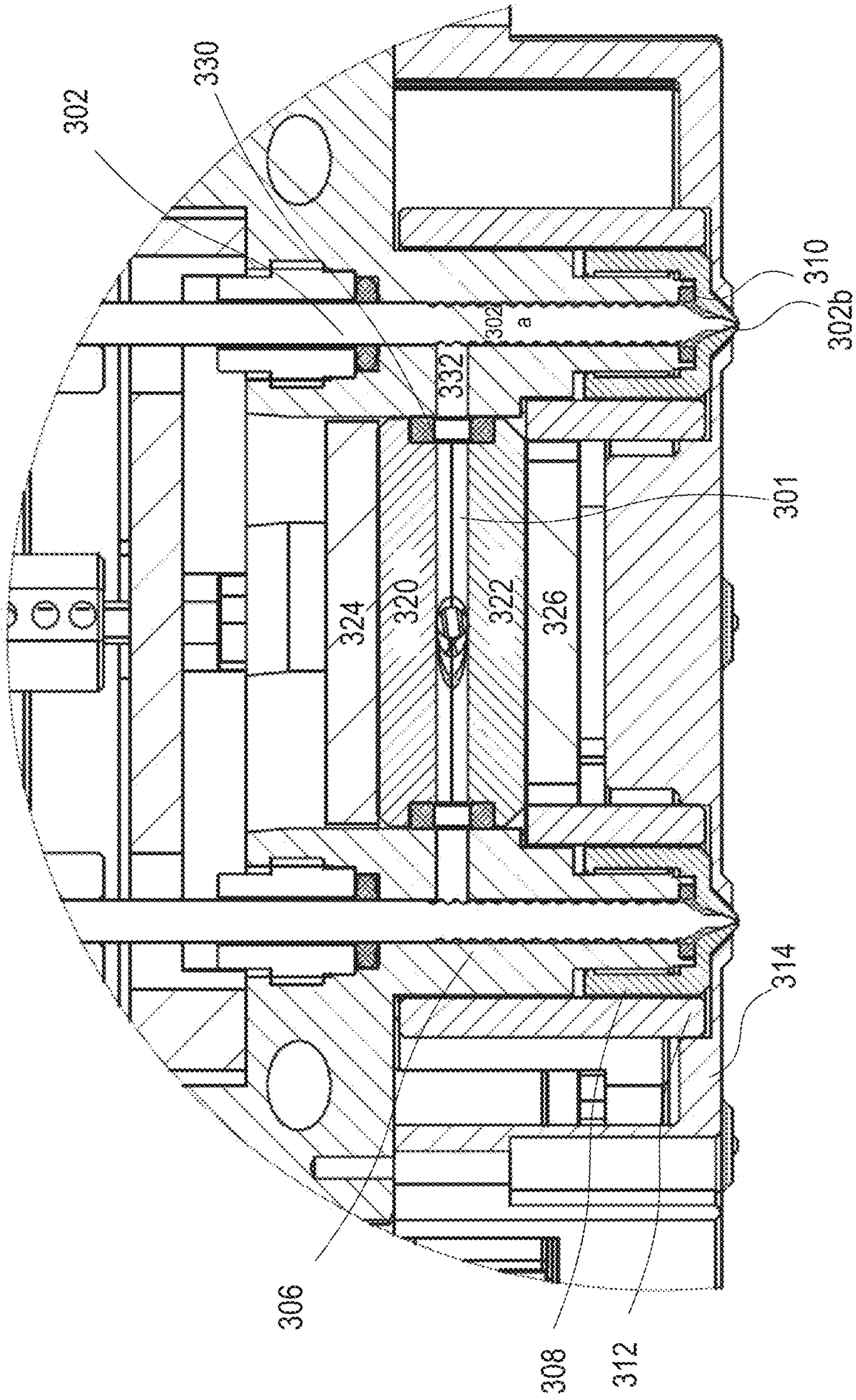
FIG. 3A depicts an exemplary cross-sectional view of two micro-screw printing heads A and B, in accordance with some embodiments.

FIG. 3A depicts an exemplary cross-sectional view of two micro-screw printing heads, in accordance with some embodiments. The two micro-screw printing heads can be the two heads indicated in FIG. 2D, in some embodiments. In the depicted example, the two printing heads are identical.

With reference to FIG. 3A, each micro-screw printing head comprises a micro-screw (e.g., micro-screw 302). The micro-screw comprises a non-threaded stem portion, a threaded stem portion (e.g., 302*a*) under the non-threaded stem portion and a conical head portion (e.g., 302*b*). The threaded stem portion is threaded throughout its length for the purpose of volume measurement (i.e., metering). In some embodiments, the threaded stem portion is threaded with identical threads throughout its length, thus forming a uniform groove (e.g., in width, depth, and curvature) that travels from the top of the threaded portion to the distal end of the threaded portion.

Each micro-screw printing head further comprises a sleeve (e.g., sleeve 306) and a nozzle (e.g., nozzle 308). The sleeve forms a vertical chamber through which the micro-screw can move vertically and rotate. As depicted in FIG. 3A, the distal end of the nozzle comprises a conical inner surface and an outlet port for dispensing the print material. To close the outlet port, the micro-screw can be driven (e.g., via an actuator) downward until the conical head portion of the micro-screw is in contact with the conical inner surface of the nozzle. This way, the outlet port is sealed and the nozzle stops dispensing the printing material.

In some embodiments, the micro-screw printing head can comprise a z-axis positioning sealing ring 310 (or inlet sealing ring) between the sleeve 306 and the nozzle 308. The z-axis positioning scaling ring is configured to adjust a vertical position of the nozzle to ensure that the nozzle's height is consistent with the other nozzles of the system. In some embodiments, the sealing ring can be made of fluororubber, polytetrafluoroethylene, Teflon, iglidur, or any combination thereof.

In some embodiments, each micro-screw printing head further comprises a heating sleeve (e.g., 312), a heat insulating sleeve (e.g., 314), a temperature sensor, a pressure sensor, or any combination thereof. In some embodiments, a heating sleeve, a heating insulating sleeve, a temperature sensor, and/or a pressure sensor can be placed at or around each nozzle.

In some embodiments, one or more heaters are placed outside the nozzles. The one or more heaters can comprise a heating sleeve, a heating ring, a heating rod, or any combination thereof. The heating power can be between 30-50 W.

In some embodiments, the heat insulating sleeve comprises insulating material (e.g., PEEK, Polytetrafluoroethylene).

With reference to FIG. 3A, a flow distribution module comprises a flow distribution plate, which in turn comprises the flow channel 301. The flow channel 301 transports two flows of melted and pressurized printing material into the two micro-screw printing heads, respectively. A runner scaling ring 330 is positioned at the flow channel 301 around the inlet 332 of the micro-screw printing head to provide extra sealing between the inlet of the micro-screw printing head and the flow distribution plate.

In the depicted example, the flow distribution plate comprises an upper plate 320 and a lower plate 322. The two plates can be held together by screws. When taken apart, each individual plate exposes the inner surfaces of one or more channels and junctures in the flow distribution plate, and thus allows for easier cleaning of the channels and junctures of the flow distribution plate. The flow distribution module can comprise temperature control systems, such as upper heating plate 324 and 326.

Figure 3B:
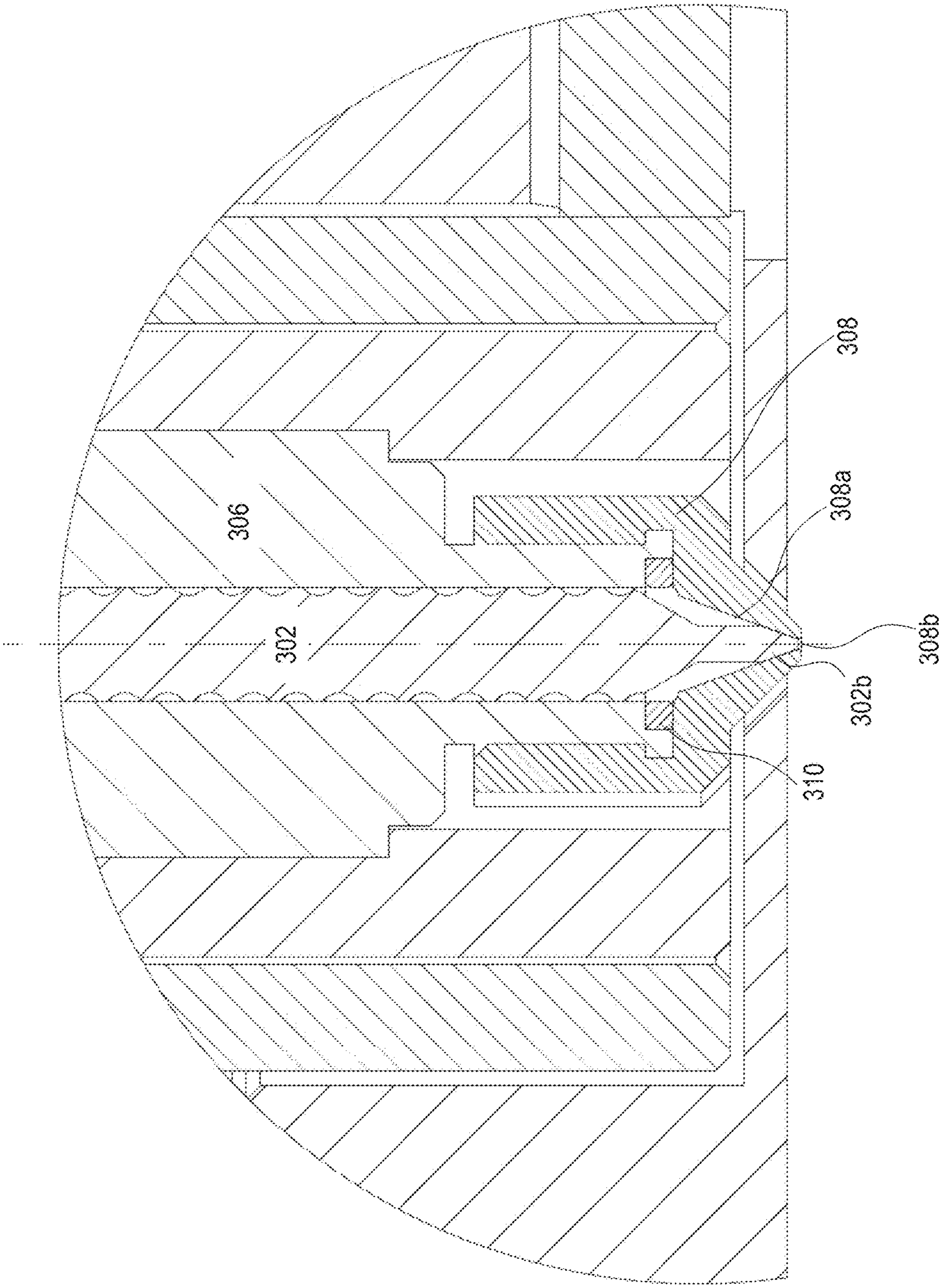
FIG. 3B depicts a cross-sectional view of an exemplary micro-screw printing head, in accordance with some embodiments.

FIG. 3B depicts a cross-sectional view of an exemplary micro-screw printing head, in accordance with some embodiments. The micro-screw printing head comprises a micro-screw 302. The micro-screw 302 comprises a threaded stem portion and a conical head portion 302*b* below the stem portion. The threaded stem portion is threaded throughout its length for the purpose of volume measurement. In some embodiments, the threaded stem portion is threaded with identical threads throughout its length, thus forming a uniform groove (e.g., in width, curvature, depth) that travels from the top of the threaded stem portion to the distal end of the threaded stem portion.

Figure 3C:
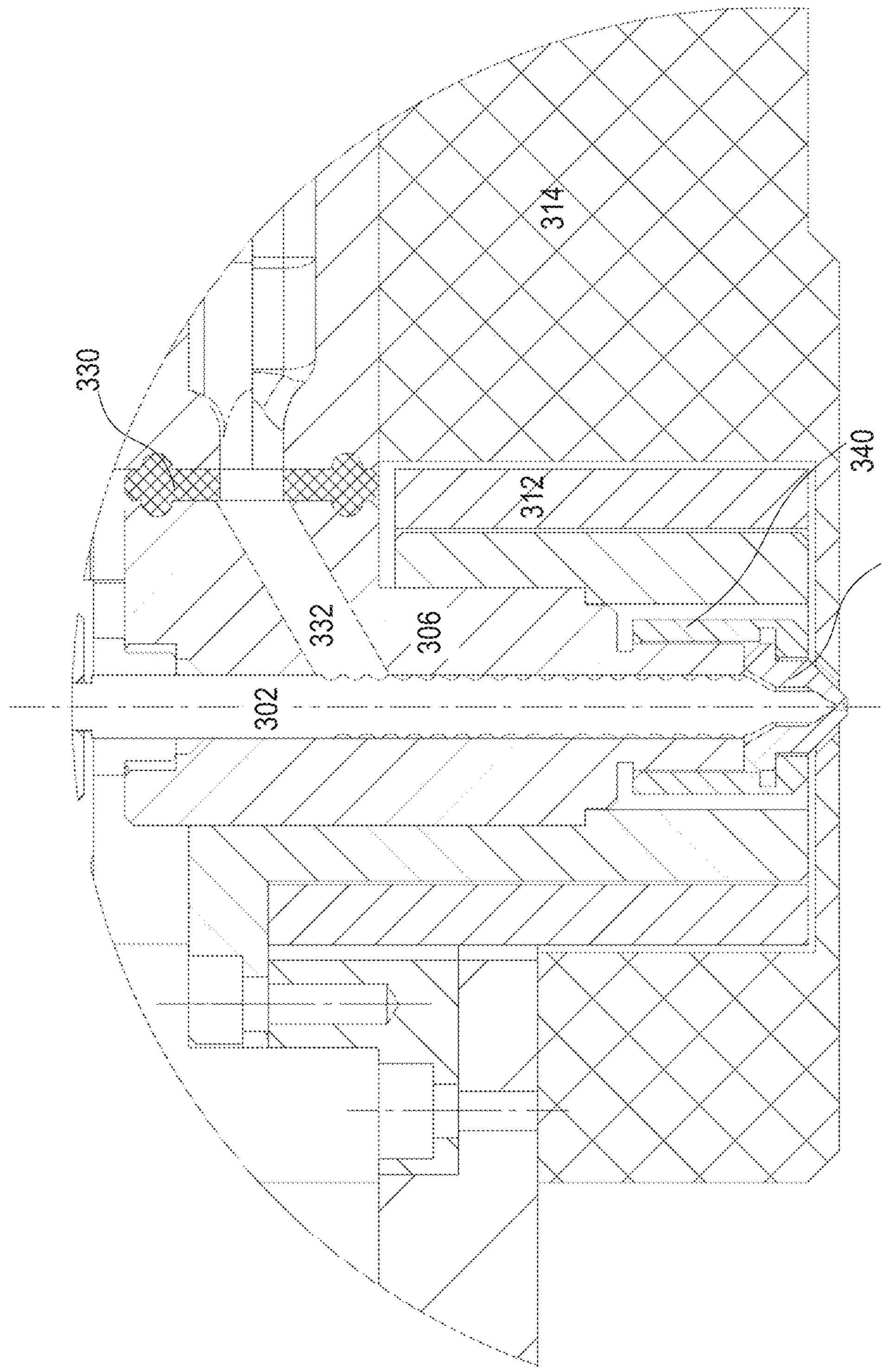
FIG. 3C depicts a cross-sectional view of another exemplary micro-screw printing head, in accordance with some embodiments.
Figure 3D:
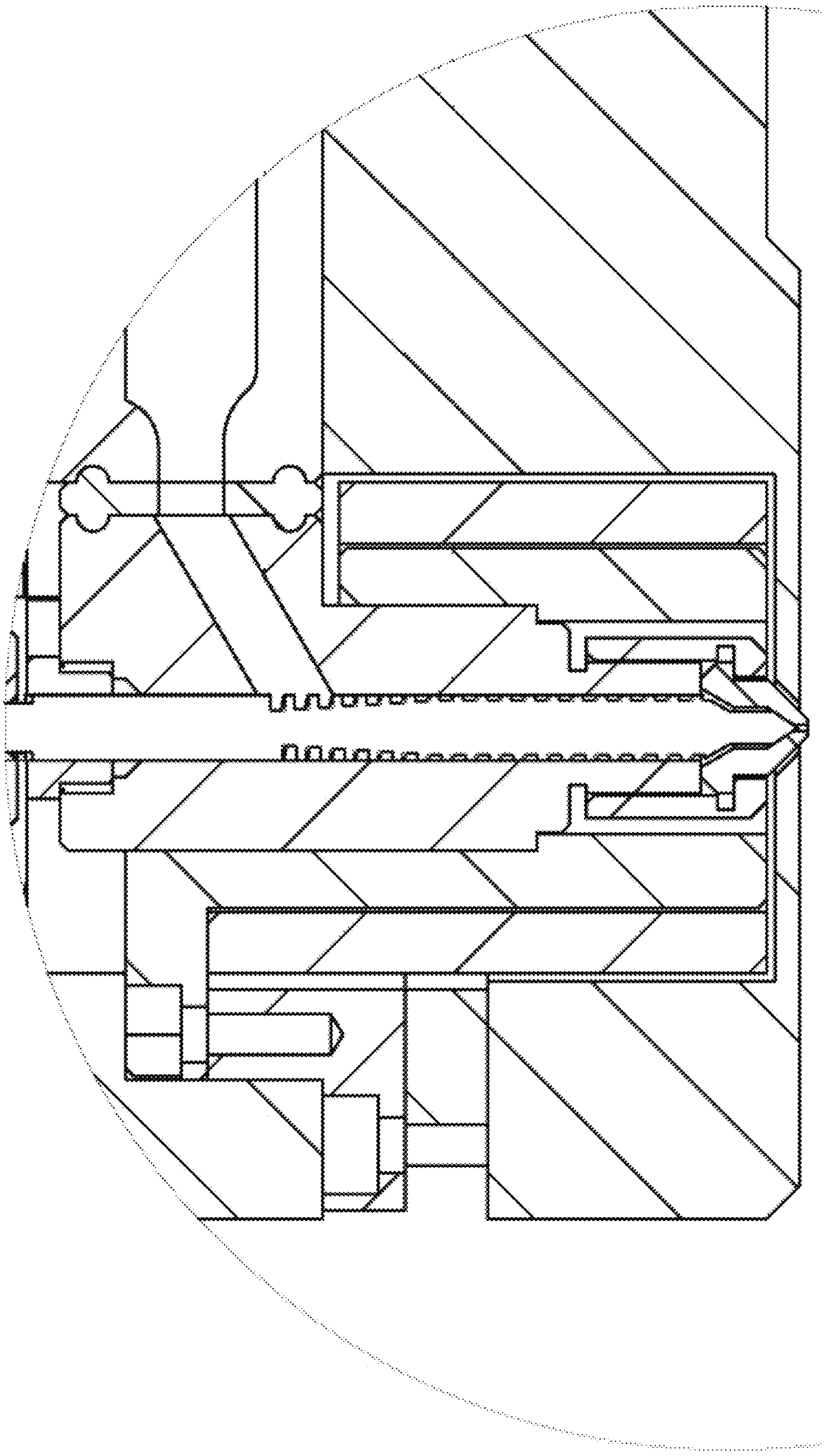
FIG. 3D depicts a cross-sectional view of an exemplary micro-screw printing head, in accordance with some embodiments.

FIG. 3D depicts a cross-sectional view of an exemplary micro-screw printing head, in accordance with some embodiments. In the depicted example, the threads on the stem portion of the micro-screw are rectangular-shaped. Further, the threads are of varying widths along the length of the threaded stem portion. As depicted, the rectangular threads toward the upper portion of the threaded stem portion are wider than the threads toward the lower portion of the threaded stem. The depicted configuration can expedite the input of the printing material, thus improving the printing speed. It should be appreciated that the threads can be of any shape, such as semi-circular, cylindrical, conical, trapezoidal, rectangular, and triangular.

The micro-screw printing head further comprises a sleeve 306 and a nozzle 308. The sleeve comprises a vertical chamber through which the micro-screw can move vertically and rotate. As depicted in FIG. 3B, the distal end of the nozzle 308 comprises a conical inner surface 308*a* and an outlet port 308*b* for dispensing the print material. To close the outlet port, the micro-screw 302 can be driven (e.g., via an actuator) downward until the conical head portion 302*b* of the micro-screw is in contact with the conical inner surface 308*b* of the nozzle. Accordingly, the nozzle stops dispensing the printing material.

In some embodiments, the micro-screw printing head can comprise a z-axis positioning sealing ring 310 between the sleeve 306 and the nozzle 308. The z-axis positioning sealing ring is configured to adjust a vertical position of the nozzle.

In the depicted example in FIG. 3B, when the micro-screw printing heading is in a closed position, a space exists within the nozzle between the conical inner surface 309*a* and the distal end of the micro-screw. In some embodiments, the distal end of the micro-screw can conform to the nozzle such that there is little or no space in the closed position, as shown in FIG. 3C. This way, little or no residue can remain in the nozzle when the nozzle is closed, thus allowing the dispensed volume to be precisely tracked.

FIG. 3C depicts a cross-sectional view of another exemplary micro-screw printing head, in accordance with some embodiments. The distal end of the micro-screw can conform to the nozzle such that, when the micro-screw printing heading is in a closed position, little or no space exists within the nozzle/sleeve between the conical inner surface 309*a* and the micro-screw. A fixed nut is configured to couple the nozzle. As shown, the micro-screw printing head further comprises an inlet sealing ring 330, an inlet 332, a micro-screw sleeve 306, a heat insulating sleeve 314, a heating sleeve 312, as described above. As shown in FIG. 3A, the micro-screw sleeve 306 is integrated with the base plate such that the X-Y position of the nozzle can be fixed. In some embodiments, the inlet sealing ring comprises polytetrafluoroethylene. The inlet sealing ring 330 provides a flexible coupling mechanism between the flow distribution plate and the sleeve to prevent X-Y movement of the nozzle due to expansion of the flow distribution plate (e.g., due to heat).

In some embodiments, the taper angle of the conical head portion of the micro-screw (e.g., 302) is smaller than or equal to the taper angle formed by the conical inner surface of the nozzle. In some embodiments, the taper angle of the conical head portion of the micro-screw is equal to or smaller than 60° (e.g., 40°). In some embodiments, the ratio between the taper angle formed by the conical inner surface of the nozzle and the taper angle of the conical head portion equals to or is between 1:1 and 4:1, equals to or is between 1:1 and 3:1, or equals to or is between 1:1 and 2:1.

In some embodiments, the conical head portion of the micro-screw is of a frustoconical shape or a truncated cone shape. In some embodiments, the conical head portion of the micro-screw is configured to fit the conical inner surface of the nozzle via one or more matching patterns or structures. For example, the conical head portion can comprise a cone and a cylinder. As shown in FIG. 3B, the conical head portion comprises a first truncated cone, a cylinder and a second truncated cone. As shown in FIG. 3B, the bottom surface of the threaded stem portion of the micro-screw and the top surface of the first truncated cone have a same first diameter, the bottom surface of the first truncated cone and the top surface of the cylinder have a same second diameter, the bottom surface of the cylinder and the top surface of the second truncated cone have the same second diameter, and the bottom surface of the second truncated cone and the nozzle have a same third diameter. As shown in FIG. 3C, the conical head portion comprises a truncated cone, a cylinder and a cone.

In some embodiments, the length of the threaded stem portion of the micro-screw equals to or is between 10 and 80 mm (e.g., 10 mm, 15 mm, 20 mm, 25 mm, 30 mm, 35 mm, 40 mm, 45 mm, 50 mm, 55 mm, 60 mm, 70 mm).

In some embodiments, a diameter of the threaded stem portion of the micro-screw equals to or is between 1 and 10 mm (e.g., 1 mm, 1.5 mm, 2 mm, 2.5 mm, 3 mm, 3.5 mm, 4 mm, 4.5 mm, 5 mm, 5.5 mm, 6 mm).

In some embodiments, a diameter of the nozzle opening is between 0.1 and 1 mm.

In some embodiments, the micro-screw can be raised to any desirable height to open the nozzle. For example, the micro-screw can be raised by 0.05-1 mm (e.g., 0.1 mm, 0.2 mm, 0.3 mm).

After the nozzle is open, the rotation speed can be set to a constant speed to dispense the printing material at a constant volume. The rotation speed can be chosen based on the desired output volume (e.g., 1-260 rotations/min, 3-5 rotations/min, 6-12 rotations/min, 13-20 rotations/min).

In some embodiments, the printing material is melted by the material supply module at between 50° C. and 400° C. In some embodiments, the printing material is dispensed by the nozzle at between 50° C. and 400° C. In some embodiments, the printing material is non-filamentous material, and the printing material has a viscosity of 800 Pa·s or higher when dispensed by the nozzle. In some embodiments, the printing material comprises a pharmaceutically acceptable material, an inert material, or a combination thereof.

Figure 14A:
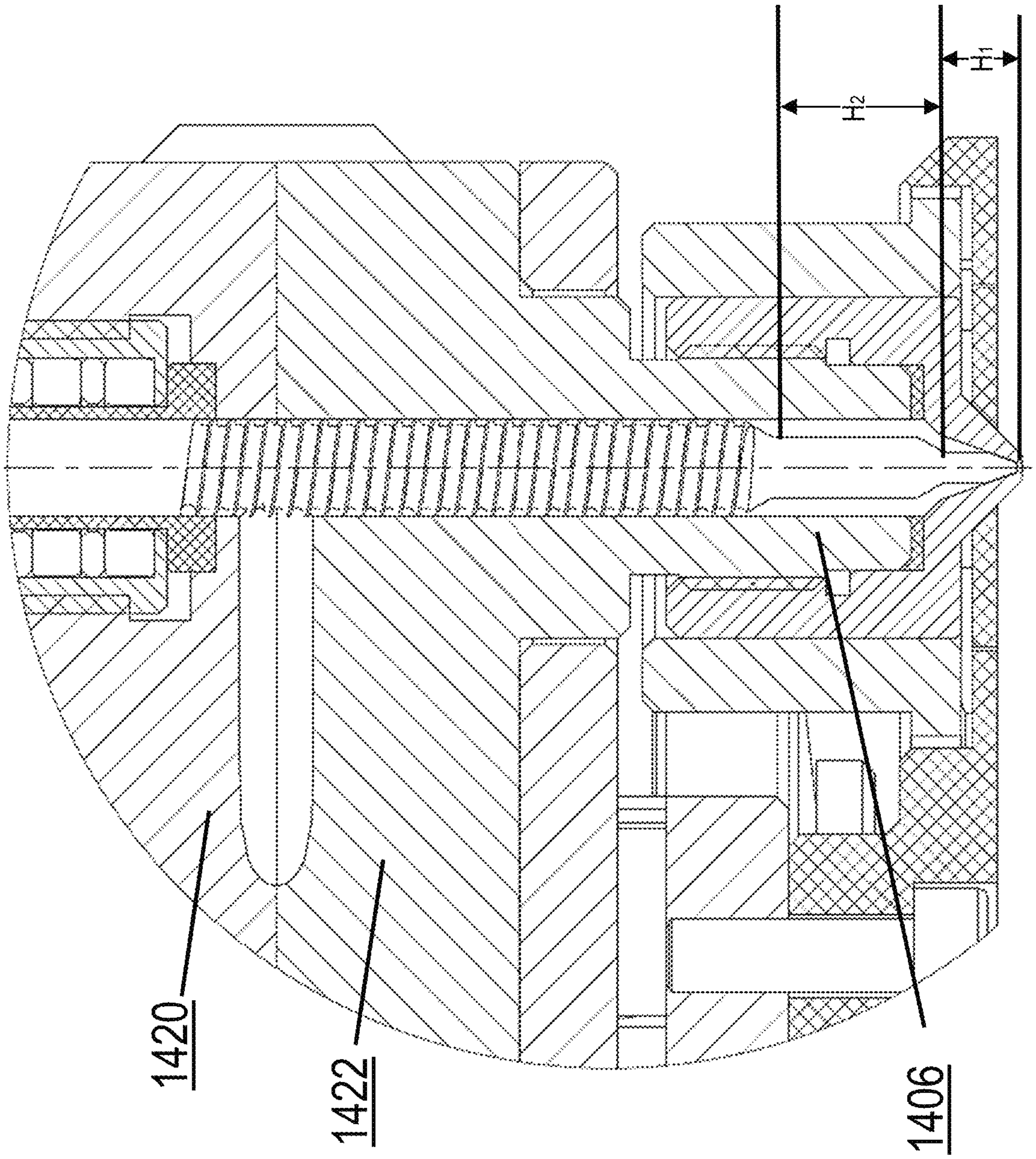
FIG. 14A depicts a cross-sectional view of an exemplary micro-screw printing head, in accordance with some embodiments.
Figure 14B:
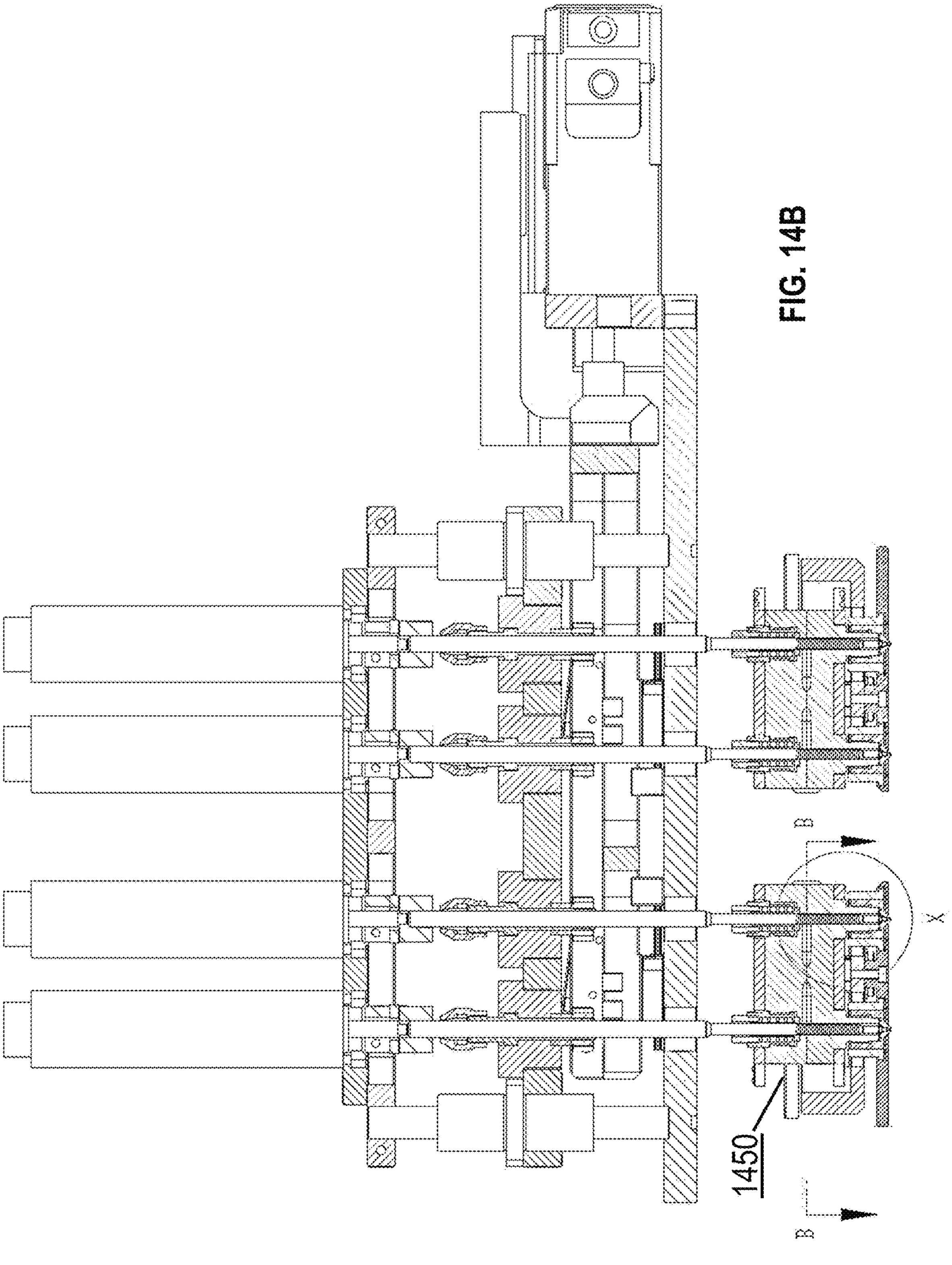
FIG. 14B depicts an exemplary additive manufacturing system (e.g., 3D printing system), according to some embodiments of the present disclosure.

FIG. 14A depicts a cross-sectional view of another exemplary micro-screw printing head, in accordance with some embodiments. In some embodiments, the micro-screw printing head is a part of a printing-head module (e.g., module 1450 in FIG. 14B). As described herein with reference to FIGS. 12A-12B, the printing-head module can be a separate unit that can be attached to and detached from an addictive manufacturing system. Further, each module can have its own module-specific flow distribution plate.

With reference to FIG. 14A, the module-specific distribution plate comprises an upper plate 1420 and a lower plate 1422. In operation, the upper plate and the lower plate are coupled together to form channels to divide and distribute flows. In some embodiments, the lower plate 1422, the sleeve 1406, and the base plate are integrated together and do not move relative to each other, thus fixing the X-Y position of the nozzle. The integration provides better sealing and prevent leakage within the module (e.g., from the flow channels).

With reference to FIG. 14A, the micro-screw comprises three portions: a threaded stem portion, a slimmed unthreaded middle portion (marked as "H2"), and a distal portion comprising a conical head (marked as "H1"). In some embodiments, the distal portion can be identical in size and shape to the corresponding portion depicted in FIG. 3B. In some embodiments, the ratio between H2 and H1 can be between 1 and 5. The slimmed unthreaded middle portion introduces some elasticity to the micro-screw and allows the distal end of the micro-screw to be deformed slightly along the X direction and the Y direction when pressure is applied. Thus, when the conical head comes in contact with the nozzle, the conical head can be better aligned with the nozzle, thus provide better sealing and preventing leakage.

The micro-screws described herein may be threaded in any manner, such as single-threaded or multi-threaded. A multi-threaded screw can have a double-start thread, a triple-start thread, a quad-start thread, and so on. The multiple starts can allow the printing material to be introduced (e.g., by the rotation of the micro-screw) into the printing head at a more consistent rate, thus improving the quality and precision of the printed product.

Figure 4:
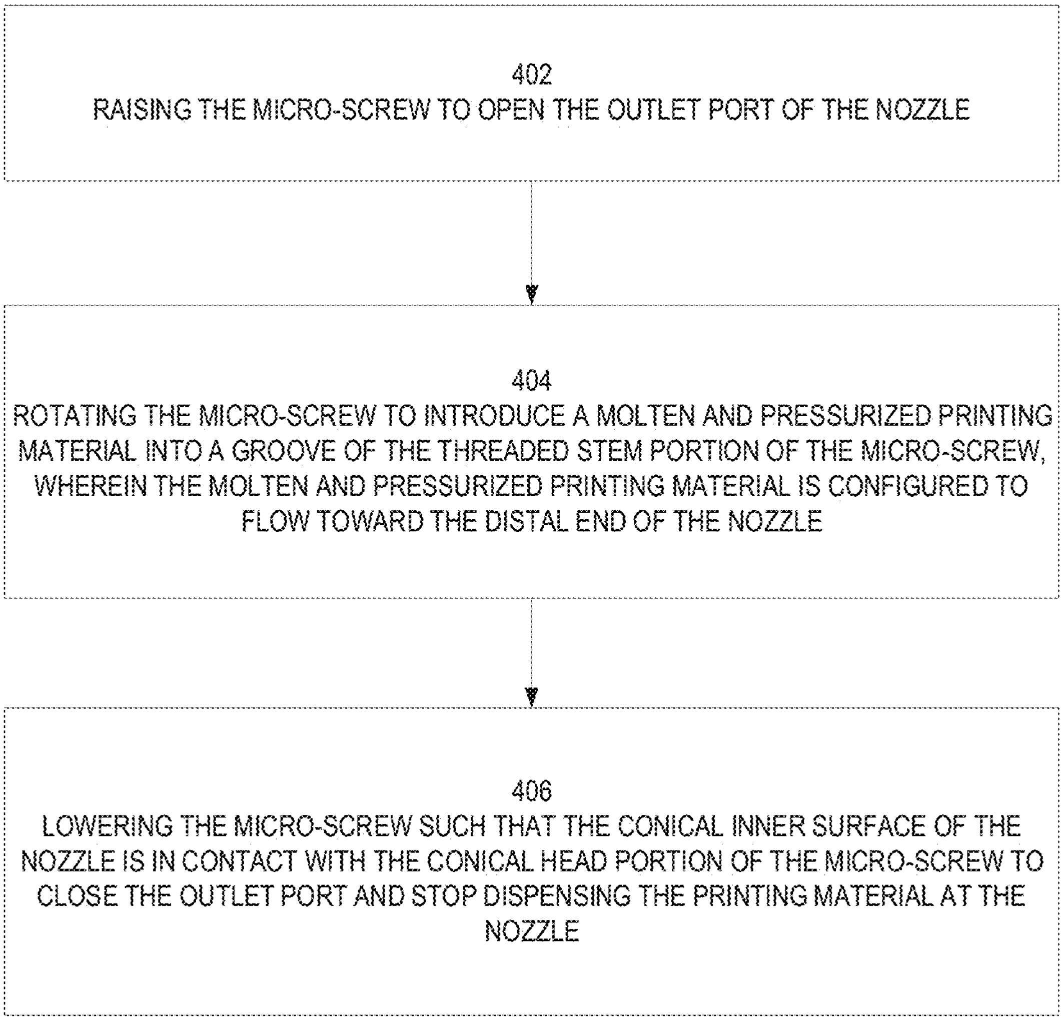
FIG. 4 depicts an exemplary method for 3D printing, in accordance with some embodiments.

FIG. 4 depicts an exemplary process 400 of additive manufacturing via a micro-screw printing head, in accordance with some embodiments. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 402, the system raises a micro-screw to open the outlet port of the nozzle. At block 404, the system rotates the micro-screw (e.g., via a rotation motor) to introduce a molten and pressurized printing material into a groove of the threaded stem portion of the micro-screw. For example, as depicted in FIG. 3C, a flow of molten and pressurized printing material can be introduced via inlet 332. In some embodiments, the vertical position of the micro-screw is aligned with the inlet such that the topmost thread segment is exposed at the inlet. This way, the printing material can be fed into the beginning of the groove formed by the threads, preventing the printing material from traveling upward within the groove and becoming residue within the groove.

The molten and pressurized printing material is configured to flow via the groove toward the distal end of the nozzle. The faster the micro-screw rotates, the more printing material is dispensed at the nozzle. Based on the rotation speed and the known size of the groove, the system can calculate the volume of the printing material dispensed. As discussed above, the entire threaded stem portion is threaded with identical threads throughout its length, thus forming a uniform groove (e.g., in width, depth, and curvature) such that the volume dispensed can be easily calculated.

At the end of a printing session, at block 404, the system lowers the micro-screw such that the conical inner surface of the nozzle is in contact with the conical head portion of the micro-screw to close the outlet port and stop dispensing the printing material at the nozzle. In some embodiments, the contact is a surface-to-surface contact, thus reducing the impact on the components when contact occurs. In some embodiments, while the micro-screw is lowered, the rotation of the micro-screw is also slowed in a controlled manner to reduce the amount of printing material dispensed.

In some embodiments, when the printing material is introduced via the inlet 332, the printing material is already melted and pressurized to the desired levels. According, the threaded stem portion of the micro-screw is threaded in a uniformed manner throughout its length for the sole purpose of tracking volume dispensed.

In some embodiments, the method can further comprises adjusting, via an actuator, a speed and acceleration of vertical movement of the micro-screw and to control the travel displacement of the micro-screw (which can cause the nozzle to be completely open, completely closed, or have any amount of partial opening) In some embodiments, the method further comprises adjusting, via a rotation motor, a rotation speed of the micro-screw to control a volume of the printing material being dispensed. In some embodiments, an actuator and a rotation motor are configured to drive composite movement of the micro-screw.

In some embodiments, the system rotates the micro-screw in a first direction to dispense the printing material. The system can rotate the micro-screw in a direction opposite to the first direction to remove an amount of the printing material from the distal end of the nozzle before lowering the micro-screw to close the outlet port.

In some embodiments, the system heats the printing material according to a ladder scheme. According to the ladder scheme, the printing material is heated to a first temperature at a material supply module; the printing material is heated to a second temperature at a flow distribution model; and the printing material is heated to a third temperature at the nozzle. In some embodiments, the first temperature is 50° C., wherein the second temperature is 70° C., and the third temperature is 105° C. This reduces the possibility that the printing material undergoes qualitative change due to extended heating.

In some embodiments, the system measures the pressure of the printing material at the distal end of the nozzle and/or at the inlet (e.g., inlet 332); and controlling the pressure of the printing material via a closed-loop control system.

In some embodiments, the system dispenses the printing material over a printing platform. A controller to the printing platform can be used to cause movement of the printing platform based on a Cartesian coordinate system, a polar coordinate system, or a cylindrical coordinate system. The system can coordinate the movement of the printing platform and an amount of the printing material being dispensed by the nozzle to achieve high-precision printing.

Figure 5A:
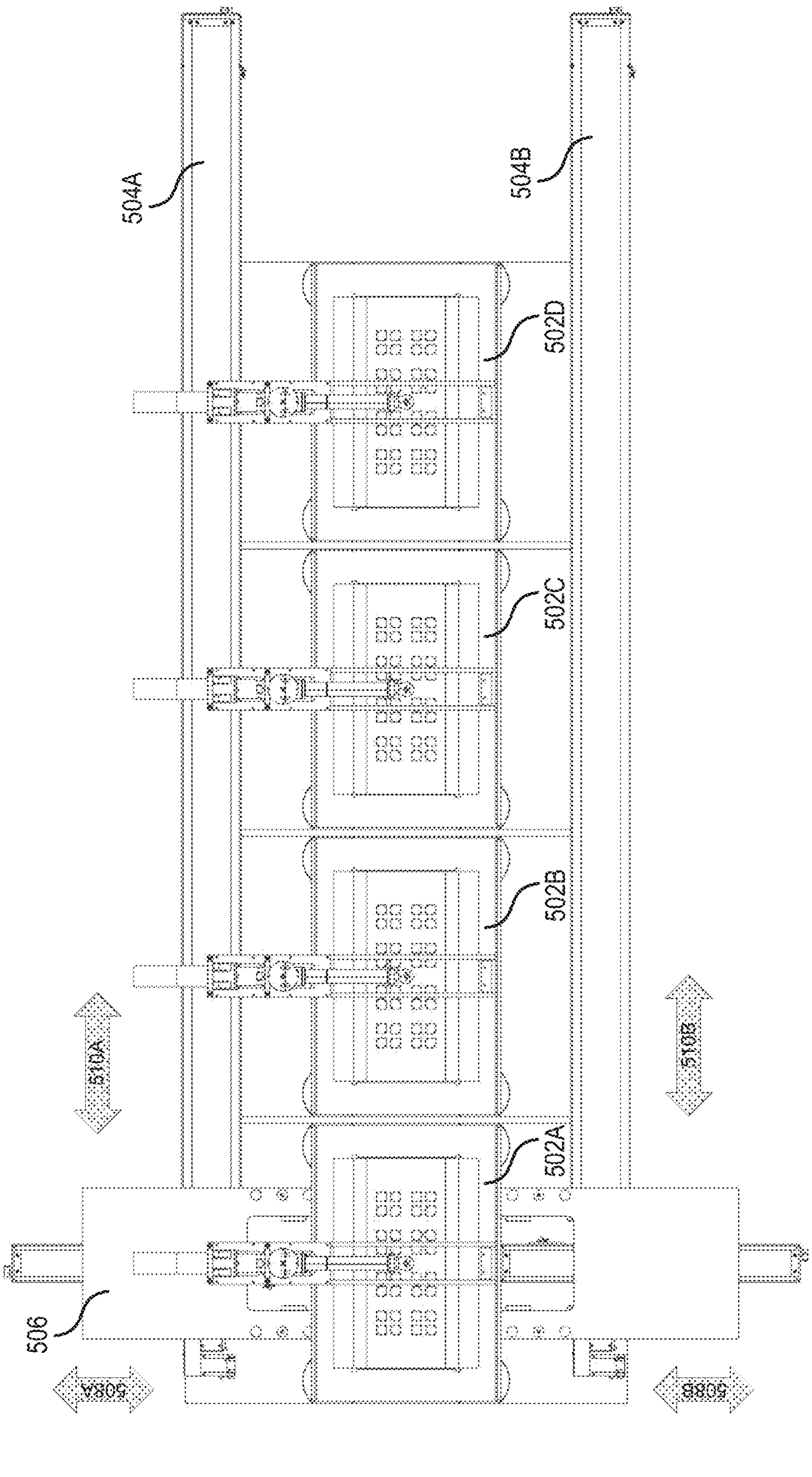
FIG. 5A depicts an exemplary layout of a standardized multi-station printing system for pharmaceutical units, in accordance with some embodiments.

FIG. 5A depicts an exemplary layout of a standardized multi-station printing system for pharmaceutical units, in accordance with some embodiments. With reference to FIG. 5A, the multi-station printing system 500 comprises a plurality of printing stations 502A, 502B, 502C, and 502D. The plurality of printing stations are arranged in a linear fashion. In the top-down view depicted in FIG. 5A, each of stations 502A-502D comprises a set of nozzles (32 nozzles), which are configured to dispense multiple flows of printing materials over a printing plate to print a batch of products (e.g., a batch of tablets).

In some embodiments, each of the printing stations 502A-502D is configured to move a printing plate along an x-axis, a y-axis, and a z-axis with reference to a corresponding coordinate system. In some embodiments, the coordinate systems of printing stations 502A-D are different from each other, thus allowing the printing stations 502A-D to be controlled independently (e.g., via one or more controllers).

Further with reference to FIG. 5A, the multi-station system 500 comprises a plate transport mechanism 506. As depicted, the plate transport mechanism 506 is configured to travel along the channels 504A and 504B. The plate transport mechanism 506 is configured to operate with the printing stations to move a printing plate off one printing station (e.g., 502A) onto one of the two ends of the plate transport mechanism (as shown by arrows 508A and 508B), transport the printing plate along either channel (as shown by arrows 510A and 510B), and move the printing plate onto another printing station. In some embodiments, the operations of the printing stations and the plate transport mechanisms are coordinated to maximize manufacturing rate and minimize idle time of the printing stations.

The multiple stations in the system 506 can be arranged in other layouts. In some embodiments, the multiple stations can be arranged around a circle or a square.

In some embodiments, the plate transport mechanism can comprise one or more channels that are of a circular shape or square shape such that it can transport printing plates from one printing station to another. In some embodiments, the plate transport mechanism comprises one or more grippers and/or robotic arms for picking up a printing plate from one printing station and moving the printing plate to another printing station.

Figure 5B:
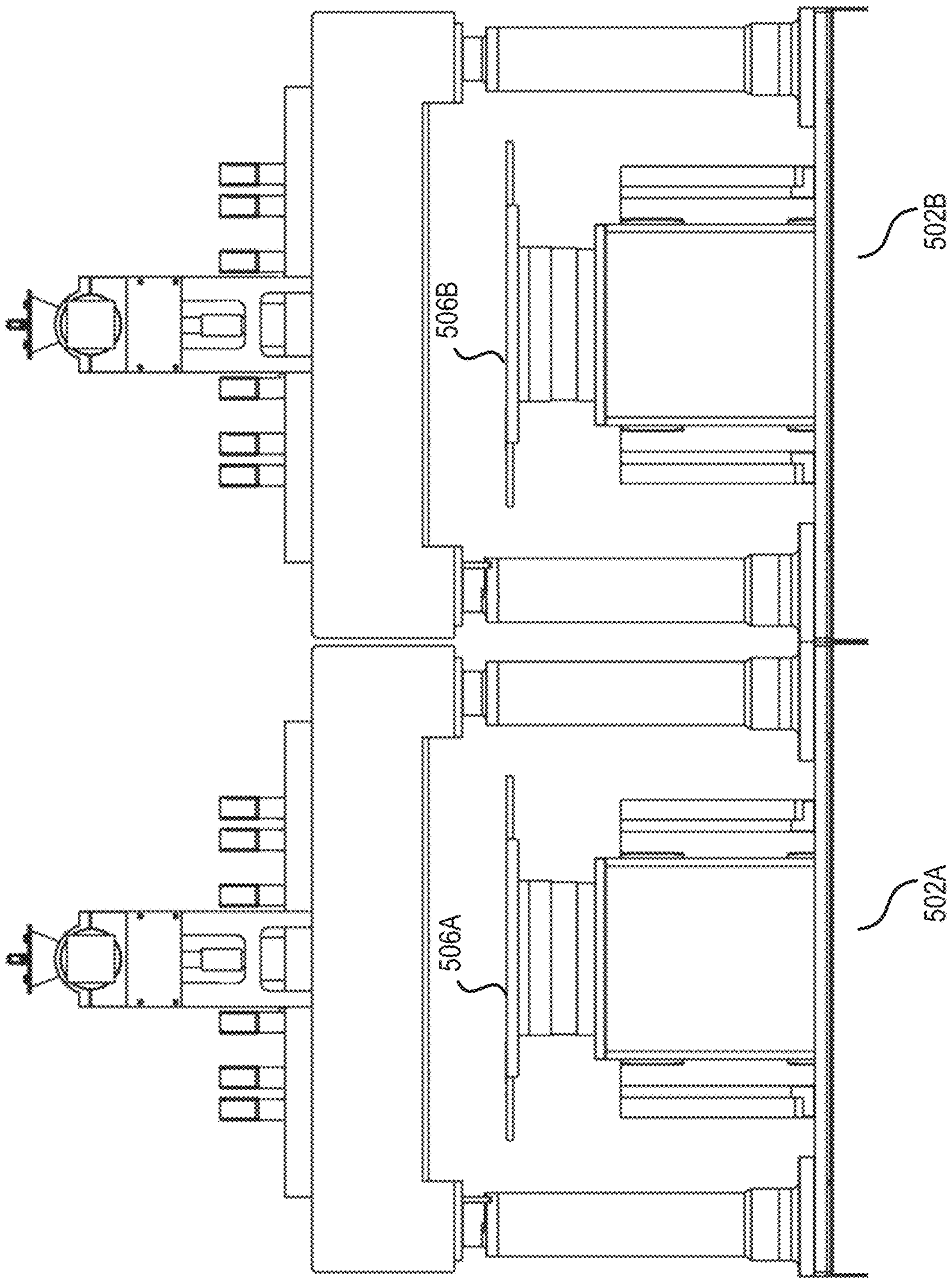
FIG. 5B depicts a partial side view of the exemplary multi-station system 800, in accordance with some embodiments.

FIG. 5B depicts a partial side view of the exemplary multi-station system 500, in accordance with some embodiments. The multi-station system 500 comprises multiple printing stations, including printing station 502A and 502B. Printing station 502A comprises a printing platform 506A and a set of nozzles (e.g., an array of nozzles) placed over the printing platform. During operation, the set of nozzles can simultaneously dispense a set of flows of printing material onto a printing plate placed on the printing platform 506A to form a batch of products (e.g., pharmaceutical dosage units). Printing station 502B comprises a different set of one or more nozzles and operates in a similar manner as the printing station 502B. In some embodiments, the printing stations 502A and 502B work in concert to manufacture the same batch of pharmaceutical dosage units. For example, at to, the printing station 502A prints a batch of shells of the pharmaceutical dosage units over a plate placed on the printing platform 506A. The plate is then transported to the printing station 502B (e.g., via a plate transport mechanism) and placed onto the printing platform 506B. At tl, the printing station 502B prints the inner components within the batch of shells.

In some embodiments, the printing station 502A comprises a first material supply module for melting and pressurizing a first printing material; a first flow distribution module configured to evenly dividing a single flow of the molten and pressurized first printing material into a first plurality of flows; and a first printing module comprising a set of needle-valve printing heads configured to dispense the first plurality of flows. The printing station 502B comprises a second material supply module for melting and pressurizing a second printing material; a second flow distribution module configured to evenly dividing a single flow of the molten and pressurized second printing material into a second plurality of flows; and a second printing module comprising a set of micro-screw printing heads configured to dispense the second plurality of flows.

In some embodiments, each of the first and second printing modules is configured to be extendable to accommodate different numbers of printing heads. The printing heads can work with the corresponding flow distribution module to dispense the corresponding printing material.

In some embodiments, each of the two printing stations is configured to be extendable to accommodate different types of printing modules.

In some embodiments, the multi-station system further comprises a set of jetting/drop-on-demand printing heads, a set of injection printing heads, a set of inkjet printing heads, or any combination thereof.

It should be appreciated that the above-described multi-station system is advantageous. For example, different types of materials can be better suited for different types of printing heads. Thus, by accommodating different types of printing heads, the system can print different types of materials in an optimal manner.

The printing material(s) described herein can comprise viscous materials. In some embodiments, it is medicinal material or thermoplastic material, or a combination thereof. In some embodiments, the material is dispensed from a nozzle at a temperature of about 25 degrees to about 400 degrees Celsius. In some embodiment, the viscosity of the material is between 0.001-10000 Pa·s.

In some embodiments, the material is a non-filamentous material, such as a powder, granules, a gel, or a paste. The non-filamentous material is melted and pressurized so that it can be dispensed through an extrusion port of a nozzle. As described further herein, pressure of particularly viscous materials is carefully controlled to ensure precise and accurate depositing of the material. The material can be melted within the material supply module using one or more heaters disposed within the material supply module, such as within or surrounding a barrel containing the material, a feed channel, and/or a nozzle. In some embodiments, the melting temperature of the material is about 30° C. or higher, such as about 60° C. or higher, about 70° C. or higher, about 80° C. or higher, about 100° C. or higher, about 120° C. or higher, about 150° C. or higher, about 200° C. or higher, or about 250° C. or higher. In some embodiments, the melting temperature of the material is about 400° C. or lower, such as about 350° C. or lower, about 300° C. or lower, about 260° C. or lower, about 200° C. or lower, about 150° C. or lower, about 100° C. or lower, or about 80° C. or lower. Material dispensed from the nozzle can be dispensed at a temperature at or above the melting temperature of the material. In some embodiments, the material is dispensed at a temperature of about 50° C. or higher, such as about 60° C. or higher, about 70° C. or higher, about 80° C. or higher, about 100° C. or higher, about 120° C. or higher, about 150° C. or higher, about 200° C. or higher, or about 250° C. or higher. In some embodiments, the material is dispensed at a temperature of about 400° C. or lower, such as about 350° C. or lower, about 300° C. or lower, about 260° C. or lower, about 200° C. or lower, about 150° C. or lower, about 100° C. or lower, or about 80° C. or lower.

The system described herein is useful for accurately and precisely dispensing viscous materials. In some embodiments, the material has a viscosity of about 100 Pa·s or more, such as about 200 Pa·s or more, about 300 Pa·s or more, about 400 Pa·s or more, about 500 Pa·s or more, about 750 Pa·s or more, about 800 Pa·s or more, or about 1000 Pa·s or more, when dispensed from the device. In some embodiments, the material has a viscosity of about 4000 Pa·s or less, 3000 Pa·s or less, 2000 Pa·s or less, such as about 1000 Pa·s or less, about 750 Pa·s or less, about 500 Pa·s or less, about 400 Pa·s or less, about 300 Pa·s or less, or about 200 Pa·s or less.

In some embodiments, the printing material is a pharmaceutically acceptable material. In some embodiments, the material is inert or biologically inert. In some embodiments, the material is an erodible material or a bioerodible material. In some embodiments, the material is a non-erodible material or a non-bioerodible material. In some embodiments, the material is a pharmaceutically acceptable material. In some embodiments, the material comprises one or more thermoplastic materials, one or more non-thermoplastic material, or a combination of one or more thermoplastic materials and one or more non-thermoplastic materials. In some embodiments, the material is a polymer or a co-polymer.

In some embodiments, the material comprises a thermoplastic material. In some embodiments, the material is a thermoplastic material. In some embodiments, the material is or comprises an erodible thermoplastic material. In some embodiments, the thermoplastic material is edible (i.e., suitable for consumption by an individual). In some embodiments, the thermoplastic material is selected from the group consisting of a hydrophilic polymer, a hydrophobic polymer, a swellable polymer, a non-swellable polymer, a porous polymer, a non-porous polymer, an erodible polymer (such as a dissolvable polymer), a pH sensitive polymer, a natural polymer, a wax-like material, and a combination thereof. In some embodiments, the thermoplastic material is a cellulose ether, a cellulose ester, an acrylic resin, ethylcellulose, hydroxypropylmethylcellulose, hydroxypropyl cellulose, hydroxymethylcellulose, a mono- or diglyceride of C12-C30 fatty acid, a C12-C30 fatty alcohol, a wax, poly(meth) acrylic acid, polyvinyl caprolactam-polyvinyl acetate-polyethylene glycol graft copolymer 57/30/13, polyvinylpyrrolidone-co-vinyl-acetate (PVP-VA), polyvinylpyrrolidone-polyvinyl acetate copolymer (PVP-VA) 60/40, polyvinylpyrrolidone (PVP), polyvinyl acetate (PVAc) and polyvinylpyrrolidone (PVP) 80/20, vinylpyrrolidone-vinyl acetate copolymer (VA64), polyethylene glycol-polyvinyl alcohol graft copolymer 25/75, kollicoat IR-polyvinyl alcohol 60/40, polyvinyl alcohol (PVA or PV-OH), poly(vinyl acetate) (PVAc), poly(butyl methacrylate-co-(2-dimethylaminocthyl) methacrylate-co-methyl methacrylate) 1:2:1, poly(dimethylaminoethylmethacrylate-co-methacrylic esters), poly(ethyl acrylate-co-methyl methacrylate-co-trimethylammonioethyl methacrylate chloride), poly(methyl acrylate-co-methyl methacrylate-co-methacrylic acid) 7:3:1, poly(methacrylic acid-co-methylmethacrylate) 1:2, poly (methacylic acid-co-ethyl acrylate) 1:1, poly(methacylic acid-co-methyl methacrylate) 1:1, poly(ethylene oxide) (PEO), poly(ethylene glycol) (PEG), hyperbranched polyesteramide, hydroxypropyl methylcellulose phthalate, hypromellose phthalate, hydroxypropyl methylcellulose or hypromellose (HMPC), hydroxypropyl methylcellulose acetate succinate or hypromellose acetate succinate (HPMCAS), poly(lactide-co-glycolide) (PLGA), carbomer, poly(ethylene-co-vinyl acetate), ethylene-vinyl acetate copolymer, polyethylene (PE), and polycaprolactone (PCL), hydroxyl propyl cellulose (HPC), polyoxyl 40 hydrogenerated castor oil, methyl cellulose (MC), ethyl cellulose (EC), poloxamer, hydroxypropyl methylcellulose phthalate (HPMCP), poloxamer, hydrogenated castor oil, hydrogenated soybean oil, glyceryl palmitostearate, carnauba wax, polylactic acid (PLA), polyglycolic acid (PGA), cellulose acetate butyrate (CAB), polyvinyl acetate phthalate (PVAP), a wax, beeswax, hydrogel, gelatin, hydrogenated vegetable oil, polyvinyl acetal diethyl aminolactate (AEA), paraffm, shellac, sodium alginate, cellulose acetate phthalate (CAP), arabic gum, xanthan gum, glyceryl monostearate, octadecanoic acid, thermoplastic startch, derivatives thereof (such as the salts, amides, or esters thereof), or a combination thereof.

In some embodiments, the erodible material comprises a non-thermoplastic material. In some embodiments, the erodible material is a non-thermoplastic material. In some embodiments, the non-thermoplastic material is a non-thermoplastic starch, sodium starch glycolate (CMS-Na), sucrose, dextrin, lactose, microcrystalline cellulose (MCC), mannitol, magnesium stearate (MS), powdered silica gel, titanium dioxide, glycerin, syrup, lecithin, soybean oil, tea oil, ethanol, propylene glycol, glycerol, Tween, an animal fat, a silicone oil, cacao butter, fatty acid glycerides, vaseline, chitosan, cetyl alcohol, stearyl alcohol, polymethacrylate, non-toxic polyvinyl chloride, polyethylene, ethylene-vinyl acetate copolymer, silicone rubber, or a combination thereof.

Exemplary materials that may be used with the device described herein or the methods described herein include, but are not limited to, a poly(meth)acrylate co-polymer (such as a co-polymer containing one or more of amino alkyl methacrylate, methacrylic acid, metacrylic ester, and/or ammonioalkyl methacrylate, such as a copolymer sold under the brand name Eudragit® RSPO) and hydroxyl propyl cellulose (HPC). In some embodiments, the material comprises a drug. In some embodiments, the material is admixed with a drug.

Additional details of the features of the printing system can provided in PCT/CN2018/071965, titled "PRECISION PHARMACEUTICAL 3D PRINTING DEVICE," WO2018210183, titled "3D PRINTING DEVICE AND METHOD," U.S. Pub. No. 10201503B1 (now U.S. patent Ser. No. 10/201,503), tilted "PRECISION PHARMACEUTICAL 3D PRINTING DEVICE," PCT/CN2019/101621, titled "HIGH-THROUGHPUT AND HIGH-PRECISCION PHARMACEUTICAL ADDITIVE MANUFACTURING SYSTEM," PCT/2019/13733, titled "PRECISION PHARMACEUTICAL 3D PRINTING DEVICE," the content of which is incorporated in its entirety.

Figure 7A:
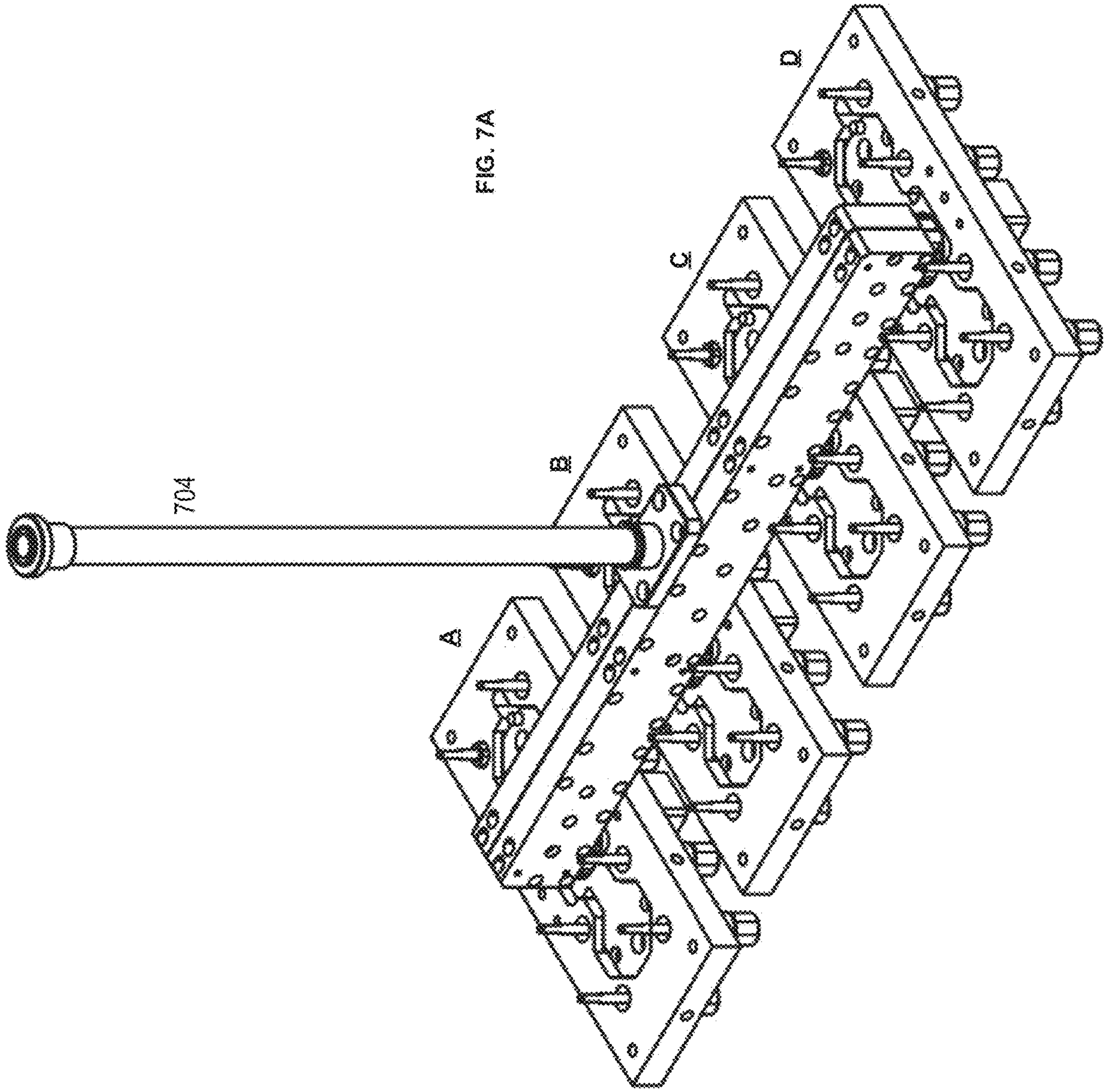
FIG. 7A illustrates an exemplary layout of 32 printing heads, in accordance with some embodiments.
Figure 7B:
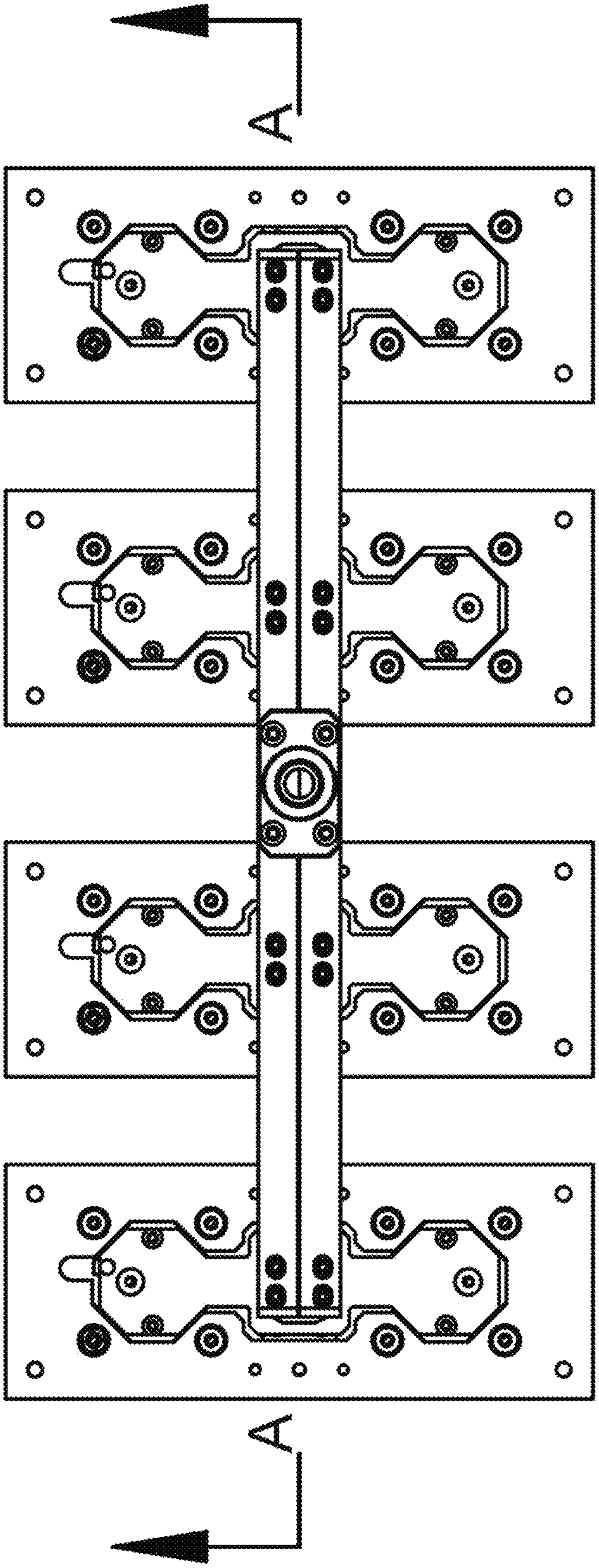
FIG. 7B illustrates an exemplary layout of 32 printing heads, in accordance with some embodiments.

FIG. 7A illustrates another exemplary layout of 32 printing heads, in accordance with some embodiments. The system can receive a flow of melted and pressurized printing material from the supply channel 704. The system comprises four support structures A, B, C, and D. For each support structure, a set of 8 printing heads share the support structure. FIG. 7B illustrates a top view of the system.

Figure 7C:
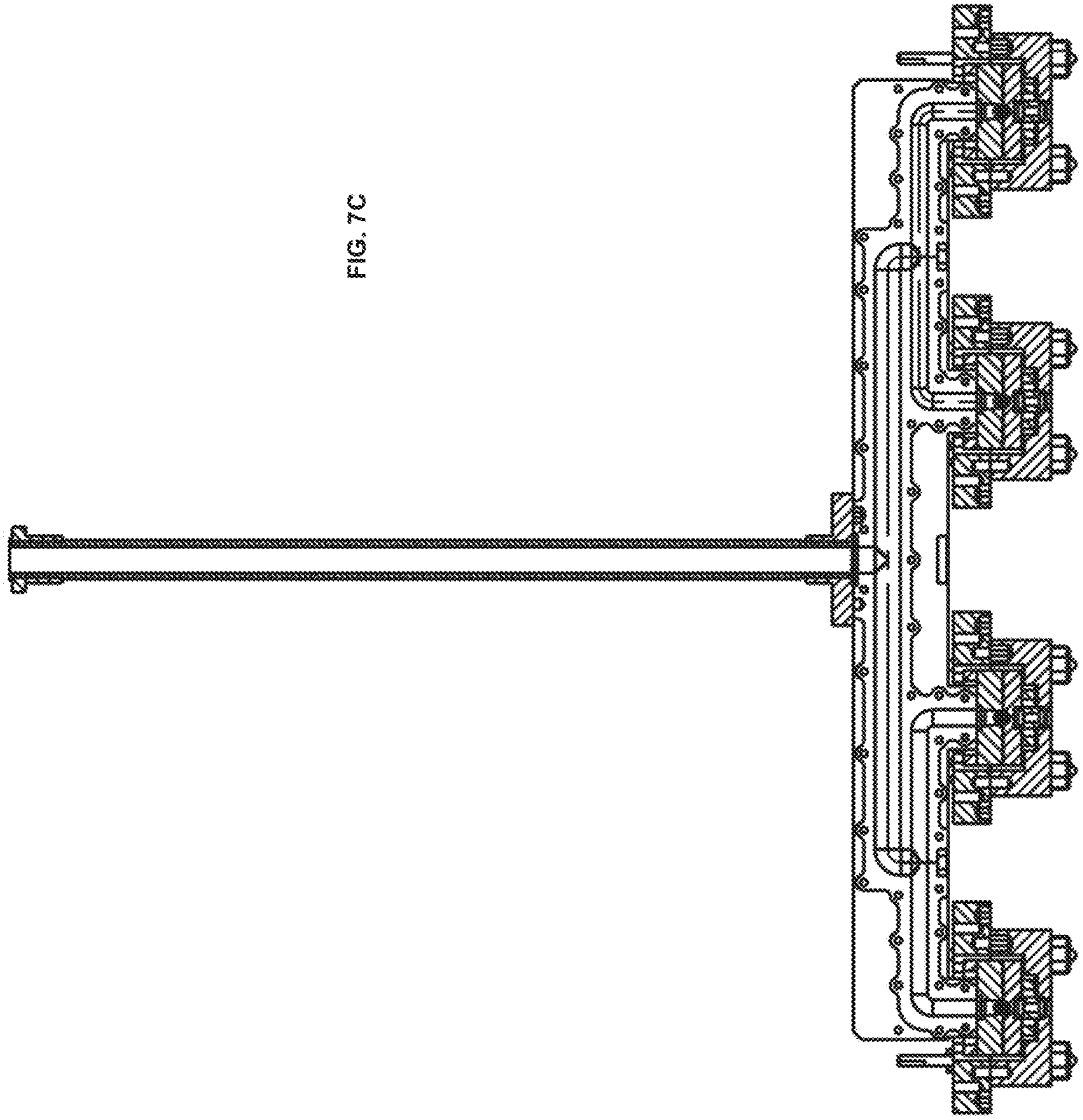
FIG. 7C illustrates an exemplary layout of 32 printing heads, in accordance with some embodiments.

FIG. 7C illustrates a side view of a support structure, in accordance with some embodiments. Each support structure comprises a flow distribution plate that is configured to divide a single flow into 8 flows, which can be dispensed via the 8 printing heads.

Figure 8A:
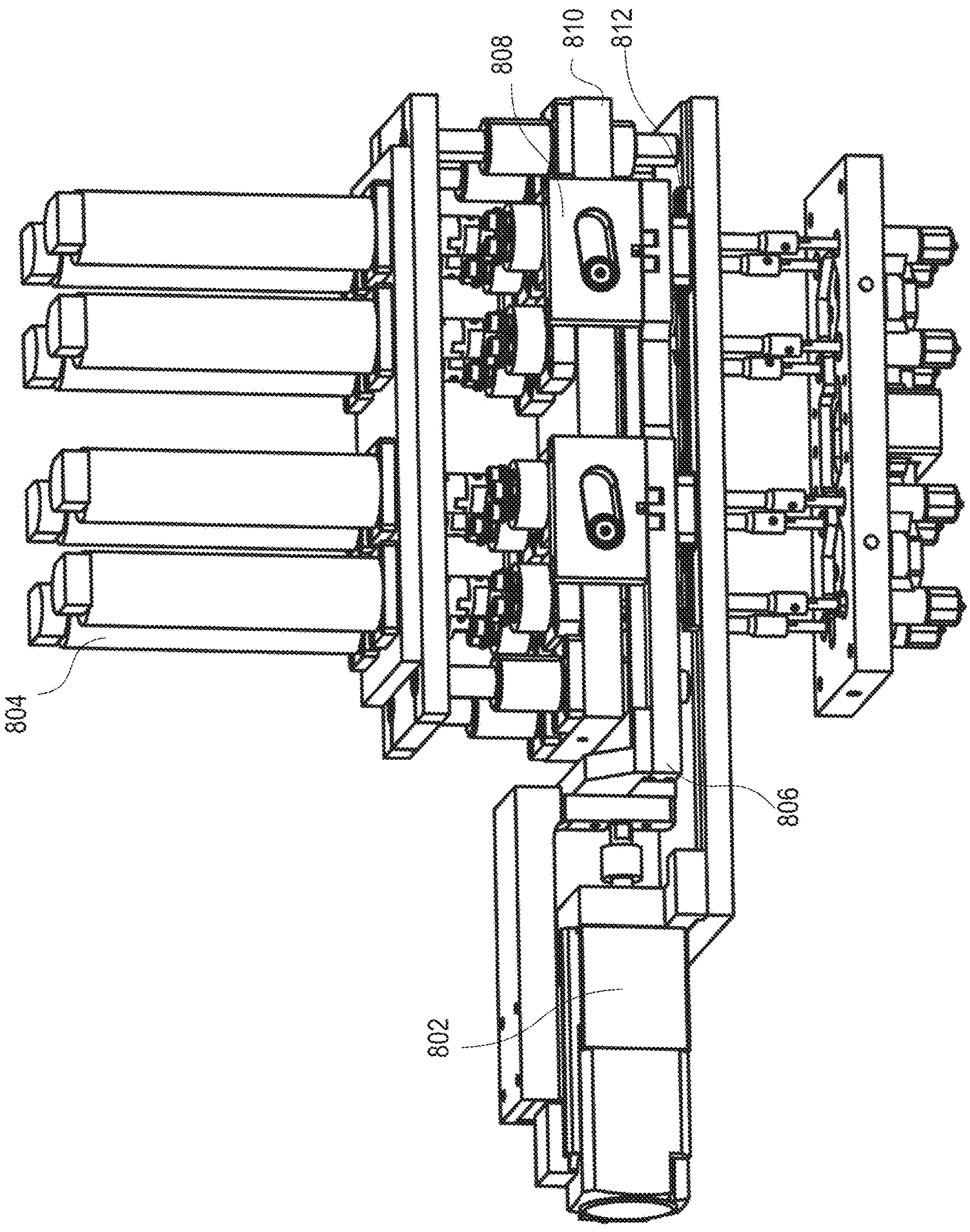
FIG. 8A illustrates an exemplary push plate mechanism, in accordance with some embodiments.
Figure 8B:
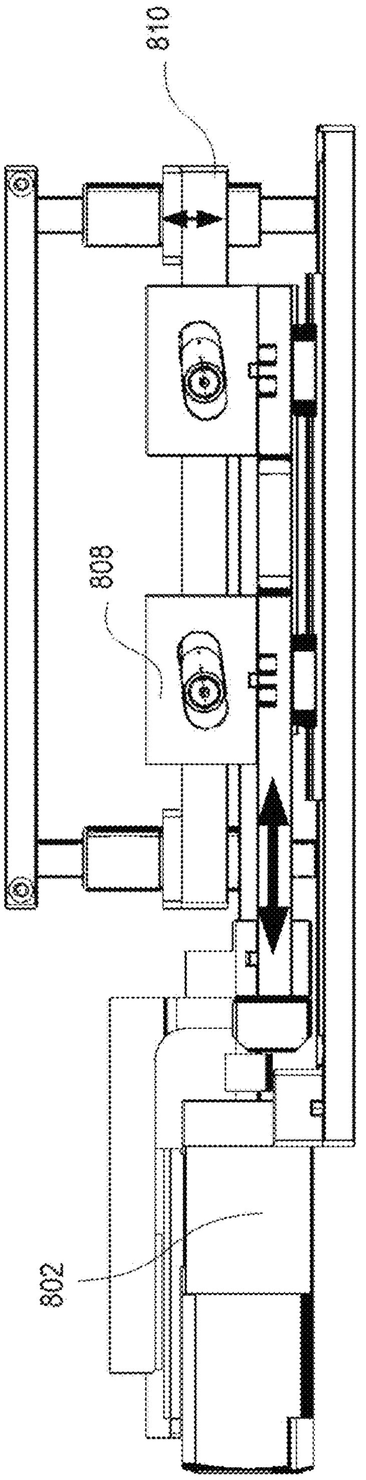
FIG. 8B illustrates an exemplary push plate mechanism, in accordance with some embodiments.
Figure 8C:
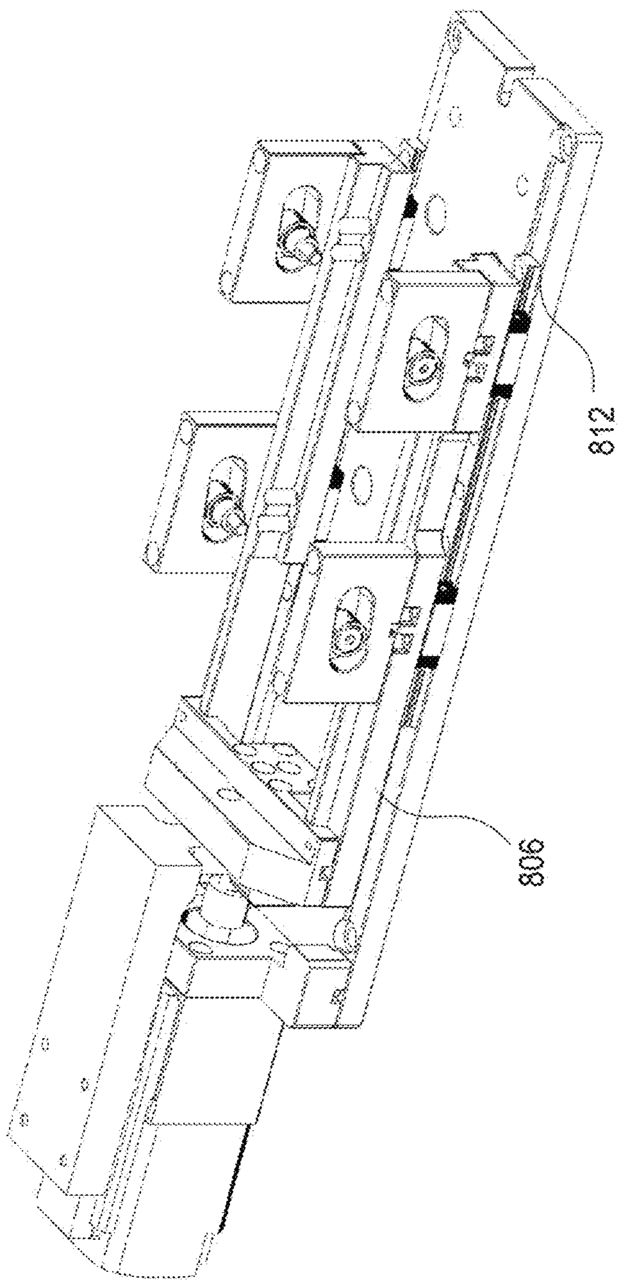
FIG. 8C illustrates an exemplary push plate mechanism, in accordance with some embodiments.

FIGS. 8A-C illustrate an exemplary push plate mechanism, in accordance with some embodiments. The push plate mechanism comprises push plate 810, cam mechanism 808 (including 4 cams), sliding plate 806, sliding track 812, and actuators 802. In operation, the actuators 802 causes (e.g., via ball screws) the sliding plate to slide horizontally, as indicated by the horizontal arrow in FIG. 8B. The sliding plate is coupled to the cam mechanism and thus causes the cam mechanism to slide horizontally.

The cam mechanism comprises 4 cams, and each cam comprises a horizontally slanted slot for accommodating a pin, which is coupled to the push plate 810. The push plate (along with the pins coupled to the push plate) is affixed to a supporting structure such that it can move vertically but not horizontally. As the cams slide horizontally, the pins slide within the slanted slots and cause the push plate to move horizontally. In addition to translating horizontal movement of the sliding plate to vertical movement of the push plate, the cam mechanism also magnify the push force. Accordingly, the push plate can cause multiple micro-screws in the array to move simultaneously. This allows synchronous and consistent movement of multiple micro-screws in the array, thereby ensuring consistency and precision among the products produced by the multiple micro-screws.

Figure 13A:
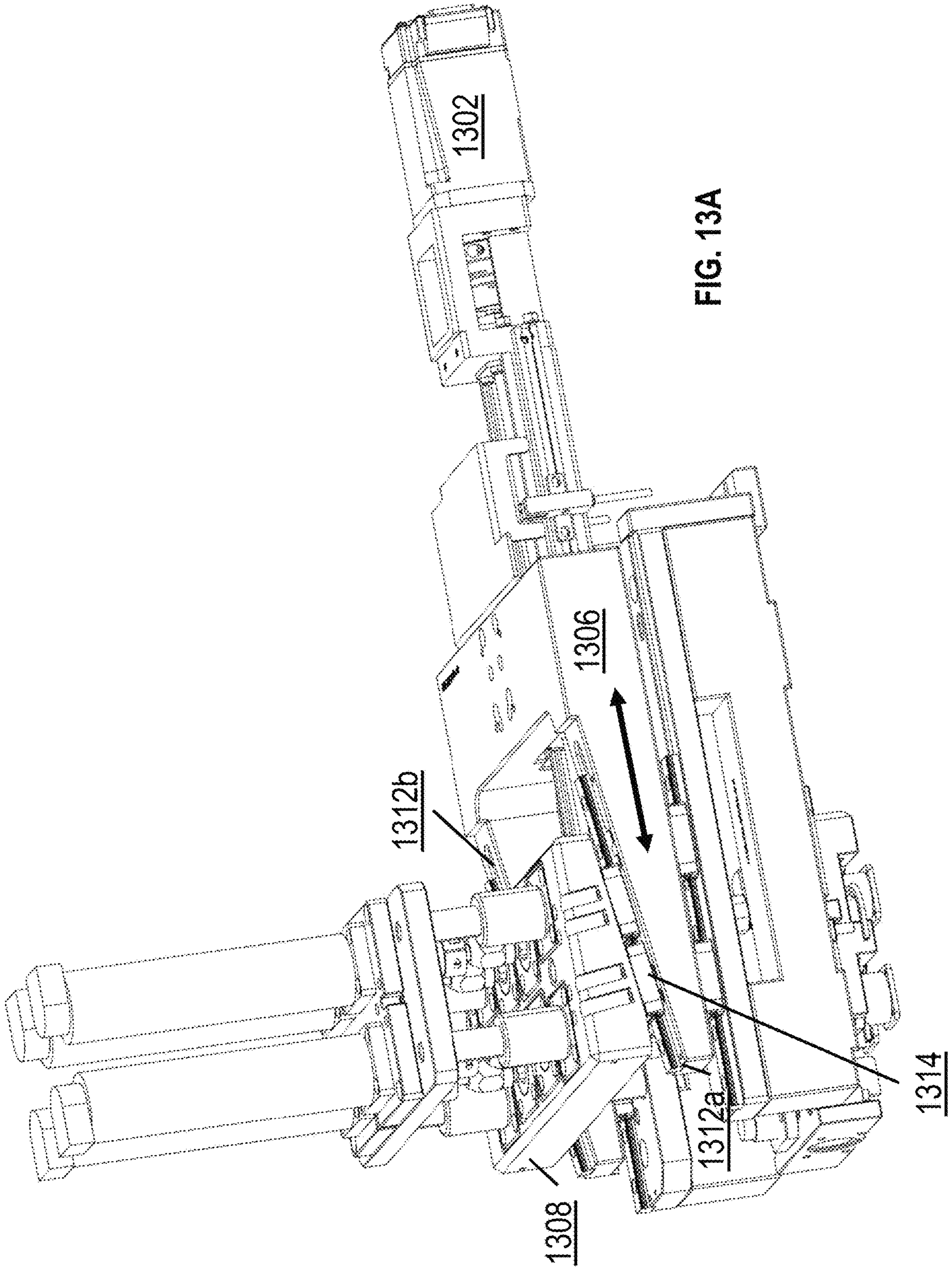
FIG. 13A illustrates an exemplary push plate mechanism, in accordance with some embodiments.
Figure 13B:
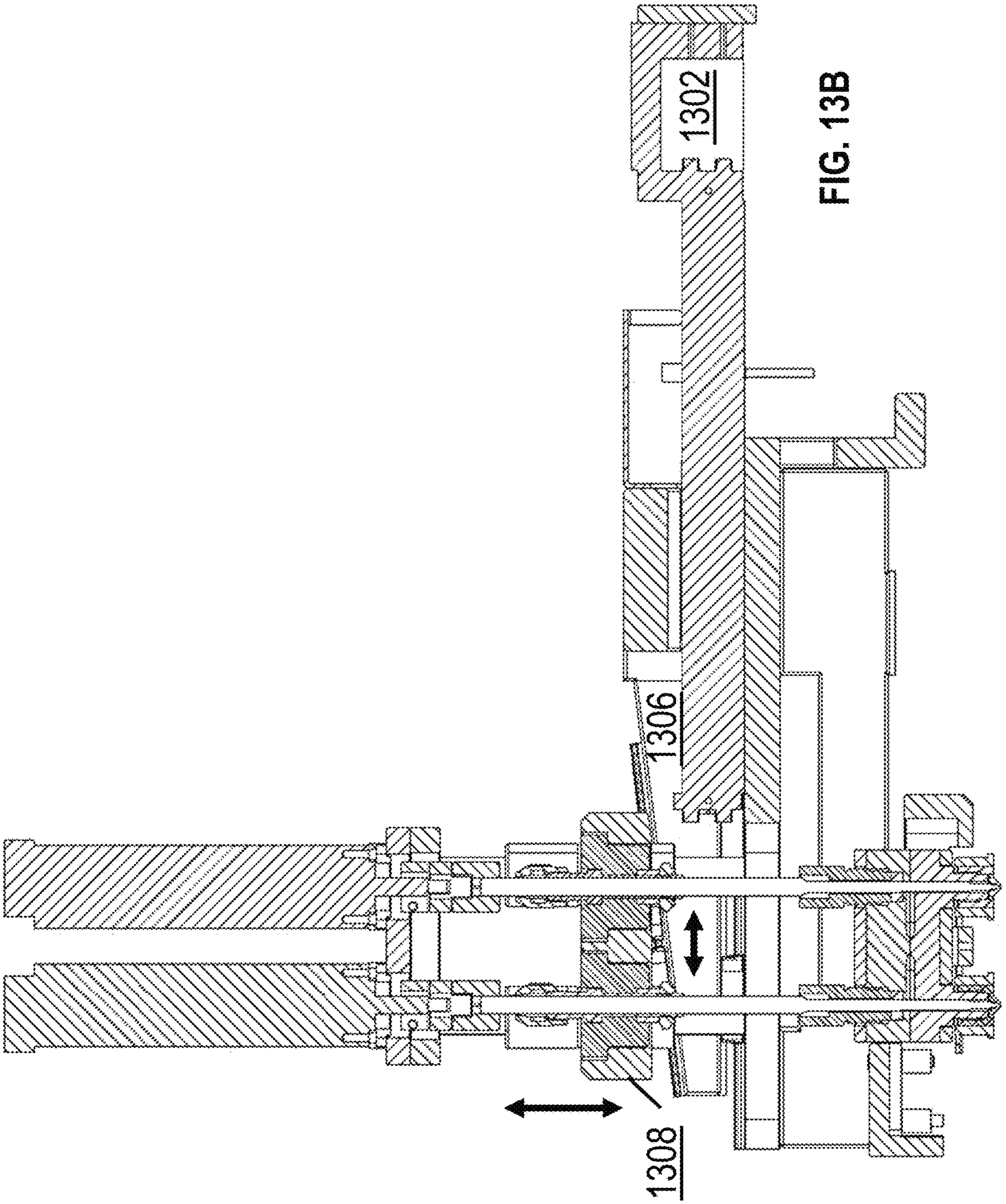
FIG. 13B provides a cross-sectional view of the push plate mechanism, in accordance with some embodiments.

FIG. 13A illustrates another exemplary push plate mechanism, in accordance with some embodiments. The push plate mechanism comprises push plate 1308, sliding plate 1306, and actuators 1302. The sliding plate 1306 comprises two sliding tracks 1312*a* and 1312*b*. As shown, the two sliding tracks are not horizontal, but are sloped. The push plate 1308 comprises supports configured to slide along the sliding tracks. For example, the support 1314 is configured to slide along the sliding track 1312*a*. FIG. 13B provides a cross-sectional view of the push plate mechanism.

In operation, the actuators 1302 causes (e.g., via ball screws) the sliding plate 1306 to slide horizontally, as indicated by the horizontal arrow in FIG. 13A and FIG. 13B.

The push plate is allowed vertical movement but not horizontal movement. Thus, as the sliding plate 1306 slides toward the push plate 1308, the push plate 1308 is effectively raised upward due to the sloped sliding tracks. Further, as the sliding plate 1306 slides away from the push plate 1308, the push plate 1308 is effectively lowered due to the sloped sliding tracks. Accordingly, the push plate can cause multiple micro-screws in the array to move simultaneously. This allows synchronous and consistent movement of multiple micro-screws in the array, thereby ensuring consistency and precision among the products produced by the multiple micro-screws.

Figure 13C:
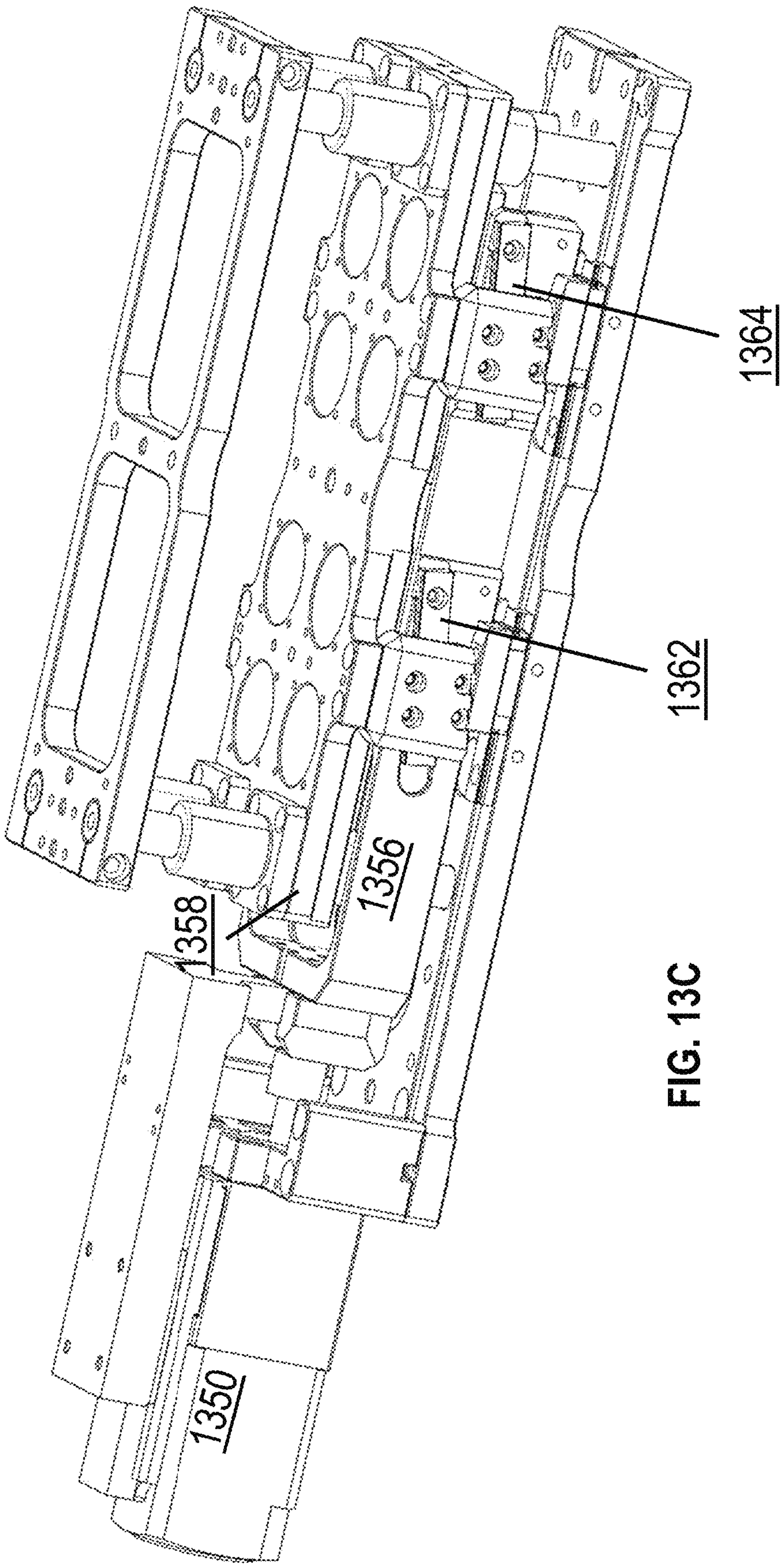
FIG. 13C illustrates an exemplary push plate mechanism, in accordance with some embodiments.
Figure 13D:
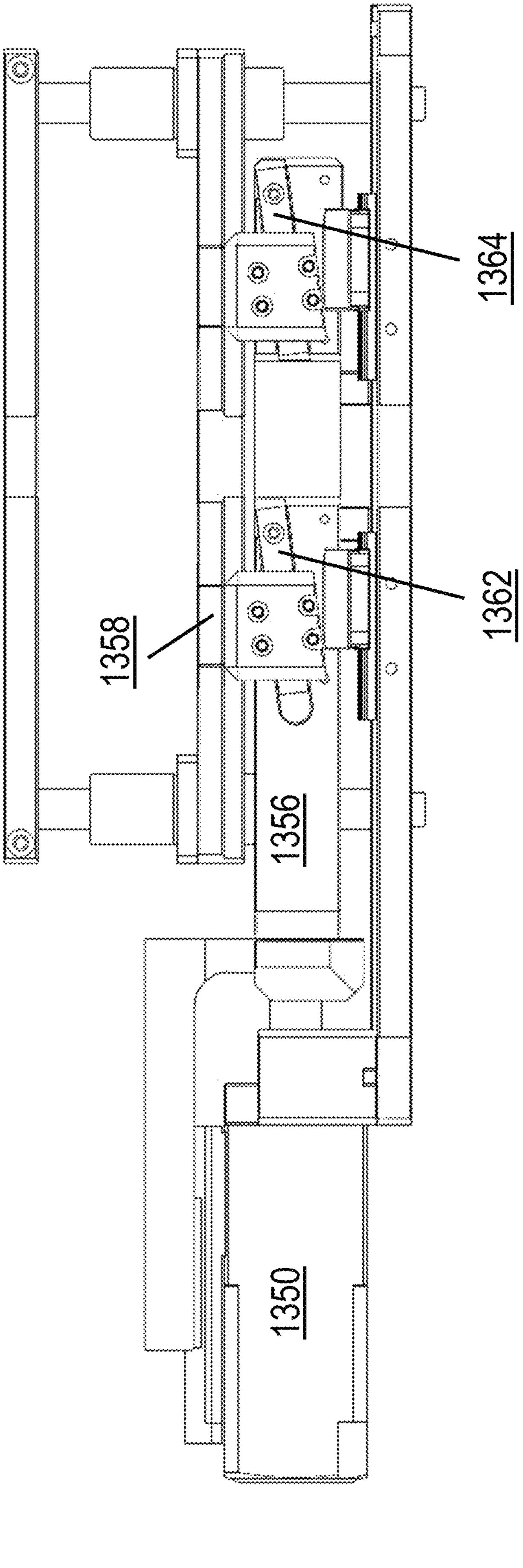
FIG. 13D illustrates an exemplary push plate mechanism, in accordance with some embodiments.

FIGS. 13C and 13D illustrate an additional exemplary push plate mechanism similar to that depicted in FIGS. 13A and 13B. In FIGS. 13C and 13D, two printing-head modules 1362 and 1364 (similar to modules 1202 and 1204 in FIG. 12A) share the same push plate 1358, the same sliding plate 1356, and the same motor 1350. The modules 1362 and 1364 can be driven vertically using the same push plate mechanism descried with reference to FIGS. 13A and B.

The mechanism described with reference to FIGS. 13A-D does not include the cam system and thus reduces potential mechanical and hardware errors. Accordingly, the mechanism allows for more precise control of the vertical movement of the printing heads, thus improving the quality and precision of the printed products.

Figure 9:
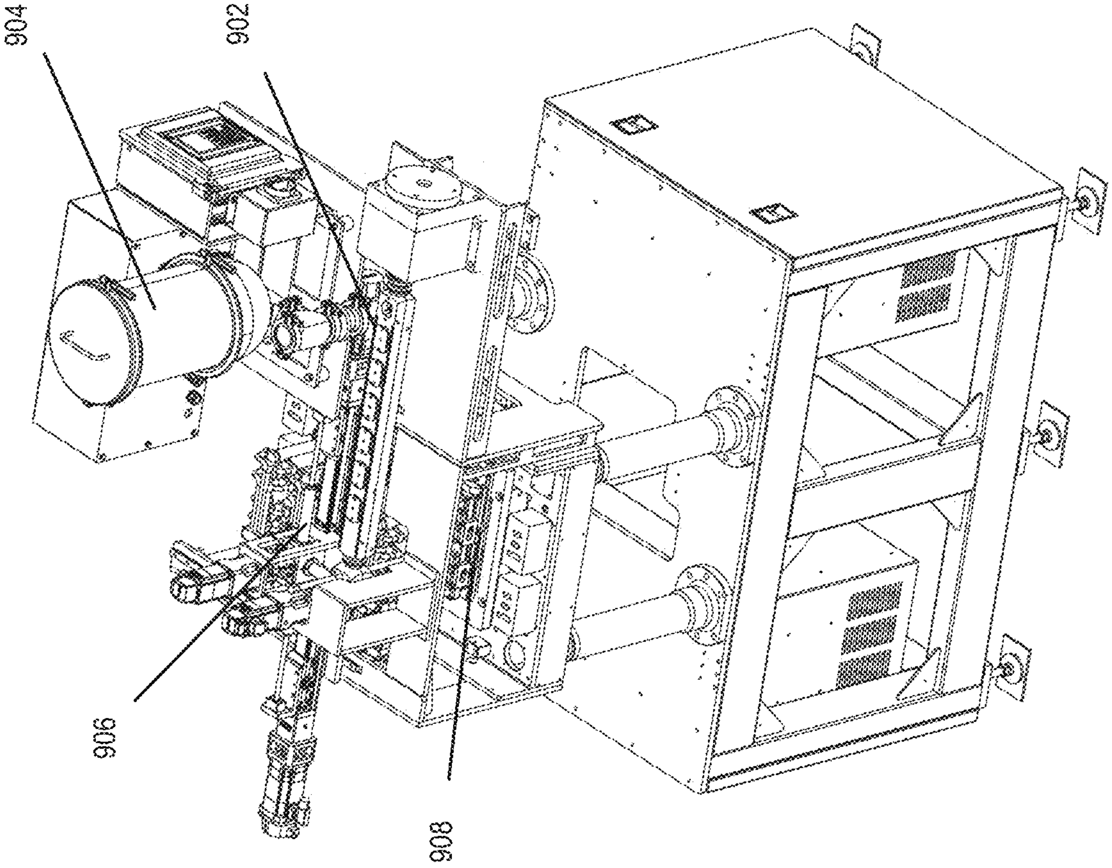
FIG. 9 illustrates a schematic view of an exemplary additive manufacturing system, according to some embodiments.

FIG. 9 illustrates a schematic view of an exemplary additive manufacturing system, according to some embodiments of a present disclosure. The system comprises a twin-screw extruding device 902, a loss-in-weight scale 904, a buffering piston 906, and a plurality of micro-screw printing heads 908. The twin-screw extruding device 902 and the buffering piston 906 are part of the material supply module. In operation, printing material is introduced to the extruding device 902, which melts the printing material to a desired temperature. The melted printing material is then transported the buffering piston 906, which pressurizes the melted printing material.

The buffering piston 906 can hold the melted and pressurized printing material when the printing heads 908 are not dispensing any printing material (e.g., when the printing stations are swapped underneath the printing heads 908). In operation, when the printing platforms are being swapped underneath the printing heads 908, the printing heads stop dispensing the printing material, but the extruding device 902 continues receiving and pressuring melted printing material. The melted and pressurized printing material is held at the buffering piston 906 until the printing resumes. This way, the material supply module does not need to be turned off simply because printing is temporarily suspended at the printing heads, thus eliminating the need to turn off, restart, and reinitialize the material supply module.

Embodiments of the present disclosure can generate consistent outputs by a single micro-screw printing head. A micro-screw printing head was used to print a batch of 32 filaments using a set of printing materials (e.g., 60% Eudragit RSPO, 20% ethyl cellulose ethoce (EC), and 20% stearic acid). The set of printing materials was heated to 100° C. at the material supply module, to 105° C. at the supply channel, and to 105° C. at the printing heads. The printing head comprises a stainless steel nozzle with 0.4 mm openings. The set of printing materials was pressurized to 1 MPa and the pressure can be controlled by pressure controllers based on readings from pressure sensors. The micro-screw was raised by 0.5 mm and rotated at 1 r/s for 10 seconds. The resulting weights of the tablets in the batch are shown in FIG. 10. As shown, the average of 32 filaments is 12.32 mg.

FIG. 11 illustrates exemplary outputs of an exemplary additive manufacturing system, according to some embodiments. In some embodiments, one or more micro-screw printing heads were used to print different components of the pharmaceutical tablets (e.g., shell, core). In some embodiments, the same micro-screw printing head was used to print all components of the pharmaceutical tablets.

The resulting weights of the tablets are shown in FIG. 11. As shown, the additive manufacturing system has printed two batches of pharmaceutical tablets. One batch comprises 20 pharmaceutical tablets, the average of 20 pharmaceutical tablets is 204.32 mg; another batch comprises 15 pharmaceutical tablets, the average of 15 pharmaceutical tablets is 208.13 mg.

In some embodiments, when the weight of pharmaceutical tablet is less than 300 mg, the relative deviation of weight is about ±10% or lower, such as about ±9% or lower, about ±8% or lower, about ±7.5% or lower, about ±7% or lower, about ±6% or lower, about ±5% or lower, about ±4% or lower, or about ±3% or lower, or about ±2% or lower, or about ±1% or lower.

In some embodiments, when the weight of pharmaceutical tablet is equal or more than 300 mg, the relative deviation of weight is about ±5% or lower, such as about ±4% or lower, about ±3% or lower, about ±2% or lower, about ±1% or lower.

Figure 6:
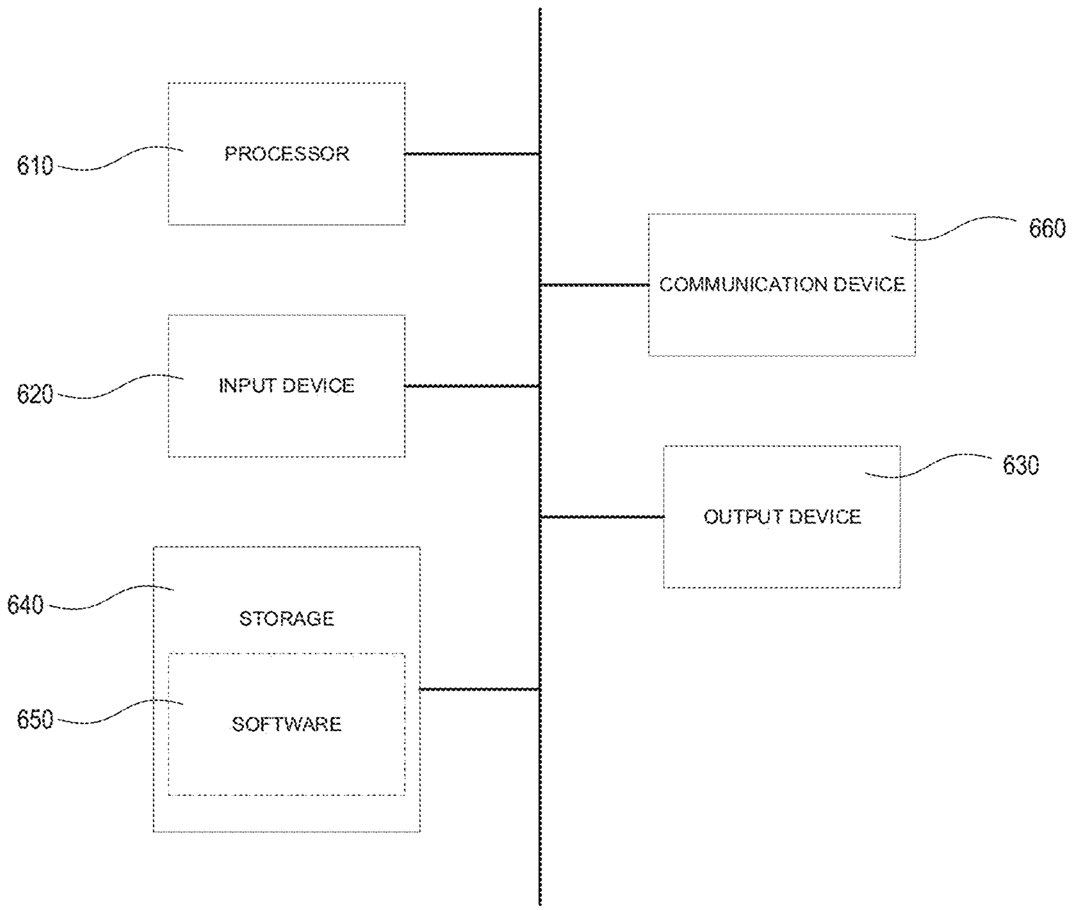
FIG. 6 depicts an exemplary electronic device, in accordance with some embodiments.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server or handheld computing device (portable electronic device) such as a phone or tablet. The device can include, for example, one or more of processor 610, input device 620, output device 630, storage 640, and communication device 660. Input device 620 and output device 630 can generally correspond to those described above, and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

EXEMPLARY EMBODIMENTS

The invention provides the following embodiments:

1. An additive manufacturing system, comprising: a material supply module for melting and pressurizing a printing material; a micro-screw printing head comprising: a micro-screw comprising a threaded stem portion and a conical head portion, wherein the threaded stem portion is threaded throughout its length for volume measurement; a sleeve, and a nozzle, wherein a distal end of the nozzle comprises: a conical inner surface, and an outlet port for dispensing the print material, wherein the conical inner surface of the nozzle is configured to be in contact with the conical head portion of the micro-screw to stop dispensing the printing material at the nozzle when the micro-screw printing head is in a closed position; a driving module comprising: a rotation motor for driving a rotating motion of the micro-screw, and an actuator for driving a vertical motion of the micro-screw.
2. The system of embodiment 1, further comprising a z-axis positioning sealing ring between the sleeve and the nozzle, wherein the z-axis positioning sealing ring is configured to adjust a vertical position of the nozzle.
3. The system of any of embodiments 1-2, wherein the micro-screw printing head further comprises a heating sleeve or a temperature sensor.
4. The system of any of embodiments 1-3, wherein the micro-screw printing head further comprises a heat insulating sleeve.
5. The system of any of embodiments 1-4, wherein a first taper angle of the conical head portion of the micro-screw is smaller than or equal to a second taper angle formed by the conical inner surface of the nozzle.
6. The system of embodiment 5, wherein the first taper angle of the conical head portion of the micro-screw is equal to or smaller than 60°.
7. The system of embodiment 5, wherein a ratio between the second taper angle and the first taper angle equals to or is between 1:1 and 4:1, equals to or is between 1:1 and 3:1, or equals to or is between 1:1 and 2:1.
8. The system of any of embodiments 1-7, wherein the conical head portion of the micro-screw is of a frusto-conical shape or a truncated cone shape.
9. The system of any of embodiments 1-8, wherein the conical head portion of the micro-screw is configured to fit the conical inner surface of the nozzle via one or more matching patterns.
10. The system of any of embodiments 1-9, wherein a length of the threaded stem portion of the micro-screw equals to or is between 10 and 80 mm.
11. The system of any of embodiments 1-10, wherein a diameter of the threaded stem portion of the micro-screw equals to or is between 1 and 10 mm.
12. The system of any of embodiments 1-11, wherein the material supply module comprises an extruding device for melting the printing material and a pressurizing device.
13. The system of embodiment 12, wherein the extruding device comprises a single-piston extruding mechanism, a single-screw extruding mechanism, a twin-screw extruding mechanism, a conical twin screw extruding mechanism, or any combination thereof.
14. The system of embodiment 12, wherein the pressurizing device comprises a piston extruding mechanism, a single-screw extruding mechanism, a screw pump mechanism, a cogwheel mechanism, a plunger pump mechanism (e.g., a valve-less measuring pump mechanism), or any combination thereof.
15. The system of any of embodiments 1-14, wherein the material supply module comprises one or more temperature sensors for detecting temperature of the molten printing material.
16. The system of any of embodiments 1-15, further comprising one or more pressure sensor at a flow channel or an inlet of the micro-screw printing head for detecting pressure of the molten printing material.
17. The system of any of embodiments 1-16, wherein an inlet of the micro-screw printing head is aligned based on a topmost thread segment of the threaded stem portion of the micro-screw.
18. The system of embodiment 17, further comprising an inlet sealing ring at the inlet of the micro-screw printing head.
19. The system of any of embodiments 1-18, wherein the driving module is configured to independently control the actuator and the rotation motor.
20. The system of any of embodiments 1-19, wherein the driving module is configured to provide composite control of the actuator and the rotation motor.
21. The system of any of embodiments 1-20, wherein the actuator is a pneumatic actuator, a mechanical actuator, an electromagnetic actuator, hydraulic actuator, or an electrical motor.
22. The system of embodiment 21, wherein the electrical motor is configured to control a speed and acceleration of vertical movement of the micro-screw and/or travel displacement of the micro-screw.

23. The system of any of embodiments 1-22, wherein the rotation motor is configured to control a rotation speed of the micro-screw.
24. The system of any of embodiments 1-23, further comprising: a cross connector or cardan shaft used for coupling.
25. The system of any of embodiments 1-24, wherein the printing material is melted by the material supply module at between 50° C. and 400° C.
26. The system of any of embodiments 1-25, wherein the printing material is dispensed by the nozzle at between 50° C. and 400° C.
27. The system of any of embodiments 1-26, wherein the printing material is non-filamentous material, and wherein the printing material has a viscosity of 800 Pa·s or higher when dispensed by the nozzle.
28. The system of any of embodiments 1-27, wherein the printing material comprises a pharmaceutically acceptable material, an inert material, or a combination thereof.
29. The system of any of embodiments 1-28, further comprising a printing platform and a controller for causing movement of the printing platform based on a Cartesian coordinate system, a polar coordinate system, or a cylindrical coordinate system.
30. A method of additive manufacturing via a micro-screw printing head, wherein the micro-screw printing head comprises: a micro-screw comprising a threaded stem portion and a conical head portion, and a nozzle, wherein a distal end of the nozzle comprises: a conical inner surface, and an outlet port for dispensing the print material, the method comprising: raising the micro-screw to open the outlet port of the nozzle; rotating the micro-screw to introduce a molten and pressurized printing material into a groove of the threaded stem portion of the micro-screw, wherein the molten and pressurized printing material is configured to flow toward the distal end of the nozzle; and lowering the micro-screw such that the conical inner surface of the nozzle is in contact with the conical head portion of the micro-screw to close the outlet port and stop dispensing the printing material at the nozzle.
31. The method of embodiment 30, further comprising melting and pressuring the printing material.
32. The method of any of embodiments 30-31, further comprising adjusting, via an electrical motor, a speed and acceleration of vertical movement of the micro-screw and/or a travel displacement of the micro-screw.
33. The method of any of embodiments 30-32, further comprising adjusting, via a rotation motor, a rotation speed of the micro-screw to control a volume of the printing material being dispensed.
34. The method of any of embodiments 30-33, wherein an electrical motor and a rotation motor are configured to drive composite movement of the micro-screw.
35. The method of any of embodiments 30-34, further comprising: lowering the micro-screw while decreasing a rotation speed of the micro-screw to close the outlet port.
36. The method of any of embodiments 30-35, wherein rotating the micro-screw comprises rotating the micro-screw in a first direction, the method further comprising: rotating the micro-screw in a direction opposite to the first direction to remove an amount of the printing material from the distal end of the nozzle before lowering the micro-screw to close the outlet port.
37. The method of any of embodiments 30-36, further comprising coordinating a movement of a printing platform and an amount of the printing material being dispensed by the nozzle.
38. The method of any of embodiments 30-37, further comprising heating the printing material according to a ladder scheme, wherein the printing material is heated to a first temperature at a material supply module; the printing material is heated to a second temperature at a flow distribution model; and the printing material is heated to a third temperature at the nozzle.
39. The method of any of embodiments 30-38, wherein the first temperature is 50° C., wherein the second temperature is 70° C., and the third temperature is 105° C.
40. The method of any of embodiments 30-39, further comprising measuring the pressure of the printing material at a flow channel or an inlet of the micro-screw printing head; and controlling the pressure of the printing material via a closed-loop control system.
41. The method of any of embodiments 30-40, wherein the printing material is non-filamentous material, and wherein the printing material has a viscosity of 800 Pa·s or higher when dispensed by the nozzle.
42. The method of any of embodiments 30-41, wherein the micro-screw is controlled to manufacture pharmaceutical dosage units.
43. An additive manufacturing system, comprising: a material supply module for melting and pressurizing a printing material; a flow distribution module comprising a flow distribution plate, wherein the flow distribution plate comprises a plurality of channels for evenly dividing a single flow of the molten and pressurized printing material into a plurality of flows, a plurality of micro-screw printing heads configured to dispense the plurality of flows, wherein each of the plurality of micro-screw printing heads comprises: a micro-screw comprising a threaded stem portion and a conical head portion, wherein the threaded stem portion is threaded throughout its length for volume measurement; a sleeve, and a nozzle, wherein a distal end of the nozzle comprises a conical inner surface and an outlet port for dispensing the print material, and wherein the conical inner surface of the nozzle is configured to be in contact with the conical head portion of the micro-screw to stop dispensing the printing material at the nozzle when the respective micro-screw printing head is in a closed position; and a driving module comprising: one or more rotation motors for driving rotating motion of the plurality of micro-screws, and one or more actuators for driving vertical motion of the plurality of micro-screws.
44. The system of embodiment 43, wherein each micro-screw printing head further comprises a z-axis positioning sealing ring between the sleeve and the nozzle, wherein the z-axis positioning sealing ring is configured to adjust a vertical position of the nozzle.
45. The system of any of embodiments 43-44, wherein each micro-screw printing head further comprises a heating sleeve or a temperature sensor.
46. The system of any of embodiments 43-45, wherein each micro-screw printing head further comprises a heat insulating sleeve.
47. The system of any of embodiments 43-46, wherein, for each micro-screw printing head, a first taper angle of the conical head portion of the micro-screw is smaller than or equal to a second taper angle formed by the conical inner surface of the nozzle.

48. The system of embodiment 47, wherein the first taper angle of the conical head portion of the micro-screw is equal to or smaller than 60°.

49. The system of embodiment 47, wherein a ratio between the second taper angle and the first taper angle equals to or is between 1:1 and 4:1, equals to or is between 1:1 and 3:1, or equals to or is between 1:1 and 2:1.

50. The system of any of embodiments 43-49, wherein, for each micro-screw printing head, the conical head portion of the micro-screw is of a frustoconical shape or a truncated cone shape.

51. The system of any of embodiments 43-50, wherein, for each micro-screw printing head, the conical head portion of the micro-screw is configured to fit the conical inner surface of the nozzle via one or more matching patterns.

52. The system of any of embodiments 43-51, wherein, for each micro-screw printing head, a length of the threaded stem portion of the micro-screw equals to or is between 10 and 80 mm.

53. The system of any of embodiments 43-52, wherein, for each micro-screw printing head, a diameter of the threaded stem portion of the micro-screw equals to or is between 1 and 10 mm.

54. The system of any of embodiments 43-53, wherein the material supply module comprises an extruding device for melting the printing material and a pressurizing device.

55. The system of embodiment 54, wherein the extruding device comprises a single-piston extruding mechanism, a single-screw extruding mechanism, a twin-screw extruding mechanism, a conical twin screw extruding mechanism, or any combination thereof.

56. The system of embodiment 54, wherein the pressurizing device comprises a piston extruding mechanism, a single-screw extruding mechanism, a screw pump mechanism, a cogwheel mechanism, a plunger pump mechanism (e.g., a valve-less measuring pump mechanism), or any combination thereof.

57. The system of any of embodiments 43-56, wherein the material supply module comprises one or more temperature sensors for detecting temperature of the molten printing material.

58. The system of any of embodiments 43-57, further comprising one or more pressure sensor at the flow distribution plate or inlet of the printing head for detecting pressure of the molten printing material.

59. The system of any of embodiments 43-58, wherein, for each micro-screw printing head, an inlet of the micro-screw printing head is aligned based on a topmost thread segment of the threaded stem portion of the micro-screw.

60. The system of any of embodiments 43-59, wherein the one or more rotation motors comprise a plurality of rotation motors, each of the plurality of rotation motors is configured to control rotation speed of a respective micro-screw of the plurality micro-screw printing heads.

61. The system of any of embodiments 43-60, wherein the one or more rotation motors comprise a single rotation motor configured to simultaneously control rotation speed of micro-screws of the plurality of micro-screw printing heads.

62. The system of any of embodiments 43-61, wherein the actuators comprise a pneumatic actuator, a mechanical actuator, an electromagnetic actuator, a hydraulic actuator, or an electrical motor.

63. The system of any of embodiments 43-62, wherein the one or more actuators comprise a plurality of electrical motors, each of the plurality of electrical motors configured to control a speed and acceleration of vertical movement of a respective micro-screw and/or travel displacement of a respective micro-screw.

64. The system of embodiment 63, wherein the one or more electrical motors comprise a single electrical motors configured to simultaneously control a speed and acceleration of vertical movement of the plurality of micro-screws and a travel displacement of the plurality of micro-screws via a push plate mechanism.

65. The system of embodiment 64, wherein the push plate mechanism comprises a sliding plate, a push plate, and a cam mechanism.

66. The system of embodiment 65, wherein the cam mechanism is configured to translate horizontal movement of the sliding plate to vertical movement of the push plate.

67. The system of any of embodiments 43-66, wherein the driving module is configured to independently control the one or more actuators and the one or more rotation motors.

68. The system of any of embodiments 43-67, wherein the driving module provide composite control of the one or more actuators and the one or more rotation motors.

69. The system of any of embodiments 43-68, wherein at least one of the one or more rotation motors and the one or more actuators is a stepper motor.

70. The system of any of embodiments 43-69, further comprising: a cross connector or cardan shaft used for coupling.

71. The system of any of embodiments 43-70, wherein the flow distribution module comprises a base plate, and wherein the flow distribution plate and the plurality of micro-screw printing heads are placed in the base plate.

72. The system of embodiment 71, wherein the flow distribution plate comprises an upper plate and a lower plate.

73. The system of embodiment 71, wherein the base plate and the sleeves of the plurality of micro-screw printing heads are integrated.

74. The system of any of embodiments 43-73, further comprising a temperature control system outside the flow distribution plate, wherein the temperature control system comprises a heating device and a cooling device.

75. The system of any of embodiments 43-74, wherein an inlet of the flow distribution plate comprises a sealing mechanism.

76. The system of any of embodiments 43-75, wherein an inlet of a micro-screw printing head comprises a sealing mechanism.

77. The system of embodiment 76, wherein the sealing mechanism is a sealing ring.

78. The system of any of embodiments 43-77, wherein the plurality of micro-screw printing heads are arranged in a natural-balancing layout or a rheological-balancing layout.

79. The system of any of embodiments 43-78, wherein the flow distribution plate is configured to divide the single flow into 4 flows or 8 flows.

80. The system of embodiment 79, wherein the flow distribution plate is configured to divide the single flow into 16 flows or 32 flows via one or more 1-to-4 or 1-to-8 sub-plates.
81. The system of any of embodiments 43-80, wherein the flow distribution plate is configured to divide the single flow via a rheological-balancing layout into 3 flows, 5 flows, or 7 flows.
82. The system of any of embodiments 43-81, wherein the printing material is melted by the material supply module at between 50° C. and 400° C.
83. The system of any of embodiments 43-82, wherein the printing material is dispensed by the nozzle at between 50° C. and 400° C.
84. The system of any of embodiments 43-83, wherein the printing material is non-filamentous material, and wherein the printing material has a viscosity of 800 Pa·s or higher when dispensed by the nozzle.
85. The system of any of embodiments 43-84, wherein the printing material comprises a pharmaceutically acceptable material, an inert material, or a combination thereof.
86. The system of any of embodiments 43-85, further comprising a printing platform and a controller for causing movement of the printing platform based on a Cartesian coordinate system, a polar coordinate system, or a cylindrical coordinate system.
87. A method of additive manufacturing via a plurality of micro-screw printing heads, wherein each micro-screw printing head of the plurality comprises: a micro-screw comprising a threaded stem portion and a conical head portion, and a nozzle, wherein a distal end of the nozzle comprises a conical inner surface and an outlet port for dispensing the print material, the method comprising: distributing a single flow of molten and pressurized printing material, via a flow distribution plate, into a plurality of flows; causing each of the plurality of flows to reach a micro-screw head of the plurality of micro-screw printing heads; at each micro-screw printing head: raising the micro-screw to open the outlet port of the nozzle; rotating the micro-screw to introduce the respective flow into a groove of the threaded stem portion of the micro-screw, wherein the molten and pressurized printing material is configured to flow toward the distal end of the nozzle; and lowering the micro-screw such that the conical inner surface of the nozzle is in contact with the conical head portion of the micro-screw to close the outlet port and stop dispensing the printing material at the nozzle.
88. The method of embodiment 87, further comprising melting and pressuring the printing material.
89. The method of any of embodiments 87-88, wherein an electrical motor is configured to simultaneously control a speed and acceleration of vertical movement of the plurality of micro-screws and travel displacement of the plurality of micro-screws via a push plate mechanism.
90. The method of any of embodiments 87-89, wherein each of a plurality of electrical motors is configured to control a speed and acceleration of vertical movement of a respective micro-screw and a travel displacement of a respective micro-screw.
91. The method of any of embodiments 87-90, wherein each of a plurality of rotation motors is configured to control rotation speed of a respective micro-screw via a motor adaptor shaft.
92. The system of any of embodiments 87-91, wherein a single rotation motor is configured to simultaneously control rotation speed of micro-screws of the plurality of micro-screw printing heads via one or more gears and belts.
93. The method of any of embodiments 87-92, wherein an actuator and a rotation motor are configured to drive composite movement of the micro-screw.
94. The method of any of embodiments 87-93, further comprising: lowering the micro-screw while decreasing a rotation speed of the micro-screw to close the outlet port.
95. The method of any of embodiments 87-94, wherein rotating the micro-screw comprises rotating the micro-screw in a first direction, the method further comprising:

rotating the micro-screw in a direction opposite to the first direction to remove an amount of the printing material from the distal end of the nozzle before lowering the micro-screw to close the outlet port.

96. The method of any of embodiments 87-95, further comprising coordinating a movement of a printing platform and an amount of the printing material being dispensed by the nozzle.
97. The method of any of embodiments 87-96, further comprising heating the printing material according to a ladder scheme, wherein the printing material is heated to a first temperature at a material supply module; the printing material is heated to a second temperature at a flow distribution model; and the printing material is heated to a third temperature at each nozzle.
98. The method of embodiment 97, wherein the first temperature is 50° C., wherein the second temperature is 70° C., and the third temperature is 105° C.
99. The method of any of embodiments 87-98, further comprising measuring the pressure of the printing material at an inlet of micro-screw printing head, or at the flow distribution plate; and controlling the pressure of the printing material via a closed-loop control system.
100. The method of any of embodiments 87-99, wherein the printing material is non-filamentous material, and wherein the printing material has a viscosity of 800 Pa·s or higher when dispensed by the nozzle.
101. The method of any of embodiments 87-100, wherein the plurality of micro-screw printing heads are configured to manufacture pharmaceutical dosage units.
102. An additive manufacturing system, comprising: a first printing station comprising: a first material supply module for melting and pressurizing a first printing material; a first flow distribution module configured to evenly dividing a single flow of the molten and pressurized first printing material into a first plurality of flows; and a first printing module comprising a set of needle-valve printing heads configured to dispense the first plurality of flows; a second printing station comprising: a second material supply module for melting and pressurizing a second printing material; a second flow distribution module configured to evenly dividing a single flow of the molten and pressurized second printing material into a second plurality of flows; and a second printing module comprising a set of micro-screw printing heads configured to dispense the second plurality of flows.
103. The system of embodiment 102, wherein the first printing station and the second printing station are configured to print a same batch of products.

104. The system of any of embodiments 102-103, wherein the each of the first and second printing modules is configured to be extendable to accommodate different numbers of printing heads.

105. The system of any of embodiments 102-104, wherein the each of the first and second printing stations is configured to be extendable to accommodate different types of printing modules.

106. The system of any of embodiments 102-105, further comprising a set of droplet ejection printing heads, a set of injection printing heads, a set of inkjet printing heads, or any combination thereof.

107. A plurality of pharmaceutical tablets prepared using one or more micro-screw printing heads of an additive manufacturing system by the method of any one of the methods 30-42.

108. The plurality of pharmaceutical tablets of embodiment 107, wherein all of pharmaceutical tablets with a weight less than or equal to 300 mg of the plurality of pharmaceutical tablets have a relative deviation of less than or equal to ±7.5%.

109. The plurality of pharmaceutical tablets of embodiment 107, wherein all of pharmaceutical tablets with a weight more than or equal to 300 mg of the plurality of pharmaceutical tablets have a relative deviation of less than or equal to ±5%.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. An additive manufacturing system, comprising:

a material supply module for melting and pressurizing a printing material;

a flow distribution module comprising a flow distribution plate, wherein the flow distribution plate comprises a plurality of channels for evenly dividing a single flow of the printing material into a plurality of flows;

a printing module comprising a set of printing heads, wherein the set of printing heads configured to dispense the plurality of flows; and a driving module for one or more of driving rotating motions of micro-screws of the printing heads and driving vertical motions of the printing heads;

wherein the flow distribution plate comprises an upper plate and a lower plate;

wherein the upper plate and the lower plate are separable, and when the upper plate and the lower plate are separated, each of the upper plate and the lower plate exposes inner surfaces of one or more channels and junctures in the flow distribution plate;

wherein the printing material comprises a pharmaceutically acceptable material, an inert material, or a combination thereof.

2. The system of claim 1, wherein a pressure within the plurality of channels of the flow distribution plate is between 0-20 MPa.

3. The system of claim 1, further comprising one or more pressure sensors at a channel or an inlet of the printing head for detecting pressure of the melted printing material.

4. The system of claim 1, wherein the flow distribution plate comprises a temperature control mechanism for maintaining a temperature of the flow distribution plate at a desired level.

5. The system of claim 4, the temperature control mechanism comprises one or more heaters, one or more coolers, or any combination thereof.

6. The system of claim 5, wherein the one or more heaters and the one or more coolers are configured to operate in conjunction to maintain the temperature of the flow distribution plate.

7. The system of claim 1, wherein an inlet of the flow distribution plate comprises a sealing mechanism.

8. The system of claim 1, wherein the flow distribution module comprises a base plate, and wherein the flow distribution plate and the printing heads are placed in the base plate.

9. The system of claim 1, wherein the plurality of channels comprises a main channel and a branch channel, wherein an inlet of the main channel is higher than an outlet of the branch channel.

10. The system of claim 9, wherein the main channel is configured to divide the single flow of the printing material into a first plurality of flows, and the branch channel is configured to divide each of the first plurality of flows into two or more second flows.

11. The system of claim 9, wherein a pressure of the main channel and a pressure of the branch channel are higher than 0 Mpa.

12. The system of claim 1, wherein the micro-screw of the printing head comprises:

a threaded stem portion and a head portion, wherein:

the threaded stem portion is threaded throughout a length of the threaded stem portion; and an inlet of the printing head is aligned with a topmost thread segment of the threaded stem portion.

* * * * *